US012632043B2

(12) United States Patent

Law et al.

(10) Patent No.:  US 12,632,043 B2

(45) Date of Patent:     May 19, 2026

(54) PROCESS LIFECYCLE MANAGEMENT METHODS AND SYSTEMS

(71) Applicant: FISHER-ROSEMOUNT SYSTEMS, INC., Round Rock, TX (US)

(72) Inventors: Gary K. Law, Georgetown, TX (US); Robert M. Lenich, Austin, TX (US); Kelsey Hill, Austin, TX (US)

(73) Assignee: FISHER-ROSEMOUNT SYSTEMS, INC., Round Rock, TX (US)

( * ) Notice:   Subject to any disclaimer, the term of this patent is extended or adjusted under 35 U.S.C. 154(b) by 660 days.

(21) Appl. No.: 18/099,054

(22) Filed:   Jan. 19, 2023

(65)   Prior Publication Data

US 2023/0229148 A1    Jul. 20, 2023

Related U.S. Application Data

(60) Provisional application No. 63/301,434, filed on Jan. 20, 2022.

(51) Int. Cl.
G05B 19/418      (2006.01)

(52) U.S. Cl.
CPC ...  G05B 19/41865 (2013.01); G05B 19/4188 (2013.01)

(58) Field of Classification Search
CPC .......... G05B 19/41865; G05B 19/4188; G05B 19/042; G06Q 10/06
See application file for complete search history.

(56)   References Cited

U.S. PATENT DOCUMENTS 3,554,099 A    1/1971  Rodley
3,554,125 A    1/1971  Van Dorn et al.

(Continued)

FOREIGN PATENT DOCUMENTS

EP        1 150 206 A1    10/2001
EP        1 865 413 A1    12/2007

(Continued)

OTHER PUBLICATIONS

"Batch Control—Part 2: Data Structures and Guidelines for Languages," British Standards Institution, BS EN 61512-2:2002, Oct. 2002 (108 pages).

(Continued)

*Primary Examiner* — Rami R Okasha
(74) *Attorney, Agent, or Firm* — MARSHALL, GERSTEIN & BORUN LLP

(57)   ABSTRACT

Process knowledge creation, development, and management techniques allow for and enable the creation of a universal process definition (UPD) of an industrial process, the automatic conversion or transformation of the UPD into different site-specific process definitions, and the implementation of the site-specific process definitions at different manufacturing, production, and/or automation sites. Typically, the UPD is site- and equipment-agnostic, and the transformation may generate and provide a set of site-specific process definition implementation files or routines to configure and/or govern the behavior of various site-specific execution systems, e.g., as site-specific operational instances of the UPD. The techniques may utilize feedback and information generated by site-specific operational instances to generate learned knowledge and update the UPD accordingly so that subsequent instantiations of the UPD may incorporate (and reap the benefits of) the learned knowledge. The techniques may automatically select a most suitable site for a particular instantiation of the UPD.

20 Claims, 17 Drawing Sheets

(56) References Cited

U.S. PATENT DOCUMENTS

| | | | |
|---|---|---|---|
| 3,554,200 A | 1/1971 | Cuozzi | |
| 3,554,212 A | 1/1971 | Maroney | |
| 3,554,265 A | 1/1971 | Milian | |
| 3,554,285 A | 1/1971 | Meldau | |
| 3,554,286 A | 1/1971 | Feuerbacher et al. | |
| 3,554,288 A | 1/1971 | Ross | |
| 3,554,379 A | 1/1971 | Pye | |
| 3,554,528 A | 1/1971 | Kring et al. | |
| 3,555,164 A | 1/1971 | Kostin et al. | |
| 3,555,231 A | 1/1971 | Laurentie et al. | |
| 3,555,265 A | 1/1971 | Feller | |
| 3,555,296 A | 1/1971 | Flanagan | |
| 3,556,025 A | 1/1971 | Holley | |
| 3,556,109 A | 1/1971 | Briskin et al. | |
| 3,556,110 A | 1/1971 | Briskin et al. | |
| 3,556,161 A | 1/1971 | Roberts | |
| 3,556,221 A | 1/1971 | Haws et al. | |
| 3,556,496 A | 1/1971 | Hucke | |
| 3,557,349 A | 1/1971 | Griem, Jr. | |
| 3,557,370 A | 1/1971 | Piekenbrock et al. | |
| 3,557,649 A | 1/1971 | Kirchner | |
| 3,557,656 A | 1/1971 | Precoul | |
| 3,557,691 A | 1/1971 | Bayer | |
| 3,557,717 A | 1/1971 | Chivers | |
| 3,557,718 A | 1/1971 | Chivers | |
| 3,557,803 A | 1/1971 | Bosshard | |
| 3,557,852 A | 1/1971 | Wagenknecht | |
| 3,557,863 A | 1/1971 | Becker | |
| 3,557,956 A | 1/1971 | Braun et al. | |
| 3,558,045 A | 1/1971 | Smith et al. | |
| 3,558,909 A | 1/1971 | Janson | |
| 3,559,570 A | 2/1971 | Martel et al. | |
| 3,559,576 A | 2/1971 | Vrancken et al. | |
| 3,559,626 A | 2/1971 | Paxton | |
| 3,559,632 A | 2/1971 | Viemon | |
| 3,559,655 A | 2/1971 | Briskin et al. | |
| 3,559,656 A | 2/1971 | Heckman | |
| 3,559,723 A | 2/1971 | Mann et al. | |
| 3,559,735 A | 2/1971 | Corrin | |
| 4,175,283 A | 11/1979 | Buchwald et al. | |
| 4,244,905 A | 1/1981 | Paschen et al. | |
| 4,256,549 A | 3/1981 | Divisek et al. | |
| 4,278,672 A | 7/1981 | Fujimura et al. | |
| 4,287,207 A | 9/1981 | Fujmura et al. | |
| 4,346,433 A | 8/1982 | Rutledge | |
| 4,350,700 A | 9/1982 | Fujimura et al. | |
| 4,371,544 A | 2/1983 | Fujimura et al. | |
| 4,396,426 A | 8/1983 | Jensfelt et al. | |
| 4,427,620 A | 1/1984 | Cook | |
| 4,435,827 A | 3/1984 | Kuze | |
| 4,508,593 A | 4/1985 | Bergstrom | |
| 4,614,540 A | 9/1986 | Nagy et al. | |
| 4,706,206 A | 11/1987 | Benoit et al. | |
| 4,774,370 A | 9/1988 | Schneider et al. | |
| 4,790,785 A | 12/1988 | Lee et al. | |
| 4,885,789 A | 12/1989 | Burger et al. | |
| 4,939,000 A | 7/1990 | Dodds et al. | |
| 4,952,283 A | 8/1990 | Besik | |
| 5,015,774 A | 5/1991 | Suekane et al. | |
| 5,057,992 A | 10/1991 | Traiger | |
| 5,232,861 A | 8/1993 | Miwa | |
| 5,252,360 A | 10/1993 | Huttl et al. | |
| 5,272,014 A | 12/1993 | Leyendecker et al. | |
| 5,286,896 A | 2/1994 | Korte et al. | |
| 5,301,331 A | 4/1994 | Ueno et al. | |
| 5,313,647 A | 5/1994 | Kaufman et al. | |
| 5,338,882 A | 8/1994 | Korte et al. | |
| 5,356,825 A | 10/1994 | Hozumi et al. | |
| 5,411,686 A | 5/1995 | Hata | |
| 5,450,346 A | 9/1995 | Krummen et al. | |
| 5,452,459 A | 9/1995 | Drury et al. | |
| 5,499,188 A | 3/1996 | Kline, Jr. et al. | |
| 5,506,535 A | 4/1996 | Ratner | |
| 5,536,128 A | 7/1996 | Shimoyashiro et al. | |
| 5,601,632 A | 2/1997 | Jensen | |
| 5,693,417 A | 12/1997 | Goedicke et al. | |
| 5,696,839 A | 12/1997 | Siegeritz | |
| 5,698,314 A | 12/1997 | Goedicke et al. | |
| 5,748,331 A | 5/1998 | Kohler | |
| 5,818,458 A | 10/1998 | Saito | |
| 5,844,805 A | 12/1998 | Uchimura et al. | |
| 5,852,666 A | 12/1998 | Miller et al. | |
| 5,854,746 A | 12/1998 | Yamamoto et al. | |
| 5,870,187 A | 2/1999 | Uritsky et al. | |
| 5,914,878 A | 6/1999 | Yamamoto et al. | |
| 5,916,858 A | 6/1999 | Kim et al. | |
| 5,925,917 A | 7/1999 | Maari | |
| 5,975,580 A | 11/1999 | Insalaco | |
| 6,005,978 A | 12/1999 | Garakani | |
| 6,039,511 A | 3/2000 | Sakai et al. | |
| 6,067,559 A | 5/2000 | Allard et al. | |
| 6,078,944 A | 6/2000 | Enko et al. | |
| 6,123,787 A | 9/2000 | Lippens et al. | |
| 6,176,153 B1 | 1/2001 | Maier | |
| 6,697,690 B2 | 2/2004 | Scholl et al. | |
| 6,757,577 B1 | 6/2004 | Jeng et al. | |
| 6,834,370 B1 * | 12/2004 | Brandl | G05B 19/41865 |
| | | | 715/201 |
| 6,907,308 B1 | 6/2005 | Bartlett et al. | |
| 6,947,917 B1 | 9/2005 | Mathur et al. | |
| 7,047,101 B1 | 5/2006 | Young et al. | |
| 7,065,714 B1 | 6/2006 | Theel et al. | |
| 7,085,619 B2 | 8/2006 | Broese et al. | |
| 7,181,303 B2 | 2/2007 | Scholl et al. | |
| 7,283,882 B1 | 10/2007 | Bransky et al. | |
| 7,292,906 B2 | 11/2007 | Funk et al. | |
| 7,369,913 B2 | 5/2008 | Heminway et al. | |
| 8,160,735 B2 | 4/2012 | Sinclair et al. | |
| 9,311,442 B2 | 4/2016 | Banerjee et al. | |
| 10,088,837 B1 * | 10/2018 | Strain | G05B 19/41865 |
| 10,942,710 B1 * | 3/2021 | Dunn | G06F 8/34 |
| 11,005,602 B2 | 5/2021 | Wu et al. | |
| 2003/0069894 A1 | 4/2003 | Cotter et al. | |
| 2003/0110058 A1 | 6/2003 | Fagan et al. | |
| 2003/0196186 A1 | 10/2003 | Scholl et al. | |
| 2004/0054645 A1 | 3/2004 | Scholl et al. | |
| 2004/0187093 A1 | 9/2004 | Hogan | |
| 2005/0197786 A1 | 9/2005 | Kataria et al. | |
| 2006/0020362 A1 | 1/2006 | Morinaga et al. | |
| 2006/0178906 A1 | 8/2006 | Kalle et al. | |
| 2006/0259160 A1 | 11/2006 | Hood et al. | |
| 2007/0088733 A1 | 4/2007 | Bodge et al. | |
| 2007/0156275 A1 | 7/2007 | Piper et al. | |
| 2007/0192056 A1 | 8/2007 | Ahmed et al. | |
| 2007/0283030 A1 | 12/2007 | Deininger et al. | |
| 2008/0015714 A1 | 1/2008 | Rudnick et al. | |
| 2008/0097636 A1 | 4/2008 | Kline | |
| 2008/0097804 A1 | 4/2008 | Soltero | |
| 2008/0127186 A1 | 5/2008 | Kanodia et al. | |
| 2008/0134073 A1 | 6/2008 | Bergantino et al. | |
| 2008/0154412 A1 | 6/2008 | Steinbach et al. | |
| 2009/0089234 A1 | 4/2009 | Sturrock et al. | |
| 2010/0217420 A1 * | 8/2010 | Sinclair | G06Q 10/00 |
| | | | 700/101 |
| 2010/0332293 A1 | 12/2010 | Merchant | |
| 2011/0029445 A1 | 2/2011 | Whittacre et al. | |
| 2011/0213485 A1 | 9/2011 | Power et al. | |
| 2011/0264251 A1 | 10/2011 | Copello et al. | |
| 2014/0100668 A1 | 4/2014 | Jundt et al. | |
| 2015/0105878 A1 | 4/2015 | Jones et al. | |
| 2015/0106346 A1 | 4/2015 | Grove et al. | |
| 2015/0310155 A1 | 10/2015 | Banerjee et al. | |
| 2015/0346705 A1 | 12/2015 | Chew | |
| 2017/0286456 A1 | 10/2017 | Wenzel et al. | |
| 2018/0032065 A1 | 2/2018 | Delgado Arana | |
| 2018/0136910 A1 | 5/2018 | Noetzelmann et al. | |
| 2019/0103944 A1 | 4/2019 | Wu et al. | |
| 2019/0219992 A1 | 7/2019 | Grimm et al. | |
| 2019/0258230 A1 | 8/2019 | Chiba et al. | |

(56)　　　　　References Cited

U.S. PATENT DOCUMENTS

2019/0278878 A1　　9/2019　Sawyer et al.
2024/0385600 A1*　11/2024　Pieri ................. G06Q 10/0631

FOREIGN PATENT DOCUMENTS

GB　　　2 453 053 A　　3/2009
WO　　WO-2009/016090 A1　　2/2009

OTHER PUBLICATIONS

"Enterprise-Control System Integration Part 1: Models and Terminology," American National Standard, ANSI/ISA-095.00-01-2000, Approved Jul. 15, 2000 (142 pages).
"Enterprise-Control System Integration Part 2: Object Model Attributes," American National Standard, ANSI/ISA-95.00.02-2001, Approved Oct. 17, 2001 (104 pages).
"Fluxa: Advanced Digital Technologies for Development & Manufacturing," Manufacturing Intelligence Solutions Providers (2018). Retrieved from the Internet at: URL:https://manufacturing-intelligence.manufacturingtechnologyinsights.com/vendor/fluxa-advanced-digital-technologies-for-development-manufacturing-cid-265-mid-42.html.
"Fluxa: Drug Development Powered by Digital Collaboration," CIOReview (2023). Retrieved from the Internet at: URL:https://collaboration.cioreview.com/vendor/2018/fluxa.
"Fluxa: Process & Knowledge Management," Fluxa Inc. (2022). Retrieved from the Internet at: URL:https://www.fluxa.io/products.
American National Standard, "Batch Control Part 1: Models and Terminology", ANSI/ISA—S88.01—1995, pp. 1-96, (Oct. 23, 1995).
American National Standard, "Batch Control Part 2: Data Structures and Guidelines for Languages", ANSI/ISA—S88.00.02-2001, pp. 1-124, (Feb. 7, 2001).
American National Standard, "Batch Control Part 3: General and Site Recipe Models and Representation", ANSI/ISA—88.00.03-2003, pp. 1-80, (Mar. 14, 2003).
Miller, "Things Go Better with S88: A New Approach to the Engineering Process", Pharmaceutical Engineering, 12 pages, (Sep. 2002).
U.S. Appl. No. 16/407,288, filed May 9, 2019.
U.S. Appl. No. 16/930,434, filed Jul. 16, 2020.
Anonymous, "Simulink PLC Coder (TM) User's Guide," (Mar. 1, 2014).
Emerson Process Management, "DeltaV Digital Automation—System System Overivew," Publication of Emerson Process Management (Jan. 1, 2009).
Falkman et al., "Automatic Generation: A Way of Ensuring PLC and HMI Standards," Emerging Technologies & Factory Automation (Sep. 5, 2011).
International Search Report and Written Opinion for Application No. PCT/US2023/011138, dated Apr. 3, 2023.
Moll et al., "Reconfigurable Modular Production Plant for Thermoplastic Hybrid Composites," Production Engineering (Apr. 11, 2019).
Puls et al., "User-Guided Engineering of Integrated Energy Management Functions in Automation Systems," 26th IEEE International Conference on Emerging Technologies and Factory Automation (Sep. 7, 2021).
Steinegger et al., "Automated Code Generation for Programmable Logic Controllers Based on Knowledge Acquisition from Engineering Artifacts: Concept and Case Study," Proceedings of 2012 IEEE 17th International Conference on Emerging Technologies & Factory Automation (Sep. 17, 2012).
Wei et al., "Towards Establishing Formal Verficiation and Inductive Code Synthesis in the PLC Domain," Cornell University Library (Jun. 30, 2021).

* cited by examiner

UNIVERSAL PROCESS DEFINITION    200

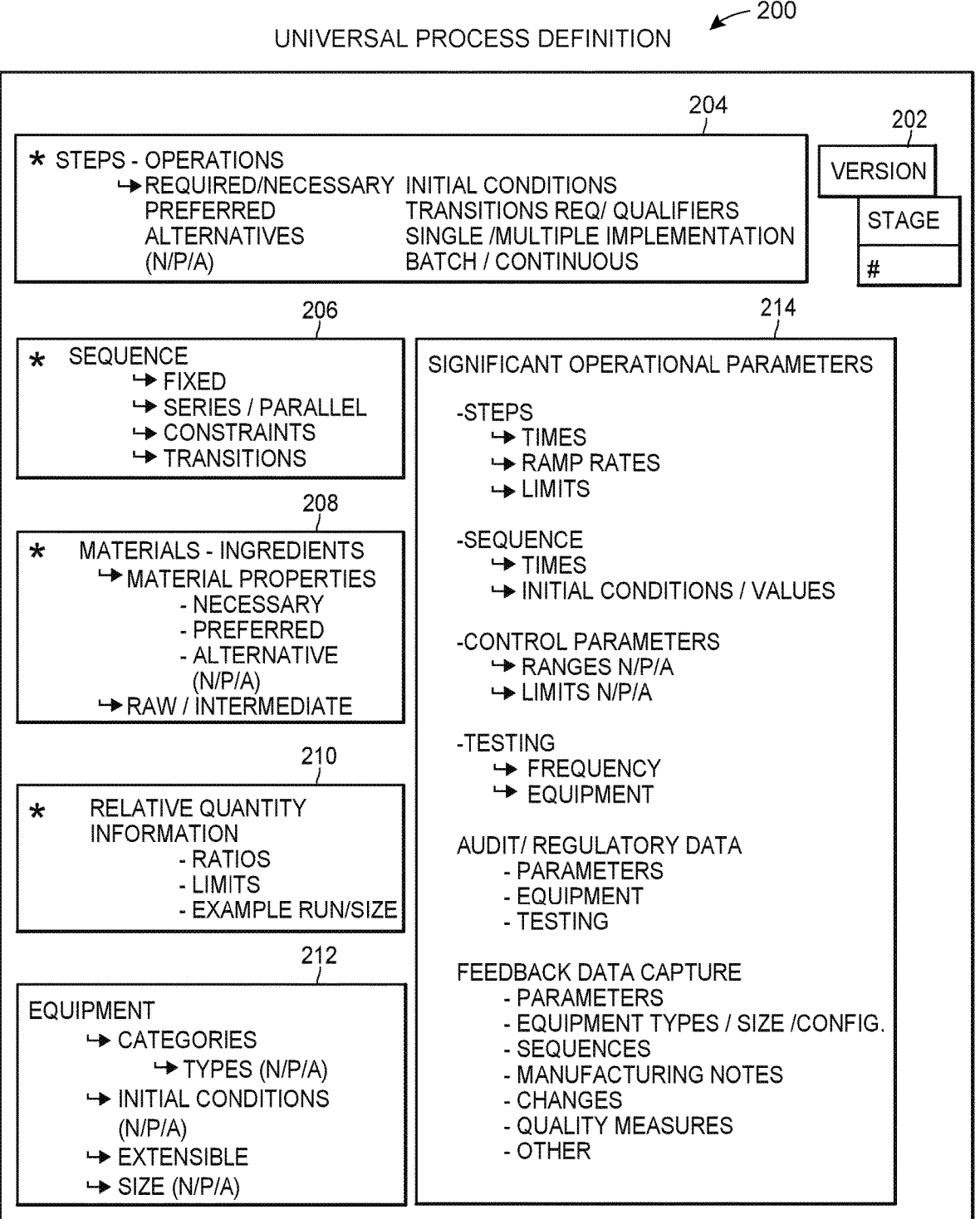

204

\* STEPS - OPERATIONS
⤷REQUIRED/NECESSARY  INITIAL CONDITIONS
   PREFERRED              TRANSITIONS REQ/ QUALIFIERS
   ALTERNATIVES           SINGLE /MULTIPLE IMPLEMENTATION
   (N/P/A)                BATCH / CONTINUOUS

202

VERSION

STAGE

206

\* SEQUENCE
   ⤷ FIXED
   ⤷ SERIES / PARALLEL
   ⤷ CONSTRAINTS
   ⤷ TRANSITIONS

208

\* MATERIALS - INGREDIENTS
   ⤷MATERIAL PROPERTIES
      - NECESSARY
      - PREFERRED
      - ALTERNATIVE
      (N/P/A)
   ⤷RAW / INTERMEDIATE

210

\* RELATIVE QUANTITY
   INFORMATION
      - RATIOS
      - LIMITS
      - EXAMPLE RUN/SIZE

212

EQUIPMENT
   ⤷ CATEGORIES
      ⤷ TYPES (N/P/A)
   ⤷ INITIAL CONDITIONS
      (N/P/A)
   ⤷ EXTENSIBLE
   ⤷ SIZE (N/P/A)

214

SIGNIFICANT OPERATIONAL PARAMETERS

-STEPS
   ⤷ TIMES
   ⤷ RAMP RATES
   ⤷ LIMITS

-SEQUENCE
   ⤷ TIMES
   ⤷ INITIAL CONDITIONS / VALUES

-CONTROL PARAMETERS
   ⤷ RANGES N/P/A
   ⤷ LIMITS N/P/A

-TESTING
   ⤷ FREQUENCY
   ⤷ EQUIPMENT

AUDIT/ REGULATORY DATA
   - PARAMETERS
   - EQUIPMENT
   - TESTING

FEEDBACK DATA CAPTURE
   - PARAMETERS
   - EQUIPMENT TYPES / SIZE /CONFIG.
   - SEQUENCES
   - MANUFACTURING NOTES
   - CHANGES
   - QUALITY MEASURES
   - OTHER

RECEIVE UNIVERSAL PROCESS DEFINITION

464

RECEIVE DATA OF SITE CONFIGURATION

466

TRANSFORM SEQUENCE OF PROCESSING STEPS INTO SITE-SPECIFIC ROUTINES

470

472

RECEIVE DATA SPECIFYING SITE-SPECIFIC EXECUTION OF PROCESS STEPS

474

RECEIVE DATA OF SITE CONFIGURATION

476

CREATE UNIVERSAL PROCESS DEFINITION

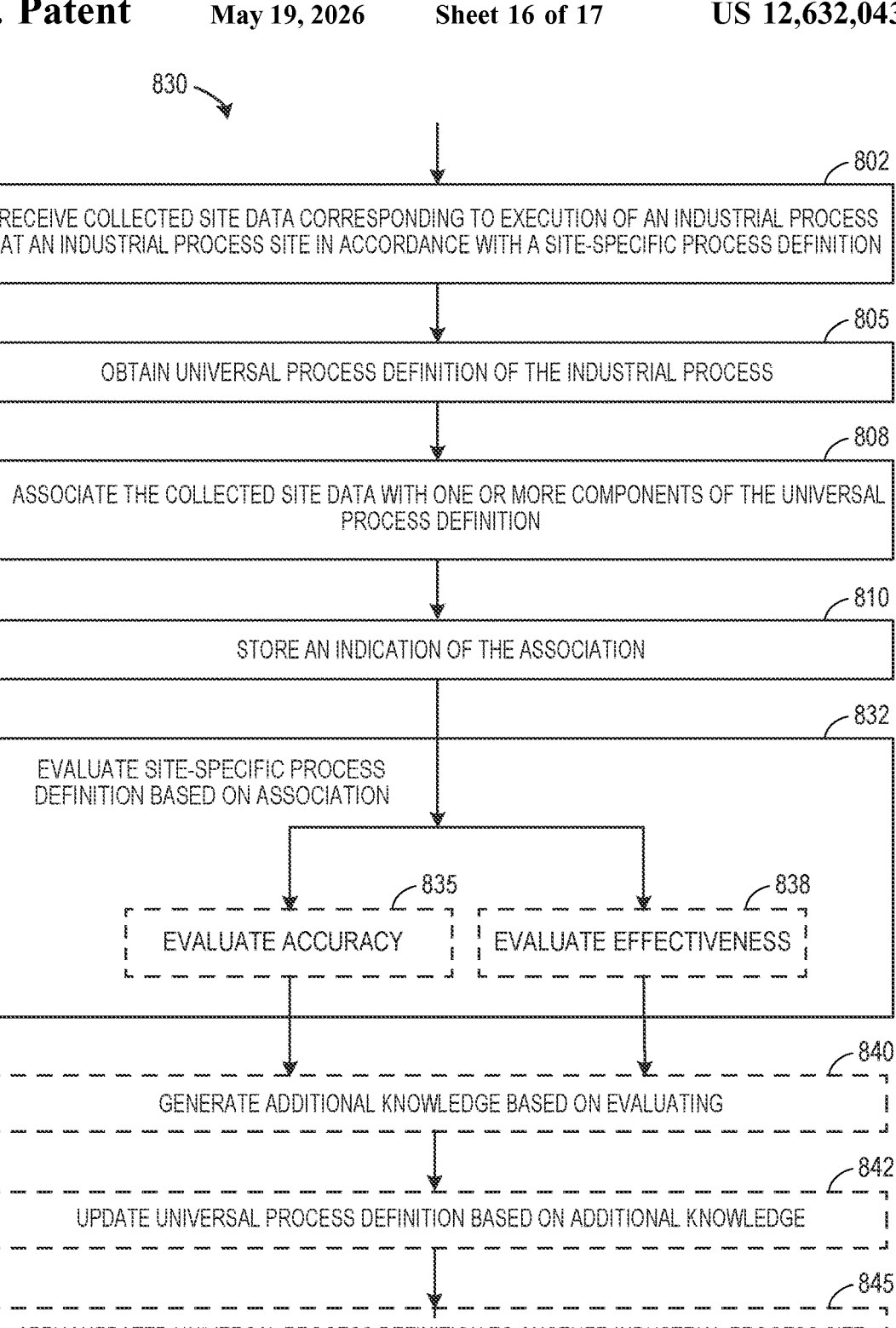

830

802
RECEIVE COLLECTED SITE DATA CORRESPONDING TO EXECUTION OF AN INDUSTRIAL PROCESS AT AN INDUSTRIAL PROCESS SITE IN ACCORDANCE WITH A SITE-SPECIFIC PROCESS DEFINITION

805
OBTAIN UNIVERSAL PROCESS DEFINITION OF THE INDUSTRIAL PROCESS

808
ASSOCIATE THE COLLECTED SITE DATA WITH ONE OR MORE COMPONENTS OF THE UNIVERSAL PROCESS DEFINITION

810
STORE AN INDICATION OF THE ASSOCIATION

832
EVALUATE SITE-SPECIFIC PROCESS DEFINITION BASED ON ASSOCIATION

835
EVALUATE ACCURACY

838
EVALUATE EFFECTIVENESS

840
GENERATE ADDITIONAL KNOWLEDGE BASED ON EVALUATING

842
UPDATE UNIVERSAL PROCESS DEFINITION BASED ON ADDITIONAL KNOWLEDGE

845
APPLY UPDATED UNIVERSAL PROCESS DEFINITION TO ANOTHER INDUSTRIAL PROCESS SITE

FIG. 8B

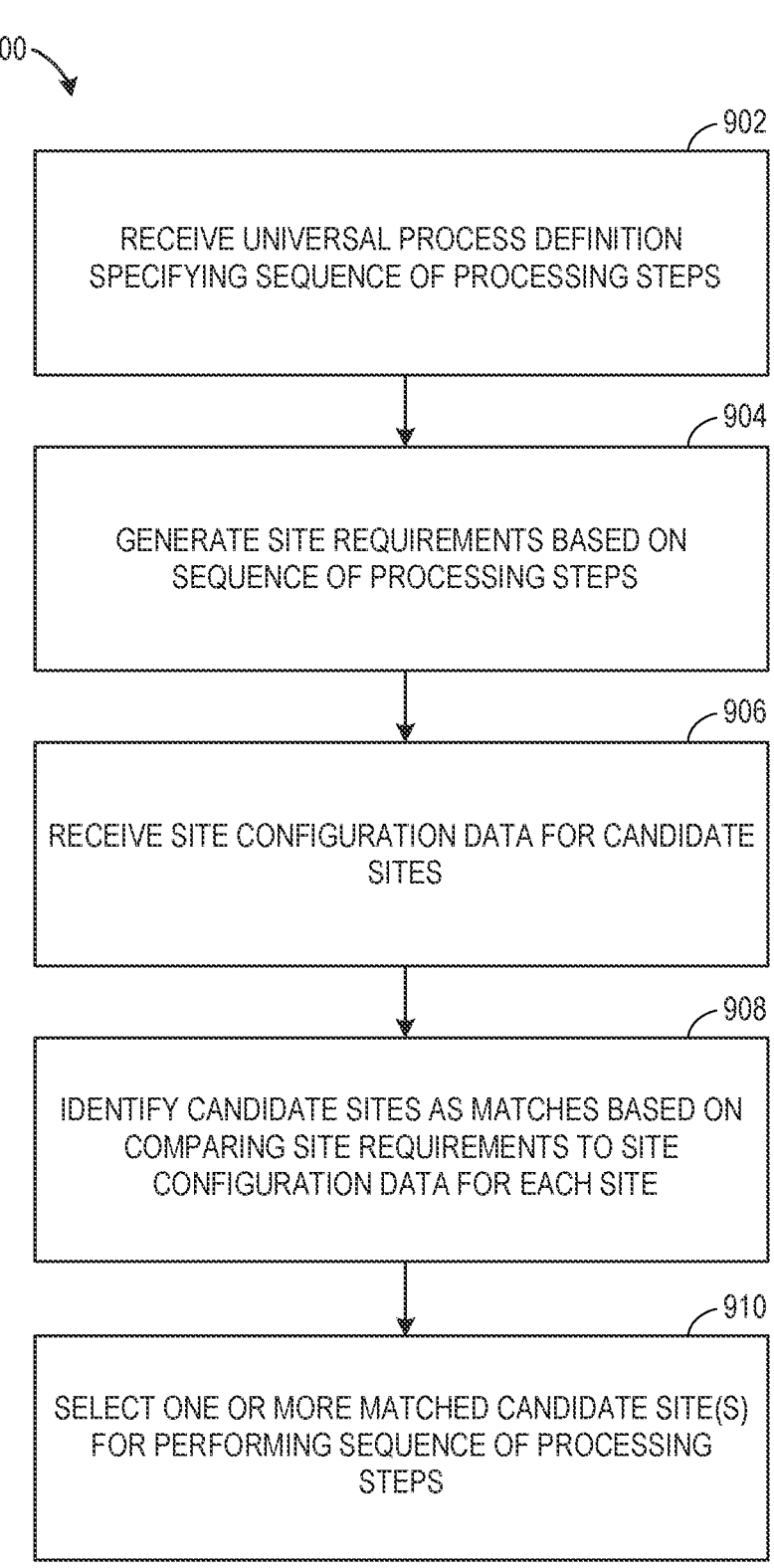

900

902

RECEIVE UNIVERSAL PROCESS DEFINITION
SPECIFYING SEQUENCE OF PROCESSING STEPS

904

GENERATE SITE REQUIREMENTS BASED ON
SEQUENCE OF PROCESSING STEPS

906

RECEIVE SITE CONFIGURATION DATA FOR CANDIDATE
SITES

908

IDENTIFY CANDIDATE SITES AS MATCHES BASED ON
COMPARING SITE REQUIREMENTS TO SITE
CONFIGURATION DATA FOR EACH SITE

910

SELECT ONE OR MORE MATCHED CANDIDATE SITE(S)
FOR PERFORMING SEQUENCE OF PROCESSING
STEPS

FIG. 9

PROCESS LIFECYCLE MANAGEMENT METHODS AND SYSTEMS

CROSS REFERENCE TO RELATED APPLICATIONS

This application claims priority to U.S. Provisional Patent Application Ser. No. 63/301,434, entitled "Process Lifecycle Management Methods and Systems," which was filed Jan. 20, 2022, the entire disclosure of which is hereby expressly incorporated by reference herein.

TECHNICAL FIELD

This patent application relates generally to the management of the lifecycle of an industrial or manufacturing process over time (e.g., from research to development to manufacturing and release) across various industrial and manufacturing execution processes and systems.

BACKGROUND

Industrial or manufacturing processes, like those used in chemical, petroleum, pharmaceutical, paper, or other industrial process plants to produce physical products from source materials, typically include one or more process controllers communicatively coupled to one or more field devices via analog, digital or combined analog/digital buses, or via a wireless communication link or network. The field devices, which may be, for example, valves, valve positioners, switches and transmitters (e.g., temperature, pressure, level and flow rate sensors), are located within the process environment and generally perform physical or process control functions such as opening or closing valves, measuring process parameters, etc., to control one or more processes executing within the process plant or system. Smart field devices, such as the field devices conforming to the well-known FOUNDATION® Fieldbus protocol may also perform control calculations, alarming functions, and other control functions commonly implemented within the controller. The process controllers, which may be centrally located but which may also be located within the plant environment in a distributed manner, receive signals indicative of process measurements made by the field devices and/or other information pertaining to the field devices and execute a controller application that runs, for example, different control modules that make process control decisions, generate control signals based on the received information and coordinate with the control modules or blocks being performed in the field devices, such as HART®, WirelessHART®, and FOUNDATION® Fieldbus field devices. The control modules in the controller send the control signals over the communication lines or links to the field devices to thereby control the operation of at least a portion of the process plant or system.

Information from the field devices and the controller is usually made available from the controllers over a data highway to one or more other hardware devices, such as operator workstations, personal computers or computing devices, data historians, report generators, centralized databases, or other centralized administrative computing devices that are typically placed in control rooms or other locations away from the harsher plant environment. Each of these hardware devices typically is centralized across the process plant or across a portion of the process plant. These hardware devices execute applications that may, for example, enable an engineer to configure portions of the process or an operator to perform functions with respect to controlling a process and/or operating the process plant, such as changing settings of the process control routine, modifying the operation of the control modules within the controllers or the field devices, viewing the current state of the process, viewing alarms generated by field devices and controllers, simulating the operation of the process for the purpose of training personnel or testing the process control software, keeping and updating a configuration database, etc. The data highway utilized by the hardware devices, controllers and field devices may include a wired communication path, a wireless communication path, or a combination of wired and wireless communication paths.

As an example, the DeltaV™ control system, sold by Emerson Inc., includes multiple applications stored within and executed by different devices located at diverse places within a process plant. A configuration application, which resides in one or more workstations or computing devices, enables users to create or change process control modules and to download these process control modules via a data highway to dedicated distributed controllers. Typically, these control modules are made up of communicatively interconnected function blocks, which are objects in an object-oriented programming protocol that perform functions within the control scheme based on inputs thereto and that provide outputs to other function blocks within the control scheme. The configuration application may also allow a configuration designer to create or change operator interfaces that are used by a viewing application to display data to an operator and to enable the operator to change settings, such as set points, within the process control routines. Each dedicated controller and, in some cases, one or more field devices, stores and executes a respective controller application that runs the control modules assigned and downloaded thereto to implement actual process control functionality. The viewing applications, which may be executed on one or more operator workstations (or on one or more remote computing devices in communicative connection with the operator workstations and the data highway), receive data from the controller application via the data highway and display this data to process control system designers, operators, or users using the user interfaces, and may provide any of a number of different views, such as an operator's view, an engineer's view, a technician's view, etc. A data historian application is typically stored in and executed by a data historian device that collects and stores some or all of the data provided across the data highway while a configuration database application may run in a still further computer attached to the data highway to store the current process control routine configuration and data associated therewith. Alternatively, the configuration database may be located in the same workstation as the configuration application.

While an instance of an industrial or manufacturing process may be executed and controlled by a process control system at a particular plant site to produce the end product or goods, typically this instance is only one of multiple instances of the process which may be implemented over the lifecycle of the process. The "lifecycle" of an industrial or manufacturing process, as utilized herein, generally includes multiple stages of process maturity, for example, from the initial proof-of-concept of the process, to the design of the process, to the development of the process, to the testing, adjustment, and refining of the process, to the scaling up of the process to support commercial manufacturing and production of the end product, etc. As such, one instance of the process may be implemented and executed at a site earlier in the process' lifecycle (such as during a proof-of-concept or a trial stage of the process), and another instance of the process may be implemented and executed at a different site later in the process' lifecycle (such as during a process stage corresponding to commercial production of the end product). Further, different instances of the process within a same stage of the process lifecycle may require plant- or site-specific execution systems to be configured differently due to plant- or site-specific constraints such as equipment types and availability, plant capacity, environmental conditions, and the like. Still further, the implementation of a particular instance of an industrial or manufacturing process at a plant or site not only requires the plant's process control system to be specifically configured to support the particular process instance, but also typically requires other execution systems of the plant to be specifically configured to support the particular process instance. Such other execution systems may include, for example, manufacturing operations management systems (MOMs), manufacturing execution systems (MES), enterprise resource planning systems (ERPs), modeling systems, data management systems, electronic lab notebooks, laboratory information systems, auditing systems, asset management systems (AMS), other types of records management systems, and/or other systems which provide and/or consume data and information related to the particular plant or site at which the particular instance of the industrial or manufacturing process is to be implemented and executed.

Historically, the transfer of process lifecycle information from an earlier stage to a later stage of its lifecycle (e.g., "technology transfer" or "tech transfer" from one process stage to another process stage) is largely manual, where personnel familiar with the earlier process stage provide key process, materials, equipment, and procedural knowledge and information to personnel who implement the later stage, e.g., via paper, pdf files, spreadsheets, and the like. Thus, the accuracy and completeness of transferred process lifecycle knowledge information is easily compromised, which can not only increase the overall time to move the process through the various stages of its lifecycle from infancy to supporting volume production, but also can introduce risk into the product produced by the process. Unfortunately, such risks can lead to life-safety issues for both plant personnel and users of the end product, and in some cases can cause injury or death, for example, when risks are introduced into processes utilized to produce pharmaceutical, chemical, and other potentially hazardous and/or lethal products. To exacerbate these issues, manual tech transfer makes it difficult for product manufacturers to record and accurately report data necessary to find causes and contributing factors to product safety and quality and to comply with jurisdictional regulatory requirements. Still further, this manual tech transfer necessarily involves many different people with different skills and knowledge bases related to the different facilities or plant equipment that is used at various different times during a process development lifecycle, which also increases the testing and deployment time of a process.

Several digital tools have attempted to address these issues, however, these attempts suffer from shortcomings and drawbacks. For example, Product (vs. process) Lifecycle Management tools ("PLMs") address the lifecycle stages of a physical end product and are not easily adaptable and/or optimized for aspects that are particular to the lifecycle stages of industrial and manufacturing processes which produce the physical end product. Further, PLMs are not easily customized, extended into, and/or integrated with site-specific execution systems, if at all.

Recently, some Process Knowledge Administration systems or tools ("PKAs") have attempted to allow engineers and/or other process personnel to define processes, a priori, in a manner similar to those utilized in object-oriented techniques (e.g., object, class, module, instance, etc.). Such PKA tools provide a user interface and a database to enable users to define and store a set of related process definitions, from broad expressions down to specific implementation values, e.g., experimental process definitions, generic process definitions, site process definitions, control process definitions, and site-specific parameter values which may be passed from the tool to a particular site for implementation at the particular site. However, these tools are not only require manual process object and parameter definition a priori at the tool for the various object levels (e.g., object, class, module, instance, etc.), but the tools largely rely on a target set of equipment at a plant being fixed and are not easily or flexibly translatable (if at all) between sites with different equipment and/or equipment types, whether between lesser and more mature process stages, or between differently equipped locations during a same process stage.

SUMMARY

The novel process knowledge creation and management systems, methods, and techniques disclosed herein allow for and enable the creation and definition of a generic process formula of an industrial or manufacturing process (also referred to interchangeably herein as a "universal process definition file," a "process descriptor file" or a "generic process recipe"), where the systems and/or methods can automatically convert the generic or universal process definition, process formula or descriptor file into respective, site-specific sets of production facility instructions for various different execution systems associated with different sites, whether the different sites are for different maturity stages of the process or for differently-equipped sites at a same stage of the process. The universal process definition file may include, for example, a set of process inputs for making the product, a set of process steps or operations for making the product, an order or sequence (e.g., of execution) of the process steps or operations, one or more times or durations associated with one or more of the process steps or operations, the categories and/or types of process equipment needed to implement one or more of the process steps, data to be collected before, during and after the run of a process at a site, scaling or relative quantitative information that provides a manner of scaling a run of the process to different sizes or throughputs, etc. Typically, the universal process definition or descriptor file is site- and equipment-agnostic. Additionally, execution systems associated with a particular industrial or manufacturing plant or site and into which the site-specific production facility instructions may be incorporated include, for example, manufacturing operations management systems (MOMs), manufacturing execution systems (MESs), enterprise resource planning systems (ERPs), modeling systems, data management systems, electronic lab notebooks, laboratory information systems, other types of records management systems, asset management systems (AMS), historians, audit such as regulatory systems, and/or other systems which provide and/or consume data and information related to the particular plant or site.

In an embodiment, at least a portion of the universal process definition or descriptor file is created manually, e.g., may be defined via one or more user interfaces of process knowledge and creation management systems, methods, and/or techniques. Additionally or alternatively, at least a portion (and in some situations, all) of a universal process description or descriptor file can be automatically created by the disclosed techniques based on an industrial or manufacturing process which has been implemented and is executing at a specific process or manufacturing plant. That is, the universal process definition can be automatically and at least partially defined based on an actual, implemented instance of the process. For example, the system may receive one or more control routines, configuration files, and other process information and knowledge from an experimental system which is executing to the process at a proof-of-concept lifecycle stage or at a small-batch production stage, and the system may automatically generate a universal process definition or descriptor file based on the received information (and in some cases, further based on additional stage- or site-specific data and/or information). In an embodiment, the disclosed techniques include receiving one or more control routines for manufacturing, productizing, or packaging the product using a specified set of equipment in a particular process plant; receiving data relating to the physical configuration of the process plant; and automatically creating the universal process description, generic process formula or generic process descriptor file based on the received routines and the received data relating to the physical configuration of the process plant. Further, and advantageously, in embodiments, the disclosed techniques may include verifying that the universal process description or generic process formula is buildable and deployable into various sites.

The created or defined universal process definition or generic process formula may be stored at the process knowledge creation and management system, and the disclosed techniques may convert the universal process description into different site specific production facility instructions, each of which may be implemented in a different plant or site or in a different execution system at the same plant or site. In an embodiment, the disclosed techniques may include selecting a first production facility having at least a first process execution system (e.g., control, audit, material handling or ordering system) coupled to a first set of process equipment; converting, using a computer processor, the universal process definition file or the generic process formula as stored in the management system into a set of site specific production facility instructions for implementation by the first process execution system on the first set of process equipment at the first production facility to make the product; selecting a second production facility having at least a second process execution system (e.g., control, audit, material handling or ordering system) coupled to a second set of process equipment that is different than the first set of process equipment; and converting, using a computer processor, the universal process definition or the generic process formula as stored in the management system into a set of site specific production facility instructions for implementation by the process execution system on the second set of process equipment at the second production facility to make the product. In an embodiment, the disclosed techniques may include selecting a first production facility having a first process execution system (e.g., control, audit, material handling or ordering system) coupled to a first set of process equipment and having a second process execution system coupled to the first set of process equipment; converting, using a computer processor, the generic process formula as stored in the management system into a set of site specific production facility instructions for implementation by the first process execution system on the first set of process equipment at the first production facility to make the product; and converting, using a computer processor, the universal process definition or generic process formula as stored in the first management system into a set of site specific production facility instructions for implementation by the second process execution system on the first set of process equipment at the first production facility to make the product.

To enable or facilitate universal process definition or generic process formula conversions, as well as to support other aspects of process knowledge creation and management techniques, the process knowledge creation and management system may include a technology transfer layer or platform that provides an interface between other parts of the process knowledge creation and management system and the site-specific execution systems at various plants, e.g., for creation, implementation/execution, and refinement of an industrial or manufacturing process throughout various lifecycle stages and across various different plants as well as for tracking information related thereto. The technology transfer layer or platform may include a transfer component to receive the universal process definition or generic process formula; a communication link or system coupling to each of a plurality of process plant execution systems; a plurality of analysis routines, each configured to analyze data received from one or more of the plurality of process plant systems; and a conversion routine configured to receive the universal process definition or generic process formula and coupled to an output of one or more of the plurality of analysis routines, and to configure an instance of the process to execute in one or more execution systems of a process plant. Advantageously, the disclosed techniques, via the technology transfer layer platform, can transform the universal process definition or generic process formula into a site-specific, operational instance of the process via one or more execution systems associated with the site and within constraints that are specific to the site.

Further, in some embodiments, the disclosed techniques can transfer information and knowledge from the execution systems of a process or manufacturing site to the process knowledge creation and management system and transform such information and knowledge for incorporation into the universal process definition or generic process formula. For example, an embodiment of the method may include receiving, from a process plant, process data collected during execution of a process in the process plant; receiving a universal process definition or process formula or descriptor file specifying an equipment-agnostic sequence of processing steps corresponding to the process; and associating various of the received process plant data with the processing steps or the sequence of processing steps. Advantageously, the information provided from the execution systems to the process knowledge administration and creation system can include execution, calibration, and performance data and as well as records to support an audit trail.

Thus, and advantageously, embodiments of the disclosed process knowledge creation and management systems, methods, and techniques allow for not only the automatic or manual generation of a universal process definition or a generic process formula or descriptor file, but also allow for the automatic transformation and instantiation of the universal process definition, generic process formula or descriptor file into respective, one or more execution systems associated with multiple process or manufacturing plants or sites. In some situations, the disclosed techniques may transform an instance of the process executing at a plant site back into the universal process definition or general process formula, e.g., for verification purposes. In embodiments, the systems, methods, and/or techniques may include transforming any modifications to the process and/or other types of feedback, information, and knowledge gleaned from operations of the process at a process or manufacturing plant or site to be easily (and in some cases, automatically) rolled back into or otherwise incorporated into the universal process definition or generic process formula or descriptor file so that subsequent instantiations of the universal process definition, generic process formula or descriptor file in other plants may include the modifications, feedback or gleaned knowledge. That is, process, materials, equipment, and procedural knowledge and information can be easily and automatically transformed from a universal process definition or generic process formula or definition into a site-specific, operational instance of the process, and additional process, materials, equipment, and procedural knowledge and information gleaned from the site-specific operation instance of the process can be incorporated or added into the universal process definition, generic process formula or definition, e.g., so that future instantiations of the universal process definition or generic process formula are based on the incorporated process knowledge and information.

Moreover, the novel process knowledge creation and management systems, methods, and techniques may be leveraged to provide other novel and useful aspects, advantages, and benefits of process management. For example, the disclosed techniques may verify that various candidates sites or plants have or do not have the capabilities required to implement instances of a process defined by a universal process definition or general process recipe, where capabilities may be associated with equipment types and/or availability, scheduling of equipment usage and/or required personnel, site throughput and/or performance, and the like. In an embodiment, a method for managing process plants may include receiving a universal process descriptor file describing an equipment-agnostic sequence of processing steps defining a process for producing a product; generating, based on the process descriptor file describing the equipment-agnostic sequence, indications of one or more plant requirements for performing each of the processing steps; and receiving plant configuration data regarding aspects of physical configuration of one or more candidate process plants. Additionally, the method may include identifying matches between the one or more plant requirements and the plant configuration data of each of the one or more candidate process plants; and generating, based on the matches, suitability indicators for each of the one or more candidate process plants, where the suitability indicator of each candidate process plant indicates a suitability of the aspects of the physical configuration of the candidate process plant for performing the process. Examples of plant aspects which may be considered for suitability may include quality and performance parameters; availability, status, and/or scheduling of equipment, resources, and/or personnel; when and where a product can be manufactured at a particular plant given a current manufacturing state of the particular plant; and/or other factors which may affect regulatory, compliance and/or business goals. Further, the method may include selecting, based on the suitability indicators, one or more production plants from the candidate process plants to perform the process for producing the product; and causing the one or more production plants to perform an equipment-specific sequence of processing steps corresponding to the process to produce the product.

BRIEF DESCRIPTION OF THE DRAWINGS

FIG. 4 illustrates an example of a universal process definition (UPD) as used by the systems of FIGS. 2 and 3.

FIG. 8B is a flow diagram of an example method for developing an industrial process based on a site-specific implementation of the process.

FIG. 9 is a flow diagram of an example method for verifying and/or selecting development or production sites based on a universal process description.

DETAILED DESCRIPTION

Figure 1:
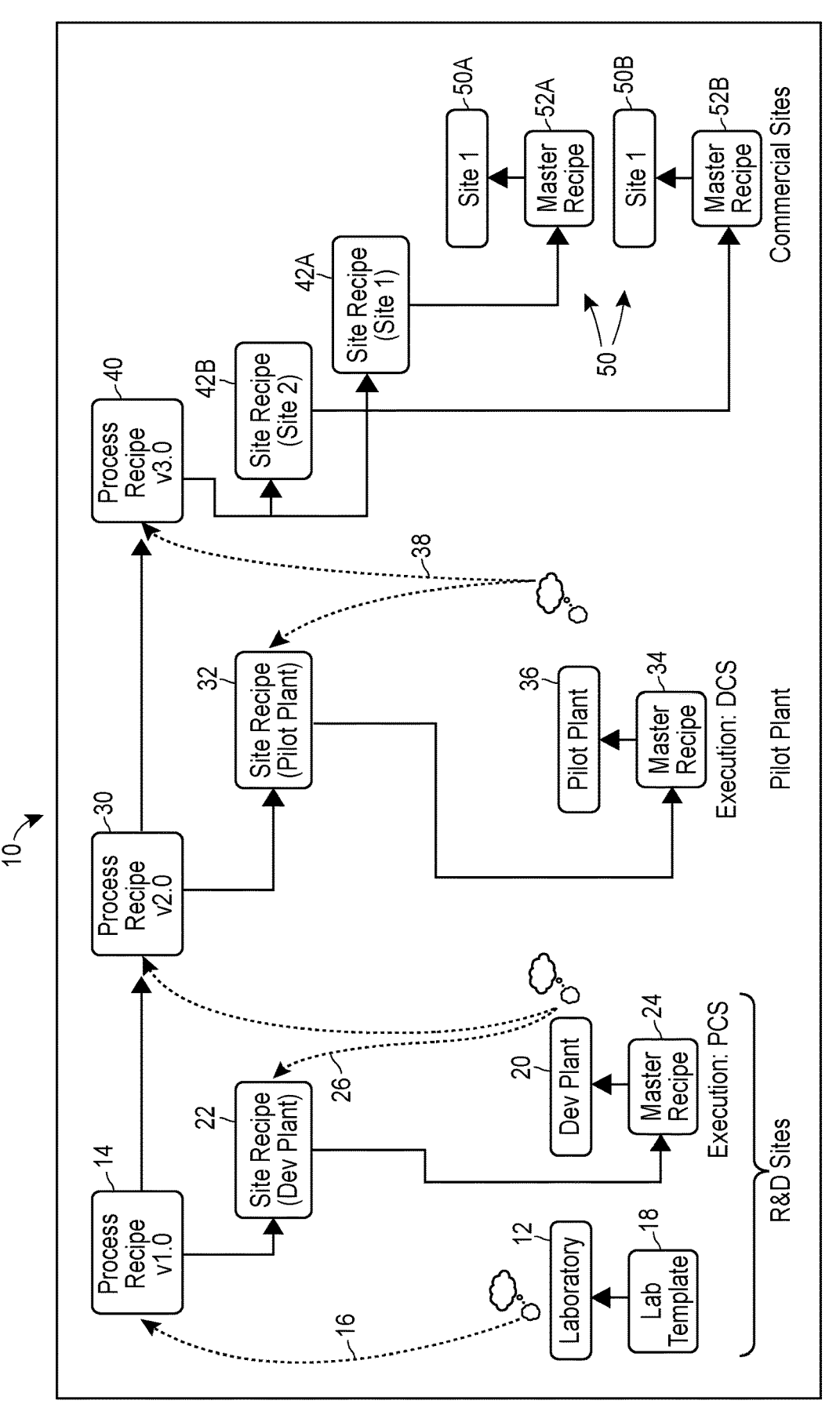
FIG. 1 is a flow chart illustrating a generic process development and management methodology typically instituted manually in prior art.

FIG. 1 depicts a flow chart illustrating a typical process development lifecycle associated with the creation and management of a particular process, such as a drug formulation and manufacturing process, a chemical manufacturing process, etc. As will be understood, a "process" as used, described and referred to herein, may by any type of process that produces any type of product, in any amount or formulation. Such processes may typically take the form of batch processes that are used to create a drug or other chemical substance from a set of raw or intermediate materials using what are typically referred to as recipes. However, the term "process" as used herein is not limited to this usage. Thus, as used herein a "process" may include any batch or continuous processes that may be used to make any product, including but not limited to a drug, a chemical, a petroleum product, etc., a process implemented by any type of manually implemented set of steps and equipment, a process implemented in any semi-automatic manner (including both automated and manual steps and/or equipment), and a process that is implemented using any automation system, such as a factory automation system, a process automation system, an automated manufacturing system, etc. to produce a product. Moreover, a "process" as used herein may produce an end use product (e.g., a commercial product sold in commerce) or an intermediate product used in other processes to produce a commercial product. Moreover, as used herein, a "process" may be any set of operations performed on equipment that creates or formulates a product, such as a drug, in an elemental form, one that changes a product, such as a drug or other material, into a formulated product to be sold or used (such formulating a drug into a pill form or into a liquid within a syringe form, dosing a drug or other product, etc.) or one that packages a product, such as a drug or chemical packaging process. Of course, while the example processes described herein are drug or chemical manufacturing processes, the processes described and referred to herein may be processes that make products other than drugs or chemicals, such as chip manufacturing processes, factory automation processes, etc. that are used to make, manipulate or package any type of product. Still further, a "process" as used, described and referred to herein may make a product at any scale using any type or set of appropriate equipment, and includes processes implemented at a laboratory scale, at development scale, at a small production or testing scale, or at a commercial manufacturing scale. Moreover, the equipment used to perform a "process" as used, described and referred to herein may be automated equipment (such as process equipment typically found at large commercial manufacturing plants), may be semi-automated equipment that has some level of automation and some level of non-automated control, such as manual control or implementation, or may be manually implemented equipment, such as equipment typically found or used in laboratory settings, or may be any combination of automated, semi-automated and manually operated equipment.

Referring to FIG. 1, a typical process development lifecycle 10 includes a number of stages illustrated as going from left to right in FIG. 1, including one or more development stages, in which a basic or rudimentary process is created and refined to produce a desired product, typically on a small scale, and one or more production stages, in which the basic process is refined to be implemented at a larger scale or using more advanced commercial production equipment. Thus, as illustrated in FIG. 1, a typical process development lifecycle starts in a laboratory setting or stage 12 where the basic steps in formulating or creating a product, such as a drug formulation, are developed, typically manually, to create a lab template 24 defining the basic steps of the process. As will be understood, the systems and process equipment used in the laboratory 12 may be elemental, may require significant manual operation, and indeed may have minimal or no automated control systems associated therewith. In any event, at some point, based on feedback from the lab 12 (indicated in FIG. 1 with the dotted line 16), a process developer creates a general or overall process template 18 which, in the example described herein, may be used to create a recipe 14 for a drug. This recipe 14 may include a description of the raw materials to use to formulate the drug, a set of steps to perform on the materials, and a sequence of steps needed to be performed to make the drug.

At some point, the recipe 14 may be developed at the laboratory stage 12 such that it is ready for further testing and or usage at another stage of the process development lifecycle, such as at a larger scale plant, which may be a development or testing plant 20. This development stage is typically used to refine the recipe 14 so that it can be used in more automated or larger scale production systems, and to make sure the process works to produce the desired product in those systems. Here, the recipe 14 is provided or used to produce a site recipe 22 that may be used at a particular development plant or site 20. The process developer typically creates the site recipe 22 from the overall recipe 14 manually by taking into account factors or conditions at the selected development plant 20, such as the categories and type of equipment present at the plant 20, the amount or sizing of the test runs to be performed at the plant 20, etc. The site recipe 22 is then provided to the development plant 22 as or is used to create a master recipe 24 for the process to be implemented at the site 20. As will be understood, the development plant 20 may use some automated equipment for implementation of the master recipe 24 and may, for example, use a PLC control system using basic programmable logic controllers to control the process equipment at the development plant 20 to implement the process that uses the master recipe 24. At this stage, typically, personnel at the plant 20 must review the site recipe 22 and program or set up the actual equipment at the plant 20 to create and implement the master recipe 24. Of course, the actual programming of the equipment at the plant 20 takes time and specific know-how by the personnel at the plant 20 familiar with the specific equipment at the plant 20, and the type and nature of the automation systems, if any, at the plant 20. The creation of the master recipe 24 and the programming and set up of the plant 20 to implement the master recipe 24 typically takes a significant amount of time, as it requires a great deal of manual programming and testing to set up the plant 20 to implement the process defined by the site recipe 22. Moreover, personnel at the plant 20 need to review and record data defining the operation of the plant 20 when implementing the master recipe 24. This review requires the personnel at the plant 20 to program the plant equipment to capture desired data, such as plant and process operation data, quality data, etc. Moreover, this review requires the personnel at the plant 20 to review the data and provide significant feedback that may be needed to refine or change the site recipe 22 to make this recipe more applicable to and usable at the plant 20, using the plant equipment actually at the development plant 20. This feedback, which is typically manual in nature, is illustrated in FIG. 1 with the use of dotted line 26. Of course, numerus runs of the process or general site recipe 22 at the plant 20 using the master recipe 24 may be needed to perform adequate testing and refining of the recipe for the plant 20.

At some point, such as after one or more runs of the master recipe 24 at the plant 20, the process developer may use the feedback 26 from the plant 20, typically provided in manual form by the plant personnel at the plant 20, to make a new version of the process recipe 30 (version 2.0 in FIG. 1) that is suited to and that is refined based on implementation of the recipe 14 at the development plant 20. Generally speaking, in the example provided herein, the laboratory site 12 and the development plant site 20 are used in process development stages to develop a recipe (process) for the product (e.g., a drug) and result in a process recipe 30 that is generally suited for implementation at one or more production plants. However, while FIG. 1 illustrates the process development stages as including a laboratory stage 12 and a development plant stage 20, other types of process sites could be used in the process development stages and process development could include more or less than the two process development sites 12 and 20 described in FIG. 1. Moreover, process development may use multiple different sites of the same type (e.g., labs and development plant sites)

and may, in some instances, use larger or commercial grade plants or sites in the process development stages.

In any event, the recipe 30 may be thereafter applied to or used in one or more production stages of the process in which the process is refined or altered or modified to be implemented on one or more production facilities. In the example of FIG. 1, the process recipe 30 is first used to produce a site recipe 32 for use as a master recipe 34 in a pilot plant 36 to refine that process recipe for commercial grade or larger scale production. As illustrated in FIG. 1, the pilot plant 36 may be larger in scale than the development plant 20 and may, for example, use a distributed control system (DCS) to implement the process using automated process control equipment. Thus, the pilot plant 36 may use vastly different equipment and execution systems than the development plant 20 or the lab site 12. As such, the site recipe 32 may need to be refined or configured to use different categories of and types of equipment than used in either the laboratory site 12 or the development plant site 20. Moreover, other automation systems at the pilot plant 36, such as data historians, process control configuration systems, auditing systems, data collection systems, asset management systems, etc. may need to be programmed to implement the process at the pilot plant site 36. Again, this programming and site specific implementation of the site recipe 32 as the master recipe 34 takes time and significant know-how of individuals or plant personnel knowledgeable about the specific equipment at the pilot plant 36. Moreover, personnel at the plant 36 need to review and record data defining the operation of the plant 36 when implementing the recipe 32. This review requires the personnel at the plant 36 to program the plant equipment to capture desired data, such as plant and process operation data, quality data, etc. Moreover, this review requires the personnel at the plant 36 to review the data and provide significant feedback (as indicated by the dotted lines 38) that may be needed to refine or change the site recipe 32 to make this recipe more applicable to and usable in a commercial grade production facility or prior to roll out at a commercial grade production facility. Of course, numerus runs of the process at the plant 36 using the master recipe 34 may be needed to perform adequate testing and refining of the recipe for the larger scale production. Still further, the process developer may use the feedback from the plant 36, again typically provided in manual form by the plant personnel at the plant 36, to make a new version of the process recipe 40 (version 3.0 in FIG. 1) that is suited to and that is refined based on implementation of the recipe 30 at the pilot plant 36.

Next, as illustrated in FIG. 1, the recipe 40 may be used to develop one or more site recipes 42A and 42B for various different commercial grade production plants 50A and 50B. The recipes 42A and 42B may be altered to take into account the various scales and sizes of runs to be implemented at the production sites 50A and 50B as well as the particular equipment at these plants, and may be used to produce master recipes 52A and 52B for the sites 50A and 50B. Once again, however, the site recipes 42A and 42B need to be refined or changed or adapted to use different categories of and/or types of equipment than used in the pilot plant 36. As an example, the production plants 50A and 50B may include still further or other automation systems or execution systems that need to be programmed or set up, such as data historians, process control configuration systems, auditing systems, data collection systems, manufacturing execution systems, etc. Likewise, various audit or regulatory testing systems be need to be set up to enable government or industry oversite of the process or the product being manufactured by the process at a commercial grade. Again, this programming and site specific implementation of the site recipes 42A and 42B takes time and significant know-how of still other individuals or plant personnel knowledgeable about the specific equipment at the plant 50A and 50B.

As illustrated in FIG. 1, a typical process development methodology occurs in series, such that the development of the process or recipe steps through each of a set of different development and production stages in order, requiring one to be completed prior to starting the next. Moreover, typically, vastly different types, sizes and configurations of process equipment are used at each different stage of the development cycle, which requires personnel having different skills and knowledge bases to become involved at each different stage of the development and production cycle to implement the process in the different stages. These factors means that a significant amount of time and effort is required to get through the overall process development lifecycle for a product. In fact, new drug formulation and production roll-out can take years to perform because of the time it takes to step through each of the development stages, and the time needed to implement a recipe at each different stage on different plant equipment, at different scales. Thus, as will be understood from the description of FIG. 1, a typical process development lifecycle for, for example, a new drug, can take a great deal of time and typically requires the iterative development of a process recipe through various different process plants or process sites during different stages of the process development in order to create and test a recipe and develop the recipe in a manner that enables it to be used in commercial scale production. Because these operations have to occur serially, typically first in the lab, and then at further small scale development plants and then at small production plants such as at pilot plants, before being used in a commercial scale plant, it can take a great deal time to develop a process recipe for a commercial grade product.

Figure 2:
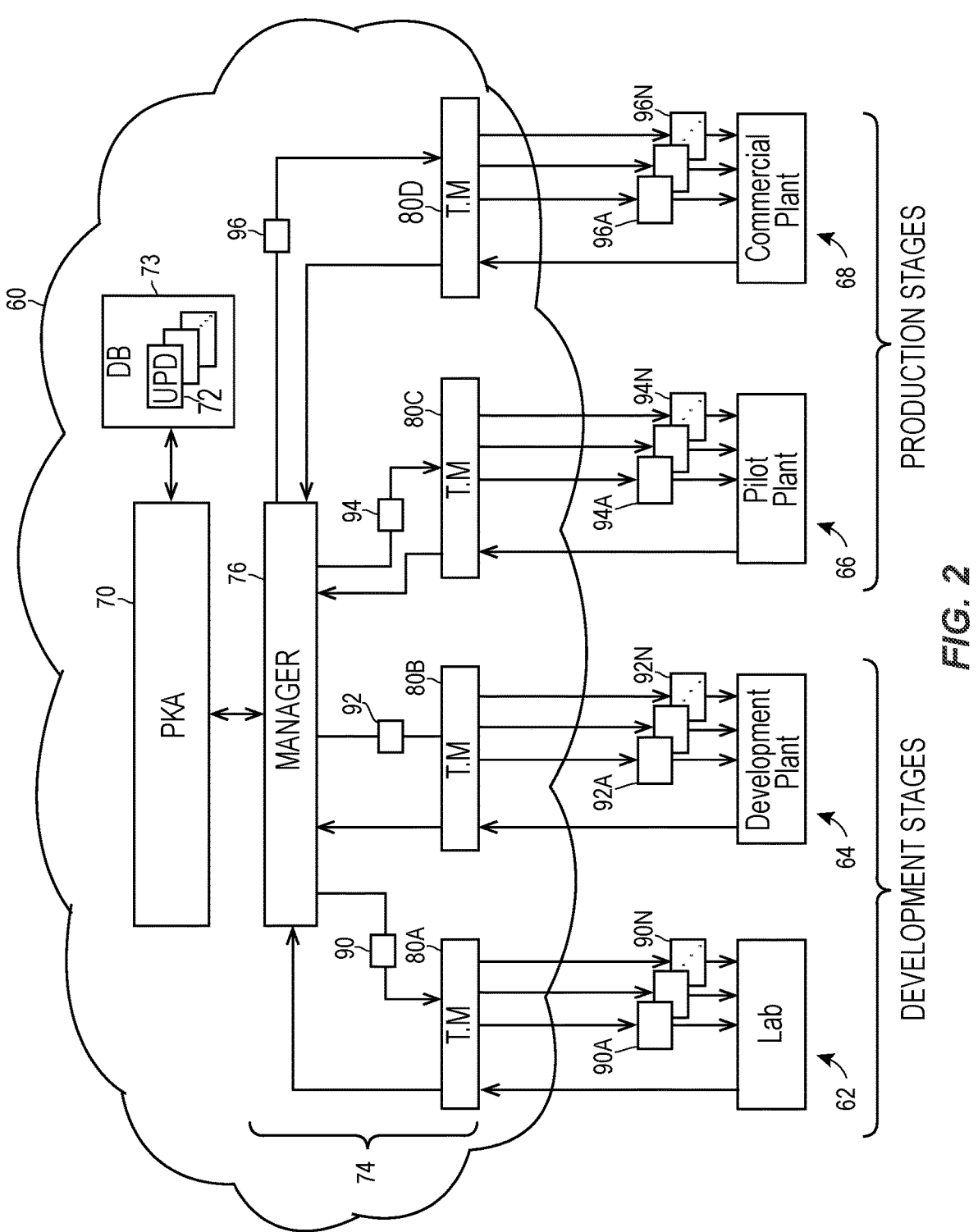
FIG. 2 illustrates a process development and management methodology using a process development and management system and methodology as described herein to make process development and deployment quicker and easier than traditional prior art methods and systems.

A process development and management system (PDMS) as described herein operates to provide specific structure to the process development lifecycle described with respect to FIG. 1 to decrease the overall time it takes to progress through the lifecycle. In particular, the PDMS described herein enables more flexibility in creating and refining a process for implementation and testing at various different stages of a process development lifecycle in order to reach commercial scale production, reduces or eliminates some or most of the manual integration and implementation steps needed or used during a typical process development lifecycle, reduces the reliance on personnel at various different plants having specialized knowledge to implement a process at the various different stages of a process development lifecycle, and thus significantly reduces the amount of time it take to perform a process development cycle. FIG. 2 illustrates a process development and management system (PDMS) 60 as described herein which may be used to manage a process development lifecycle through or with respect to the various different process development, implementation and production stages, including various development stages, such a laboratory based development stage 62 and a small scale development plant stage 64, as well as various production stages, such as a pilot plant stage 66 and a large commercial grade production plant stage 68.

Generally speaking the PDMS 60 of FIG. 2 operates to enable one or more users to create and manage one or more universal process definitions (UPDs) which may then be used to implement processes described or associated with the UPDs at various different plants or sites in any desired order and at any desired time. Generally speaking, the PDMS 60 includes a process knowledge administration (PKA) system 70 that manages the creation, development, alteration and deployment of one or more UPDs 72 (illustrated as being stored in a database 73 in FIG. 2). Generally speaking, each different UPD 72 defines a process to be implemented in a very generic manner such that the defined process can, at some level, be universally applied to or used to control the operation of different plants or production facilities (sites) which may differ in size, capabilities, categories or types of equipment that are available, execution systems that used to control or manage the process equipment, feedback or data collection systems used to monitor the process equipment or process, etc. Generally, each UPD 72 will include a description or a list of a set of operations to be performed as part of the defined process, a set of materials to use in the defined process, a sequence or ordering for the set of steps for the defined process, and relative quantitative or sizing information such as ratios of different materials to use in the defined process or an example set of material quantities for a specific size of run or throughput of the defined process. Moreover, each UPD may include data regarding or defining, in some manner, equipment to use for implementing the defined process and important data associated with the defined process, such as control data including control values, limits, ratios, amounts, etc. for use in controlling the defined process, feedback variables or measurements to collect before, during or after operation of the defined process, audit or regulatory variables that need to be collected or obtained for the defined process before, during or after a run of the defined process, etc. Of course, these are but a few of the components of the universal process definition. As will be understood, the process definition information in the UPD is generally equipment agnostic and so does not generally (although it could in some cases) specify particular equipment to use in implementing the defined process. As such, the UPD is not particularly specific with respect to particular equipment on which the process is to be run or with respect to the particular sizing or throughput of the process. As a result, a UPD is not exclusively tied to any particular plant, site or plant equipment that may be used to implement the defined process during an actual run or implementation of the defined process but, instead, a UPD can be run or used to implement a process at various different sizes or throughputs, and at various different types of plants and plant equipment that may implement different stages of a process creation and management lifecycle.

As illustrated in FIG. 2, the PDMS 60 includes a transformation engine 74 that, generally speaking, uses the UPDs 72 managed at the PKA system 70 to create files, instructions or programming to be used in particular plants or sites associated with one or more of the process development stages 62, 64, 66 or 68. As will be understood, the transformation engine 74 uses a particular UPD 72 to create instructions or files that may be deployed to and used in various different process facilities, plants or sites at any time and in any order to implement a process defined by the UPD 72 being transformed. Thus, in conjunction with the PKA 70, the transformation engine 74 operates separately on a UPD, to transform the UPD into site specific information or files, referred to herein as process definition implementation files (PDIFs) that may be used by a particular site or facility 62, 64, 66, 68 to implement the process defined by the UPD. As such, the transformation engine 74 creates or assists in creating site specific technology that can be sent to, implemented at or used at a particular site more easily to initiate, run, test and collect data regarding a process as defined by a particular UPD 72. Information from the site run of the process defined by a UPD can then be provided back to the transformation engine 74, which interprets this feedback data to produce more generic feedback data associated with the UPD, and this generic feedback data can be used at the PKA system 70 to alter or change the UPD to make the UPD more applicable to the particular site or type of site at which the process run occurred, to account for scale changes in the process defined by the UPD, to account for equipment or execution system differences or particularities at the site at which the process was run, etc.

Importantly, the PDMS 60 may implement a particular UPD 72 at various different plants or sites, such as those associated with different development facilities (e.g., laboratories 62 and small scale development plants 64), as well as those associated with different production facilities or sites 66 and 68, in any order and even simultaneously if desired, to speed up the process development lifecycle. Moreover, the PDMS 60 operates to automate some if not many of the steps or activities needed to roll out or implement a generally defined process at a specific site or plant, including, for example, steps needed to set up the control systems, the data collection systems, the auditing systems, etc. at various different plants or sites, thereby making roll-out to different sites quicker, more seamless and involve less plant personnel interaction or oversight. Still further, the PDMS 60 may automatically acquire or perform roll-outs of a process to various different plant sites or facilities in a manner that defines, automates and assures collection of feedback data needed to monitor and analyze the implementation of a process at different plants or sites, thereby enabling quicker review and analysis of a process, as implemented at a site or facility, which leads to quicker alteration and development of the overall process.

Referring again to FIG. 2, the PKA 70 enables one or more users to create, manage, change and store one or more UPDs 72. Moreover, the PKA 70 enables a user to select a particular UPD 72 and to deploy that UPD at one or more particular sites, such as a laboratory site 62, a development plant site 64, a pilot plant site 66 or a commercial plant site 68. Of course, here, the user may select a specific site or a specific type of site, e.g., based on the development stage of the process being developed and managed. As illustrated in FIG. 2, the same UPD 72 may be provided to any number of different sites or plant facilities either at the same time or at different times. In this case, a transform manager 76, which may be part of the transformation engine 74, may interface with or spawn off (e.g., create) one or more site transformation modules 80, which execute on one or more computer processors to perform various activities with respect to the deployment of the selected UPD to a particular site or set of sites. In this case, a first site transformation module 80A is associated with or interfaces with a laboratory facility 62 having mostly manually implemented equipment, for example. Moreover, a second site transformation module 80B is associated with or interfaces with a development plant facility 64 which may have small scale equipment for implementing a process with some, but possibly limited automation systems. A third site transformation module 80C is associated with or interfaces with a pilot or test plant 66 which may have some amount of automation equipment and testing and data capture capabilities, along with more advanced automation and execution systems. Still further, a fourth site transformation module 80D is associated with and/or interfaces with a commercial grade manufacturing facility or plant 68, which may have even more automation systems, testing facilities, audit systems and other execution systems, applicable for full scale commercial production. While only four site transformation modules 80 are illustrated in FIG. 2, it will be understood that each site transformation module 80 may interface with more than one specific site or that additional transform modules may be used to interface with additional sites of any type. Thus, multiple different site transformation modules 80 within the PDMS 60 could interface with specific sites that are associated with the same process development stage, such as multiple laboratories, multiple pilot plants, multiple commercial production plants, etc. Moreover, the same site transformation module 80 could interface with multiple sites capable or suited for the same process development stage. Still further, the same site transformation module 80 could interface with multiple different sites capable of or suited for different process development stages. Still further, it will be understood that a "site" or a "facility" as used herein may include any logical or physical grouping of plant equipment, and may include equipment at the same or at different physical locations. Moreover, different sites or facilities may be at the same physical location and may, for example, represent a line of equipment at a plant, a building of a plant, an area of a plant, a logical grouping of similar equipment located at the same or at different physical plant locations, etc. Moreover, the four sites 62, 64, 66, 68 to which the PDMS 60 is connected in FIG. 2 are for example purposes only, and the PDMS 60 may be connected to more or less sites, other types of plant facilities or sites, multiple ones of the same types of plant facilities or sites having the same or different sizes, types of equipment, execution systems, etc. Moreover, the PDMS 60 may connect to and disconnect from the various sites 62, 64, 66, 68 at any time, may connect to any combination of these sites simultaneously or in an overlapping manner, etc.

As noted above, the PKA system 70 of the PDMS 60 manages or oversees the creation of, storing of, manipulation of, changing of and downloading or deployment of UPDs 72 for execution at or on any of the sites 62, 64, 66, 68 at the same or at different times. Generally speaking, a user of the PKA system 70 will create a particular UPD 72 and store that UPD in the memory 73. In some cases, as described below, UPD development modules may be executed to develop one or more UPDs for a process based on feedback from a lab, plant or other facility that implements the process. In any event, at this level, the PKA system 70 enables a user to create, view, change, modify and otherwise manipulate the particular UPD by adding or deleting data fields therefrom, by adding, deleting or changing data in one or more of the data fields of the UPD 72, by changing and tracking the version of the particular UPD, etc. Moreover, when ready, the PKA system 70 enables a user to deploy or apply a particular UPD to a particular site, such as one of the sites 62, 64, 66, 68, for implementation at the selected site. As part of this deployment, the PKA system 70 may enable a user to select or specify a particular site (e.g., one of the sites 62, 64, 66, 68) for deployment. In some cases, however, the user may instruct the transformation engine 74 to select a specific site for deployment based on criteria within a UPD and/or based on the stage at which the process development exists. In still other cases, the user may instruct the transformation engine 74 to determine one or more sites at which deployment could take place based on criteria within a UPD and/or based on the stage at which the process development exists and to provide the user with a list of potential sites from which the user may select for deployment. In the latter two cases, the transformation engine 74 may analyze data from or about each of a set of sites to determine the suitably of each site for implementing the process, such as if the sites include the appropriate or necessary plant equipment to implement the process defined by the UPD, whether the site is suitable for the development stage at which the process development cycle exists, whether the site includes or has available particular materials needed in the process, or has particular types of execution, testing or data collection systems or equipment needed to implement the process and provide desired feedback of process operation, etc. In some cases, the transformation engine 74 may rank different sites based on the suitability of each site for implementing the process at the current stage of development and/or based on the specifics of the equipment at the site.

In any event, when a particular site is selected for deployment, the transformation manager 76 provides the particular UPD to one of the site modules 80 (or spawns a site module 80) associated with the selected site. The site module 80 then preforms one or more transformations on the UPD to produce one or more site specific instructions or files that define specific technology, programming and/or steps to be implemented at the site as part of implementing the process defined by the UPD. To perform the transformations, the site modules 80 store or have access to various site specific information or data including, for example, the categories and types and particulars of the plant equipment at the site (including for example, sizing, specification and connectivity information about the plant equipment, such as process instrumentation diagrams (PI&Ds) at the site), details about the execution and automation systems located at the site and the manner in which these execution systems are connected to and control or monitor equipment at the site, the data collection systems or capabilities at the site, the testing facilities and equipment at the site, communication and control protocols used at the site, etc. Of course, execution systems at the site may include control systems, configuration systems, management execution systems, manufacturing operations management systems, auditing systems, asset management systems, historians, etc. present or available at the site. During a transformation operation, as explained in more detail below, the site transformation module 80 analyses the UPD and determines the plant equipment at the site needed to be used to implement the UPD. The transformation module 80 then determines one or more instructions, programming files, configuration files, data collection instructions, execution system configuration or instruction sets, etc. to be used to set up, program or implement the process as defined by the UPD at the selected site using the actual equipment at the site. These instructions, configuration files, etc., which will be referred to generally herein as process definition implementation files (PDIFs) may take any desired form and may include or be any desired combination of complete instructions that may enable to site or equipment at a site to operate to implement the process automatically, or may be smaller in nature, such as basic building blocks of programs or instructions, such as control modules, PLC logic, execution system flow charts, etc., that may be used by personnel at the site to program or set up the equipment at the site to perform the process defined by the UPD. Moreover, these instructions or files may include manual operations and/or lists of standard operating procedures (SOPs), or definitions of any other manual, semi-automated or automated steps that should or that need to be implemented to perform the process defined by the UPD at the site. Of course, the PDIFs may include other types or natures of instructions that may be implemented directly by plant equipment or execution systems at the site, that may be used or modified by personnel at the site to program or set up equipment or execution systems at the site, to take manually implemented steps at the site before, during or after the execution of the process at the site, etc.

In any event, the site transform module 80 then provides the PDIFs (which can be in the form of real-time instructions, downloadable files, or any other data string or variable type) to the site for which they were created and these files or instructions are used to program, control or otherwise operate equipment at the site or personnel at the site (or any combination of the two) to implement the process at the site. As illustrated in FIG. 2, in response to the execution management system providing a UPD 90 to the site transformation module 80A, the site transformation module 80A creates and provides a set of PDIFs 90A to the laboratory facility or site 62. As noted above, the UPIFs 90A, which may include numerous different sets of programs or instructions for different plant equipment and execution systems, may be used to program, instruct, cause or facilitate set up and operation of some are all of the process equipment and execution systems (if any) at the lab facility 62 (or personnel at the lab facility 62) to implement the process defined by the UPD 90. The PDIFs 90A may include a description of feedback data and/or instructions for obtaining, collecting and providing feedback data, as specified in the UPD 90. This feedback data may then be collected during a run of the process defined by the UPD 90 at the laboratory facility 62, and is provided back to the site transformation module 80A which may associate the collected data to the specific data or portions of the UPD 90 to which they relate. This feedback data may then be provided to the transformation manager 76, which may present this data to a user (e.g., via the PKA system 70) for viewing and analysis by one or more process developers. Additionally, or instead, the site transformation module 80A or the transformation manager 76 may perform some analysis of the feedback data to assist a process developer in analyzing the operation of the process at the site 62.

At this time, the process developers may alter or change the UPD 90 to change the definition of the process, to augment that definition, to specify additional or different data to be collected or testing to be performed, etc. The changed UPD (which may be referred to herein as a different version of the UPD) may be provided back to the transformation engine 74 which then uses the transformation manager 76 and the transformation module 80A to create a new set of PDIFs or instructions 90B (or which alters previously created PDIFs or instructions based on the changes made to the UPD 90) and sends the new PDIFs 90B to the site, in this case the laboratory site 62, for implementation. The site facility then implements the new process as defined by the changed or new version of the UPD 90 and provides more feedback data for further analysis and to enable further changing of the UPD 90 based on this additional feedback data. Thus, as illustrated in FIG. 2 for the laboratory facility or site 62, multiple UPDs or versions of a UPD 90 may be used to create multiple PDIFs 90A-90N, to be implemented at the same facility 62. Of course the various versions of a UPD 90 may be implemented serially or iteratively at the facility 62 such that feedback from implementation of one version of the UPD 90 may be used to create the next or a subsequent version of the UPD 90. However, alternatively, multiple different versions of a particular UPD 90 may be implemented at a facility (e.g., at the laboratory site 62) at the same time or sent to a facility to be implemented prior to feedback from the runs of those implementations being made available to the transformation manager 76 or the PKA system 70. For example, a process developer may create different versions of a particular UPD and use the transformation engine 74 to implement them at a facility, such as a laboratory or a development plant, and then compare the outputs or results of the two runs (and thus the two UPD versions) to determine which resulted in the best performance, or to observe the positives and negatives of each UPD, to assist in creating a still further version of that UPD. Such simultaneous implementation of the different versions of a UPD (at the same or at different sites or facilities) may lead to more quickly honing in on a final UPD for implementation on a production scale.

Moreover, as illustrated in FIG. 2, a process developer may repeat or implement a similar process of deploying a UPD at other or different sites, e.g., the sites 64, 66, 68 of FIG. 2, either after deploying the UPD 90 at the site 62, or simultaneous with or overlapping the deployment of the UPD 90 at the site 62. Thus, the process developer may send a UPD 92 to the transformation module 80B which converts or transforms the UPD 92 to one or more PDIFs 92A-92N (using site equipment data defining the equipment at the site 64) which implementation files are used to run or implement equipment at the site 64 and provide feedback to the process developer. Additionally, the process developer may send a UPD 94 to the transformation module 80C which converts or transforms the UPD 94 to one or more PDIFs 94A-94N (using site equipment data defining the equipment at the site 66) which implementation files are used to run or implement equipment at the site 66 and provide feedback to the process developer for this stage of process development. Likewise, the process developer may send a UPD 96 to the transformation module 80D which converts or transforms the UPD 96 to one or more PDIFs 96A-96N (using site equipment data defining the equipment at the site 68) which implementation files are used to run or implement equipment at the site 68 and provide feedback to the process developer for this stage of process development. It will be understood that the UPDs 90, 92, 94 and 96 described herein may be the same UPDs or may be different versions of the same UPD such that the UPD 94 may be a later version of the UPD 92 and a still later version of the UPD 90. However, the system 60 supports a process developer if the developer wants to send the same UPD (e.g., the same version of a UPD) to different sites at the same time or at different times. In this manner, the process developer can implement the same UPD at the same time on different process equipment to simultaneously implement different process development stages. Moreover, the process developer can simultaneously implement different versions of the same UPD on the same facility or site, at the same types of facilities or sites (e.g., simultaneously at different pilot plants or simultaneously at different development plants) or even simultaneously on different types of facilities or sites to thereby speed up or shorten the process development lifecycle. Still further, if desired, the process developer may use the system 60 to alter the typical sequencing of the development of a process (and thus a particular UPD) by skipping one or more typical process stages. For example, a process developer could use the system 60 to produce a UPD at a laboratory site and then deploy that UPD directly in a pilot plant site, skipping the development plant testing stage. Likewise, the process developer could implement different stages of the process development lifecycle in any desired order other than the typical order described herein. Still further, a process developer could have the system 60 automatically propagate changes made to a UPD (e.g., based on a development plant testing) to other sites at which that UPD is being implemented. In this case, as an example, a new version of a UPD created using feedback from a development site may be provided to and deployed at a pilot plant that is also executing a process based on the original UPD, to change the implementation of that process to implement the new version of the UPD.

Thus, as will be understood, the same UPD or different versions of the same UPD may be downloaded and deployed at different ones of the sites 62-68 for implementation at different times, may be sent to different ones of the sites 62-68 for implementation at the same time or at overlapping times, etc. Moreover, the system 60 may enable a user to view feedback from the various sites in the form of data collected from the various sites when running or implementing a UPD and use this data to change the UPD as stored in the database 73. If desired, the user may then provide a changed or updated UPD to the same site for implementation or to another site that is currently in the process of implementing that UPD to update the running of the UPD at the second site.

Thus, the PDMS 60 described herein functions and operates to enable the development time of a process to be reduced significantly as it provides for faster development of a process by enabling various activities of the development cycle to be automated or semi-automated (e.g., at the transformation engine 74) in order to speed implementation of a process being developed at different sites or facilities, which might be of different sizes, which may use vastly different process equipment and automation systems, and which may be associated with different stages of process development. The PDMS 60 also eases the implementation of a particular UPD at any particular site or facility by providing some automated conversion of the UPD into data, files, instructions, etc. that may be used at the site to program equipment and systems at the site to implement the process, thereby reducing the need for personnel with highly specialized site knowledge from needing to be involved.

Figure 3:
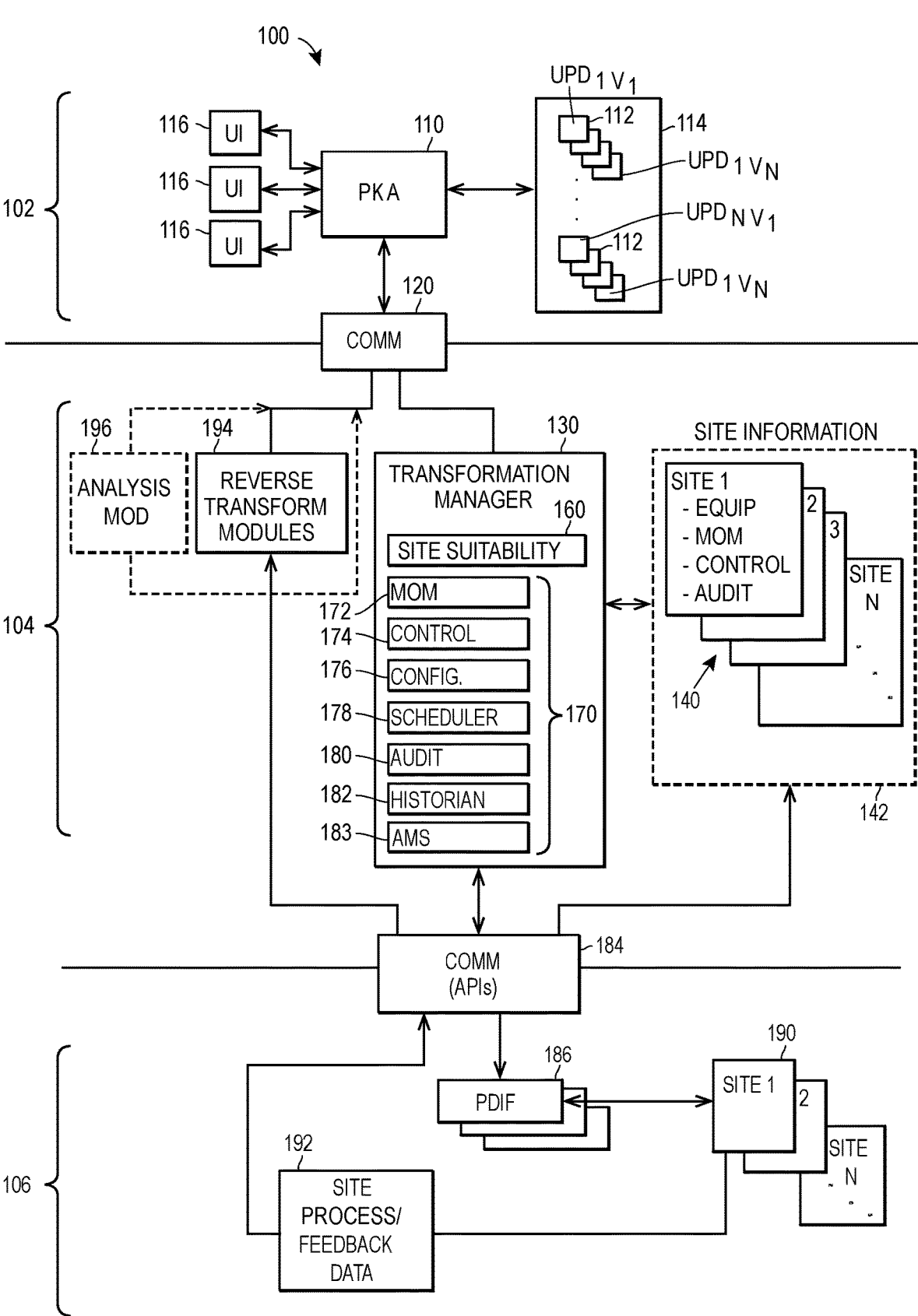
FIG. 3 illustrates an example process development and management system as described in more detail herein including a process knowledge administration layer, a transformation layer and an execution or site layer.

FIG. 3 illustrates an example process development and management system PDMS (and method associated therewith), such as the PDMS 60 of FIG. 2, that may be used to speed up (reduce) the timeframe in which a process can be developed and deployed in different sites or plants or facilities. In particular, a process development and management system PDMS 100 includes a process knowledge administration layer 102, a transform layer 104 and a process plant or site layer 106 which are communicatively connected to one another by any desired communication systems or technology, such as with a wired or wireless WAN, LAN, public or private internet, a telephone communication system, etc.

Generally speaking, the process knowledge administration layer 102 provides a development environment for a process developer to create, store and manage one or more universal process definitions (UPDs) and also enables the process developer to deploy the UPDs at any time, and in any order or sequencing, at particular process sites or facilities. As noted above, the UPDs define a process in a generic or process equipment agnostic manner, and so generally do not specify particular process equipment to be used, a particular process size or throughput, etc. As such, the UPDs can be used at different plants, facilities or sites, such as at development and production facilities of different sizes, at plants or sites having different types and layouts of equipment, at sites having different control mechanisms or infrastructure, at sites having different data collection systems or methodologies, etc. The process knowledge administration layer 102 provides the UPDs at different times to the transformation layer 104.

Generally speaking, the transformation layer 104 (which may implement the transformation engine 74 of FIG. 2 including the transformation manager 76 and the transformation modules 80 of FIG. 2) operates to receive UPDs and to convert the UPDs into one or more sets of data files or instructions (PDIFs) that are then provided to a particular plant or site facility in the site layer 106. As described in more detail herein, the transformation layer 104 applies one or more transform modules or analysis routines to the information in the UPD to create various different sets of instructions, data files, programming files or other PDIFs that are then provided to a particular plant or facility. These process implementation files may be used to direct or program controllers, data collection systems, management execution systems, or other manual or automated systems at the plant or site to cause specific equipment at the plant or site to implement the process defined by the UPD or to assist an operator or other personnel at a site to configure, set up, program and/or run the equipment at the site to implement the process. As noted above, the transformation layer 104 may operate on the same UPD to provide different instructions or sets of implementation files to different plants or sites in the site layer 106 so as to implement the process defined by the UPD in different plant settings (using, for example, different plant equipment to run the process at different scales). The different plants or sites might be different types of plants such as development plants, laboratories, small scale or large scale manufacturing plants, commercial grade manufacturing plants, etc., or may be the same types of plants. As will be understood, these different plants or sites may use the same or may use different types, sizes and configurations of equipment to implement the process. Moreover, the transformation layer 104 may provide different implementation instructions or files for different types of systems at a particular plant or site, such as for different execution systems within a particular plant. Thus, the transformation layer 104 may provide one type of file or set of instructions for programming or for use by a manufacturing execution system at a plant, a second set of programming or configuration instructions for use by a control system at the same plant or facility, a further set of instructions or programming for a historian at the same plant or site, and one or more still further sets of instructions for use in programming a batch scheduler, an audit system, or other type of execution systems used at the plant.

Still further, the transformation layer 104 illustrated in FIG. 3 provides the created implementation files (PDIFs) to the site layer 106 via one or more communication systems such as one or more application programming interfaces (APIs). Again, as illustrated in FIG. 3, the PDIFs (implantation files) may be provided to a particular plant or site and these files or instructions may be used to at a particular site in the site layer 106 to program or control equipment at the site or may instruct users or otherwise assist users at the site to implement the process defined by the UPD on particular equipment at the site. As noted above, different ones or sets of these implementation files may be provided to different execution systems in a plant or site, such as a real time control execution system, a MOM or MEM execution system, a configuration system for configuring one or more controllers or creating control modules for one more controllers, a scheduling system (such as a batch scheduler) at the site, a historian used for data collection at the site, an audit system for collecting FDA or other required audit data from the operation of the plant or site, an asset management system at the site, etc.

Still further, data collected at each site in the site layer 106 during one or more runs of the process at the site is returned to the transformation layer 104 where this data is processed to convert the site specific feedback data into more generic data associated with the UPD, so as to, for example, align those feedback variables with the variables or other data defined by the UPD. This reverse transformation which is performed at the transformation layer 104 may be performed to provide a process developer with the ability to view or understand how and in what manner the converted UPD operated in the specific site context. Such feedback may include data of any desired type, such as quality variables associated with the process or the product produced by the process, timing variables, control variables or values (e.g., setpoints, limits, etc.), changes made to the process at the site layer 106 to implement the process at the site, different types and or specificity of equipment that were used in the process at the site, and any other feedback variables that might be viewed as being beneficial to understanding or analyzing the operation of, or affecting the operation of the process in the particular environment of the site at which the process was implemented. Of course, different types of variables may be implemented or provided from different types of sites or from different types of process runs at a particular site. Still further, the information that is provided back from the site layer 106 is transformed at the transform layer 104 into variables or list of differences or other feedback data associated with various components of the UPD and this transformed data is provided to the process knowledge administration layer 102 for review and potential action by one or more process developers at the PKA layer 102. This transformed feedback data may then be used by the process developer to change, update or further refine the UPD. This ability to provide and review feedback from the process runs at specific plants in a more generic manner enables the process developer to more quickly modify a UPD to operate better in various different environments, to make higher quality products (not only based on the actual steps of the process, but also based on the underlying process equipment or elements of the plants at which the UPD was deployed, the size and scale of the process implemented at a site, the actual materials used at a site, etc.) Still further, this feedback data may be provided to one or more analysis engines which may be, for example, difference engines, artificial intelligence based engines, etc. The analysis engines may operate on the feedback data from a particular plant, from multiple different plants running the same UPD, from runs of the process at different sizes or scales at the same or different sites, etc., to assist a process developer in modifying, augmenting or otherwise refining the UPD.

As more particularly illustrated in FIG. 3, the process knowledge administration layer 102 includes a process knowledge administration (PKA) engine 110 has access to one or more UPDs 112 which may be, for example, stored in a database 114. Additionally, the process knowledge administration layer 102 includes one more user interfaces 116 which may be coupled to the PKA engine 110. Generally speaking, the PKA engine 110 is programmed to interface with one or more users via the one or more user interfaces 116 (using wired or wireless communications) to create, develop, manipulate and deploy the UPDs 112 as stored in a database 114. As illustrated in FIG. 3, the database 114 may store any number of UPDs (e.g., $UPD_1$, $UPD_2$, $UPD_N$)

with each $UPD_x$ being associated with or defining a different process. Moreover, each $UPD_x$ may include one or more versions thereof (e.g., $UPD_1$, version 1; $UPD_1$, version 2, . . . $UPD_1$, version N) with each version generally defining the same process but representing a different development stage or development sub-stage or other contextual variable within the process development lifecycle. Thus, for example, different versions of a UPD may be developed for different development and production stages, for different types of plants or sites of the same development or production stage, for different scales or size runs of the process, or for any other reasons.

The various components of the process knowledge administration layer 102, including the PKA engine 110, the database 114, the user interfaces 116, etc., may be implemented on one or more processors which may be, for example, processors of a single computer or of multiple computers, processors executed in a cloud or at a specific user site, or in any other processing environment using any desired types of computer programming. As noted above, the PKA engine 110 includes programming instructions that, when executed on a computer processor, provide information to one or more users through the user interfaces 116 (which may be any desired type of interface including, for example, a computer user interface, a mobile phone or mobile device interface, a laptop or surface interface, a wearable interface, etc.) and enables a user or a process developer to interact with the user interfaces 116 to cause the PKA engine 110 to establish, create, modify, view, deploy or take any other action with respect to one or more of the UPDs 112. The PKA engine 110 may also enable a user to view feedback data from one or more sites at which a UPD was deployed to view and understand the operation of the UPD as currently configured.

When instructed to deploy a UPD, the PKA engine 110 sends one or more of the UPDs 112 to the transformation layer 104 via a communication interface 120. The communication interface 120 may be any type of communication interface, such as an internet based communication system, a LAN, a WAN, a telephone communication interface, etc. and may use any desired type of wired or wireless communication infrastructure, or a combination of both. Still further, during a deployment activity, the process developer may provide, to the transformation layer 104, an indication of a particular site or facility at which to deploy the UPD. In some cases, the user may use the KM system 112 may instruct the transformation layer 104 to determine the suitability of one or more process facilities or sites for implementing the UPD.

As illustrated in FIG. 3, the transformation layer 104 includes a transformation manager 130 and a set of site information files or data 140. The site information files 140 include data pertaining to each of the sites in the site layer 106 and, particularly, each site information file or set of data 140 includes information regarding or defining the process equipment at a site (such as the categories of, and types of process equipment at the site, the manufacturer and/or model and/or size of equipment at the site, the configured names or tags of equipment at the site, the model and/or serial numbers of equipment at the site, the communication protocols used by the equipment at the site, etc.), the execution systems at a site (e.g., the MOM, MEM, control, configuration, batch scheduling, audit, historian, AMS, etc. systems at a site), the testing and data collection capabilities and equipment at a site, the manner in which the process equipment at a site is configured, laid out or connected together (e.g., PI&D diagrams or other connectivity information from the site), information regarding the programming and configuration and communication set up and capabilities of the equipment at the site, and any other site specific information needed to understand and/or configure and/or run equipment at the site. The site information may be quite specific in that it may define process equipment and other execution systems at or associated with a site down to manufacturer and model number and even serial number in order to particularly define the equipment and the execution systems and any subsystems thereof, at a particular site. Moreover, the site information may define equipment and systems associated with a site as being any particular logical or physical grouping of equipment in any manner, such as particular equipment within a particular plant facility at a single location, equipment associated with physical equipment at different physical locations, similar sets of equipment within the same or different plants or plant locations, equipment associated with a particular area or building or line of a plant, similar equipment located at different physical locations or areas in a plant or even at different plants, etc. Likewise, the site information may be quite specific about the types of execution systems at or associated with a site, which execution systems operate to provide control, data collection, scheduling, configuration, etc. at a site. Likewise, the site information may specify or define one or more application programming interfaces (APIs) needed to interface with a site or with any of the equipment at a site. Still further, the site information files 140 may be collected from each site prior to use in the transformation layer 104 and may be stored in a database 142 in the transformation layer 104, may be provided to the transformation layer 104 from a site or a database in the site layer 106 associated with a site in real time in response to requests for information from one or more of the transformation modules 130, or any combination of the two.

As will be understood, the transformation engine 130 manages and initiates various different modules that may be executed at the transformation layer 104 on one or more computer processors at any desired location. The transformation modules may be implemented or executed in whole or in part at the same computer device at a single location (such as on the same computer processing device that executes any of the components of the process knowledge administration layer 102 or any other computer processor device), may be implemented on one or more computer processor devices in the cloud, may be implemented or executed on one or more computer processor devices at the sites in the site layer 106, or any combination of these. Thus, in some cases, different transformation modules may be operated or executed at various different locations or computer processors, such as at different plant facilities, to perform the operations described herein as being associated with the transformation layer 104.

As illustrated in FIG. 3, the transformation modules of the transformation manager 130 may include a site suitability module 160 and various site or equipment specific transformation modules 170. The site or equipment specific transformation modules 170 generally include transformation modules associated with different types of equipment and execution systems located at one or more of the sites in the site layer 106. The transformation modules 170 (which may be the transformation modules 80 used or spawned by the transformation manager 76 of FIG. 2) may be or include various types of analysis modules related to different execution systems at the sites in the site layer 106 including, for example, MOM transformation modules 172, control system transformation modules 174, configuration system transformation modules 176, scheduler system transformation modules 178, audit system transformation module 180, historian or data collection system transformation modules 182, asset management system (AMS) transformation modules 183, etc. Moreover, each type of transformation module 170 may include different specific modules for performing transformations with respect to each of various or different types of execution systems or process equipment at one or more sites. For example, the set of control transformation modules 174 may include different control transformation modules for operation on PLC control systems, on distributed process control systems, on manual executed control systems, etc. Moreover, other different, but more specific, control transformation modules may exist for different varieties of distributed controllers, such as one for the DeltaV control system, one for the Honeywell control system, one for an ABB control system, etc. Likewise, various different MOM transformation modules may exist for different types, varieties, brands, manufacturers, etc. of manufacturing operations management systems 170. Still further different configuration transformation modules 176 may exist or be created for different types, varieties, etc. of plant configuration systems. Still further, multiple different scheduler, audit, historian, AMS, etc. transformation modules 178, 180, 182, 183 may be created for different types, varieties, brands, manufacturers, etc. of these various execution systems. Still further, the transformation engine 130 may store or spawn different transformation modules for each specific site or for a set of related or similar sites. Thus, the control transformation modules 174 may include a different control related transformation module for use at two different sites and so transformation modules can be site specific, equipment specific, equipment type specific (e.g., for use on PLC controllers or on distributed controllers, etc.) Thus, the transformation modules 170 of FIG. 3 may be associated with any level or specificity of transforming, including site specific, execution system specific, type of site specific, or any combination of these).

In any event, the site suitability module 160 operates to receive a UPD and potentially other information (e.g., an indication of the development stage for which the UPD exists, the desired size of the run of the UPD, etc.) from the PKA 110 and determines the suitability of one or more sites for implementing that UPD. Generally speaking, the site suitability module analyzes the data in the UPD and uses the site information data 140 from one or more sites to determine if a particular site being analyzed is suitable for implementing the UPD for the desired purposes and sizing or scale of the run of the process associated with the UPD. The site suitability module 160 may operate on any information in or provided with the UPD (and/or specified by the process developer at the PKA 110) and may choose specific sites to analyze based on this information (e.g., does a site meet the development stage information associated with the UPD). Alternatively, a user or process developer may indicate the name of or provide an identifier for one or more sites to analyze for suitability.

In any event, the site suitability module 160 analyzes the site information 140 for each of the potential or selected sites with respect to the UPD to determine (1) if the site is capable of implementing the UPD, and (2) how suited the site is for implementing the UPD. In particular, the site suitability module 160 may first determine if the site includes the appropriate or necessary equipment to perform the steps or operations defined by the UPD, if the site has access to the materials specified by the UPD, if the site has the necessary testing or data collection facilities specified by the UPD, if the equipment at the site is capable of implementing the process at the scale specified for the UPD, etc. If the site suitability module 160 determines that a site is capable of implementing the UPD at the desired scale and for the desired purpose, the site suitability module 160 may then determine how suitable the site is for implementing the UPD. This activity may entail determining a suitability factor for a site based on a comparison of the site equipment and capabilities to information within the UPD regarding necessary, alternative and preferred steps, materials, data collection, testing facilities, etc. The site suitability module 160 may determine the suitability factor or suitability information using, for example, a weighting algorithm that provides or uses weights to determine relevant importance of different factors in the suitability determination. Of course, the site suitability module 160 may use other algorithms to determine a suitability for each analyzed site and may send suitability information back to the process developer at the process knowledge administration layer 102 for analysis and selection of a site. The suitability information may include, for example, a ranking of sites based on one or more calculated suitability factors, a list of pros and cons associated with each site, or any other information that may be helpful in determining a site to use.

In any event, when a site has been selected, either automatically by the site suitability module 160 or via feedback or direction from a process developer at the PKA layer 102, the transformation layer 104 (or a transformation manager 76 of FIG. 2 implemented in the transformation layer 104) may engage, create or spawn one or more of the transformation modules 170 to create one or more PDIFs or sets of instructions for sending to the a site in the site layer 106. Of course, depending upon the site at which the UPD is to be implemented, one or more of the transformation modules 170 operate on the UPD using the site information data 140 for the selected site to produce PDIFs including one or more sets of programming instructions, configuration instructions, scheduling instructions, etc. for various different ones of the execution systems and process equipment at the site. As an example, the configuration transformation module 176 may analyze the information at the site including the process equipment at the selected site, the specific type of control system at the site, etc., and may determine or generate one or more control programs, control modules, template control modules, PLC logic, etc. to be used in or by the control system at the site to implement a UPD at the site. The configuration PDIF or set of instructions may also or instead include information or instructions to be used by a configuration engineer at the site to create one or more control programs, to configure equipment, to specify what equipment (e.g., controllers, valves, transmitters, measurement devices, etc.) to use for those instructions, SOPs to implement before during or after running of the process using the UPD, etc. As another example, the MOM transformation module 172 may create instructions, flow charts or other programming data to be used by or at a particular MOM system at the site to thereby assist in programming the MOM to manage the runs of the process using the UPD. This data might include flow charts, user interface instructions, phase transition information, interrupts, alarm and alerts, etc. to be managed and implemented by the MOM system to create a management flow routine or a set of user interfaces, interlocks, etc. to be used by or at the MOM system when controlling the equipment at the site to implement the process defined by the UPD. Still further, the historian transformation module 182 may include program instructions for a historian at the site that may be used to configure one or more historians at the site as to what data to collect and store, how often to collect and store this data, alarms and alerts that should be set based on the data collection, etc. Likewise, the scheduler transformation module 178 may interface with a scheduling system at a site (such as at a batch scheduler at the site) to actually schedule one or more runs of the process at the site using specific site equipment or to provide information to a user at the site to set up a particular schedule using the scheduler at the site. As will be understood, an audit system transformation module 180 may develop files or instructions for or to be used to set up one or more auditing or other data collection systems at the site, including testing to be performed on the final or any intermediate product produced by the process, data to be collected and stored for auditing purposes, etc. Still further, an AMS transformation module 183 may develop files or instructions to configuring an AMS system to configure plant equipment, test or replace equipment needed for a process run using a UPD, change equipment setting, etc.

As will be understood, the transformation modules 170 may use the data about the sites, e.g., data specifying the particular the equipment and execution systems at a site, to create actual interfacing or programming instructions for that equipment, or other information used by personnel at the site to set up, run and/or analyze runs of the process at the site. The transformation models 170 may be automatic in nature, in that they may automatically create enough information or instructions to program or set up the execution systems at the site, may be manual in nature in that the transformation modules may provide data or instructions for a user or operator at the site to program or set up one or more execution systems at the site, or may be any combination of the two. In any case, the transformation modules 170 greatly enable and speed up configuration, set up and running of particular equipment at the site by providing at least some building blocks or information for personnel at the site to set up and implement a run of the process defined by the UPD. This, the transformation modules 170 may operate to significantly reduce the time that it takes to set up and operate different equipment at different facilities or sites to implement a process.

The PDIFs or implementation files or instructions produced by the transformation modules 170 may be provided to a particular site via a communication system 184 which may include one or more APIs that enable the different transformation modules 170 to communicate with different sites or even with different equipment at different sites so as to provide the PDIFs or other implementation files or instructions to the sites and to the equipment at the sites. Generally, the various APIs in the communication system 184 are used to convert or provide the information in the PDIFs as created by the transformation modules 170 into instructions, commands and information readable by and usable by different execution systems at the actual sites. As illustrated in FIG. 3, PDIFs or instructions 186 for the various execution systems for "site 1" (190) are provided to the site 190 and may be used at that facility or site to program, implement or instruct personnel at the site 190 on the manner and nature of programming, configuring and/or running the process on the equipment at the site 190. As noted above, the PDIFs 186 may be sent as files, or in real time as real time instructions, via the APIs of the communication system 184 to the site 190 for use by equipment or personnel at the site 190.

Moreover, as illustrated in FIG. 3, data collected before, during or after the operation of the site 190 (which data may be specified by the UPD and programmed to be collected as feedback data in the UPD), may be sent as site process/ feedback data 192 back through the communication system 184 to transformation layer 104. This data, which may be collected by and stored at a site may be provided back to the transform layer 104 either in real time running of the plant or as one or more separate data files sent at the same or at different times.

As illustrated in FIG. 3, one or more reverse transformation modules 194 may receive the site process/feedback data 192 and may operate as described in further detail herein to convert the site specific data back to more general data associated with the UPD used to generate the PDIFs used to run the process defined by the UPD and run at the site. The reverse transformation modules 194 may analyze the received or converted data in order to relate received or converted data to various portions of or sections of the UPD used to generate the site process/feedback data in order to enable proper attribution of the operation of the equipment at the site to the UPD. This feedback data may be analyzed within the reverse transformation module 194 either manually or automatically or using one or more analysis routines. The transformed feedback data and any analysis performed thereon may then be provided by the reverse transformation module 194 back to the PKA system 110 for review by a process developer. Still further, as illustrated in FIG. 3, the site process/feedback data 192 may be sent directly to the PKA system 110 via the communication system 120 for analysis by a process developer. Still further, the site process/feedback data 192 may be provided directly to one or more analysis engines 196, where it may be analyzed using any desired analysis routine, and the output of these analysis engines 196 may be provided back to the PKA system 110 via the communication system 120 for review and use by a process developer at the PKA system 110. It will be understood that the process developer may use the PKA system 110 (and the user interfaces 116 associated therewith) to view, analyze and use the site process/feedback data, the transformed site process/feedback data and any analysis information from any analysis performed on the site process/ feedback data or the transformed site process/feedback data to modify, augment and change information within the UPD used to create the site process/feedback data 192. The process developer may, for example, use this feedback data to create a new version of a UPD with different or changed data therein. Of course, while FIG. 3 illustrates the use of transformation modules 170 to create PDIFs for use at the site 190, it will be understood that the transformation modules 170 could also be used to create PDIFs for other sites (site 2, site 3, . . . , site N, in FIG. 3) in a similar manner either at the same time or at different times.

As will be seen, the entire system illustrated in FIG. 3 provides an effective platform and methodology for implementing the development, testing, creation and rolling out of a process at very different sites or plants or facilities at the same or at different times. Moreover, it will be understood that each of the components of the PKA layer 102 and transformation layer 104 of FIG. 3 may be implemented separately or at different locations, may be implemented in the cloud or at different distributed locations and/or may be implemented in whole or in part at a single location or at multiple different locations, including at one or more of the sites of the site layer 106. In some cases, it may be beneficial to implement the transformation layer 104 or portions of the transformation layer 104 at particular sites in order to safeguard proprietary or confidential information of the site.

FIG. 4 illustrates an example of a generic UPD 200 which may be created and stored in the PKA layer 102 of FIG. 3 and used to initiate execution of a process at various different sites or facilities in the manners described herein. The example UPD 200 of FIG. 4 is illustrated to provide example detail about what information may go into the UPD. However, the information within the UPD 200 of FIG. 4 is exemplary in nature and is intended to show only some of the categories, types and specific information that could be stored as part of a UPD. Thus, the UPD information illustrated in and described with respect to FIG. 4 is not limiting and, in some cases, is not necessary. Moreover, different UPDs for different types of processes may include different information or different groupings of information.

In general, the UPD 200 of FIG. 4 includes different categories of data or information and each of these categories of information may have different types or specifics of information stored therefor. Moreover, as will be understood, various categories, fields, subfields, etc. of data within the UPD 200 of FIG. 4 may be filled out, added to, augmented, expanded, removed, etc. during the development process of a UPD, based on various different runs of the UPD at the same or at different sites or facilities. Generally speaking, more fields and more specific data within each field of a UPD will be added as the UPD proceeds through an entire development lifecycle as, typically, more information about implementing the UPD is needed as the defined process is implemented on larger and more complex equipment typically associated with later development and production stages of the process development lifecycle.

More particularly, the UPD 200 may include a version field 202 which indicates the version of the UPD. Versioning may be performed in any desired manner and so the version field 202 may have any number of version fields, including for example, a value field and a stage designation field (e.g., there may be multiple version numbers associated with a particular stage of development). Of course, version numbers may be based on or may be incremented and be associated with a particular stage, with a particular scale, with particular types of sites or equipment at sites, etc. and so other version fields could be used in addition to or instead of the version fields illustrated in FIG. 4.

Still further, the UPD 200 may include any other number of data fields used to define a process including, for example, a steps or operations field 204, a sequence field 206, a materials field 208, a relative quantities field 210, an equipment field 212 and a significant operational parameters/data field 214. Generally speaking the steps or operations field 204 includes data associated with or defining various steps or operations performed as part of the process being defined. The steps or operations may define the particular activities or sub-processes that need to be performed as part of the process being defined. The steps or operations field 204 may include a list of operations such as mixing, heating, agitating, drying, cleaning, moving, rotating, filling, emptying, measuring, etc. or any other process steps that are to be implemented at some point in the process in order to produce the product that the process is designed to produce. The steps or operations field 204 may indicate if the any of the steps therein must be implemented in a batch or a continuous process or could be either. The steps or operations field 204 may indicate that certain steps or operations may be required or necessary steps, which means that they must be performed or implemented during the process, or may be indicated to be preferred steps or alternative steps. Thus, the fields of the UPD 200 may specify conditions for a value (such as a step or operation in this case) and such conditions may include specifying whether the value is necessary or required, in which case the process as implemented on equipment at a site, must include this value. Alternatively, a field may indicate if a value is preferred but not required (and so indicates that the value or component is preferred to be used but the process can use alternative values if need be.) Moreover, the field may indicate that a value is an alternative, which means that the value may be used as an alternative to another value, such as a preferred value. This necessary, preferred, alternative conditional designation will be referred to wherein as an N/P/A value or condition. The steps or operations field 204 may also include sub-fields associated with or defining one or more initial conditions for one or more of the specified steps, qualifiers such as transitional requirements for transferring between steps for one or more steps, etc. The field 204 may also include information specifying one or more manners in which a step or operation can or must be performed, such as whether the material in a step must be processed together in one unit or can be separated and implemented in multiple different units. Of course, other types of information defining steps or operations or data associated with defined steps or operations can be stored in or as part of the field 204.

Moreover, the sequence field 206 stores information that indicates the sequencing or timing to be applied to the steps or operations defined in the steps field 204. This information may specify the order of the steps, overlapping of steps, timing of steps, whether different steps can be performed at the same time or must precede or follow other steps, the interconnections between the outputs of one step and the inputs of another step, etc. The sequence field 206 may specify the implementation of one or more steps as being fixed in a particular sequence or adjustable to some degree, whether steps must be or may be performed in series or in parallel, transitional conditions or data associated with sequencing, etc.

The materials field 208 lists or defines ingredients, materials and/or material properties associated with materials used in the process, including raw materials, starting materials, ending materials, intermediate materials, etc. In some cases, the materials field 208 may store data indicating the N/P/A conditions for one or more materials or material properties or any other information about materials to be used in or produced by the process. The material properties may specify a value or one or more ranges of values for one or more material properties and whether these values or ranges are necessary, preferred or alternative. The material properties or materials defined by the field 208 may specify materials in any manner, such as by name, type, composition, manufacturer, material properties, etc.

Still further, the relative quantitative or relative quantify information field 210 specifies relative quantities for the materials, sequences etc. of the UPD to enable proper scaling of the process implemented using the UPD to different scales or manufacturing quantities. In some cases, the scaling information or relative quantity information may include ratios of different materials to be added or used, limits of amounts of materials, limits on the size (upper and/or lower manufacturing sizes) for which the UPD is applicable, etc. In other cases, the relative quantity information field 210 may specify an example process (such as particular throughput of a process) and may specify amounts of each of the materials, timing, etc. using in the example process, from which ratios and other scaling information may be determined. The relative quantity information enables the one or more transformation modules as described herein to determine amounts of materials, timing, limits, etc. when scaling the UPD up or down to be implemented at different throughputs or batch sizes. Of course the relative quantity information may be defined in any desired manner.

Likewise, the equipment field 212 may specify or define equipment that can or must be used in implementing the process defined by the UPD. The field 212 may define equipment at any level of specificity including a category of equipment (e.g., a mixer), a particular type of a category of equipment (e.g., a mixer having an agitator, or a mixer that combines two flow inputs, etc.), a brand of equipment, a manufacturer of equipment, a model number of equipment, etc. The field 212 may specify or define any of the equipment field values as being necessary, preferred or alternative equipment values. The equipment field 212 may also specify sizes of equipment (such as upper and/or lower limits on the size of a tank), initial conditions for various equipment (e.g., heated to a particular value, cleaned using a particular cleaner or cleaning method or standard, etc.), whether the equipment can be extended using multiple items, such as using two units instead of one, etc. The equipment field 212 may also define necessary, preferred or alternative properties of equipment, such as whether the equipment must be capable of processing caustic material, whether the equipment must be able to be used in a hazardous environment, whether the equipment is rated to be intrinsically safe, etc.

Still further the significant operational field 214 may define significant parameters associated with the running of the process, the monitoring of the process, and the collection of feedback data from the process. Significant parameters may include, for example, the times, ramp rates, limits, etc. associated with one or more of the steps or operations in the operations field 204, or one or more sequences in the sequence field 206. The significant parameters field 214 may define various control parameters and/or specific control values (e.g., set points, limits, times, flow rates, control system execution rates, etc.) associated with these control parameters and whether these values are necessary, preferred or alternative. Still further, the significant parameters field 214 may include values associated with testing of one or more variables, products, intermediate products, etc. produced by the process, such as the types of tests, the frequency of testing and/or the necessary, preferred or alternative values needed for the testing, etc.

Still further, as illustrated in FIG. 4, the significant parameter data field 214 may include audit related or regulatory data that needs to be measured, collected or stored for the process, the frequency of collection, the types or nature of measurement equipment to be used to perform the testing or measurement, and any other information regarding data to be collected before, during and/or after a run of the process to be used for auditing purposes.

Still further, the signification parameters field 214 may include specifications of the types and amounts of feedback data that needs to be measured and/or collected to be provided back to the process developer for analysis of the process run (e.g., to be collected as the site process/feedback data of FIG. 3). The feedback data may specify or identify, for example, control parameters, process variable parameters, equipment types, sizes and configurations as used during the run of the process at a plant, throughputs, material inputs, indications of changes made at the process by site personnel to run or implement the process, testing to be performed, quality measures associated with the output (or any input) of the process or with outputs (or inputs) of intermediate stages of the process, manual notes made by process operators or implementers, ambient conditions at the process, timing information, etc. This feedback data may include any data that the process developer or process operator may desire to see or record for the purpose of analyzing the process as run at the site and which the process developer may use to change, augment, modify etc. the UPD. Of course the significant parameter field 214 may include or specify any other types of data that are believed to be useful or needed for running the process, or for collecting data from the process for regulatory, auditing or feedback purposes.

Of course, not all of the data or the data fields illustrated in FIG. 4 may be necessary to be included in a UPD. However, as noted by the * in FIG. 4, it is generally considered that the steps or operations field 204, the sequence field 206, the material field 208 and the relative quantity information field 208 are the most important and typically necessary in any process definition. However, any and all of the information in the UPD and the various fields thereof can be used by the transformation modules described herein to create implementation files or instructions (PDIFs) for one or more sites, to collect feedback data from one or more sites and to assist in analyzing that feedback data for the purpose of further developing the UPD as it moves through the development and production cycle.

Figure 5A:
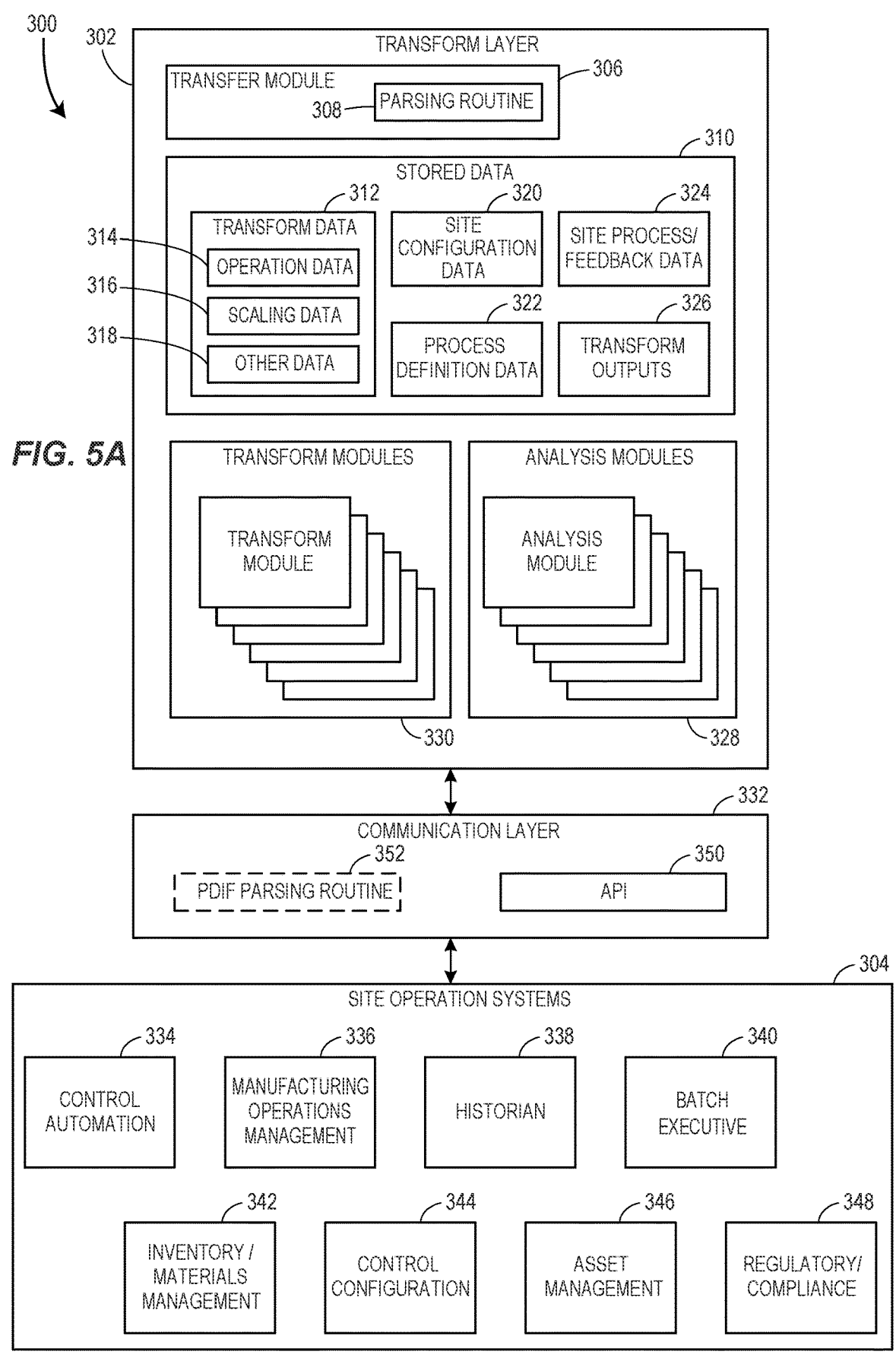
FIG. 5A illustrates in additional detail an example transform layer.

Turning now to FIG. 5A, a transform platform 300 is depicted in greater detail. At a high level, the transform platform 300 operates across multiple levels of the architecture and, as a result and as described above, the transform platform 300 may have elements operating with or in each of the layers of the PDMS 100, including the PKA layer 102, the transformation layer 104, and the site layer 106.

As depicted in FIG. 5A, the transform platform 300 includes a transform layer 302. Generally, the transform layer 302 may operate at a business unit level of an organization and/or at a site-level of an organization, and may even be split between multiple levels of an organization. The transform layer 302 generally operates as the interface between the PKA 102, which may generate and/or edit one or more universal process descriptions (UPDs) associated with the manufacturing, productizing, and/or packaging of a product, and one or more development or production sites at which the product may be produced, productized, and/or packaged. The transform layer 302 includes, among other things, the various elements, described below, that transform one or more equipment-agnostic UPDs into site-specific or equipment-specific process description interface files (PDIFs). The PDIFs may then be sent to, or used by, one or more site operation systems 304 to implement the necessary procedures and operations at the development or production site to manufacture, productize, or package the project and, in embodiments, may be used by the transform layer 302 to go so far as to actually program some or all of the site operations 304 to manufacture, productize, or package the project.

Each of the site operation systems 304 may correspond to an aspect of operation of a specific development or production site. Accordingly, a given development or production site may include zero, one, multiple, or all of the site operation systems depicted in FIG. 5A, and may include additional site operation systems that are not depicted in FIG. 5A. By way of example, FIG. 5A depicts from which data may be gathered for use by the transform layer 302, to which data generated by the transform layer 302 may be sent, and/or which may be programmed by the transform layer 302 explicitly to perform a particular process. As a result, and in view of the description that precedes and follows, it should be understood that at any given point, data from the site operation systems 304 may be consumed by the transform layer 302, or provided by the transform layer 302 to the site operation systems 304. Additionally, while the site operation systems 304 are depicted as separate systems, the functions contemplated by the systems depicted in FIG. 5A may be combined or further delineated. Still further, the functions associated with the systems depicted among the site operation systems 304 may operate independently or in concert with one another, as will be readily appreciated.

Briefly, the site operation systems 304 depicted in FIG. 5A include control automation systems 334, manufacturing operation management (MOM) systems or manufacturing execution systems (MES) 336, historian systems 338, batch executive systems 340, inventory/materials management systems 342, control configuration systems 344, asset management systems 346, and regulatory/compliance systems 348. As will be understood, these site operation systems 304 may differ between various development and production sites. For example, a small development site, such as a laboratory, is unlikely to have many if any of these site operation systems 304 and may instead have only a system for keeping electronic lab notebooks. As another example, a large continuous process site is unlikely to have a batch executive system 340 because it does not perform batch processing. Other sites may not have control automation systems 334 or control configuration systems 344 because the sites are not automated, as may be the case in a small development site. Further still, site operation systems associated with a particular industrial or manufacturing plant or site may include, for example, enterprise resource planning systems (ERPs), modeling systems, data management systems, electronic lab notebooks, laboratory information systems, other types of records management systems, and/or other systems which provide and/or consume data and information related to the particular plant or site. Simply put, the site operation systems 304 depicted in FIG. 5A are exemplary. Nevertheless, it is broadly contemplated that: control automation systems 334 are those that actively control a set of process equipment to perform a process; control configuration systems 344 are those that are used to perform configuration of control automation systems; manufacturing operations management systems 336 are those that govern or direct processes and procedures in a process plant by, for example, laying out manually performed process execution steps, maintaining and specifying the performance of various standard operating procedures, etc.; historian systems 338 are those that historize (i.e., store in an organized manner) parameters, variables, and other data associated with the execution of a process; batch executive systems 340 are those that carry out batch procedures, coordinate communication between phases, and allocate equipment and other resources required by a batch of a batch process; inventory/materials management systems 342 are those that track, order, move, various input materials to a process; asset management systems 346 are those that control or track the availability, status, maintenance and other aspects of equipment in a process; regulatory/compliance systems 348 are those that track data specifically required for regulatory or compliance purposes. (Relatedly, other systems, such as audit systems (not shown in FIG. 5A) may track data specifically required by internal processes for auditing. For example, audit systems may ensure that internal standards are achieved/maintained, may ensure that particular parameters are not changed without authorization, may track authorizations for changes, etc.)

A communication layer 332 serves as the interface between the transform layer 302 and the site operation systems 304. The communication layer 332 includes a variety of application programming interfaces (APIs) 350 that facilitate communication of information between the transform layer 302 and respective ones of the site operation systems 304. Of course, the communication layer 332 may include APIs 350 for multiple types of any category of site operation systems 304. For example, the APIs 350 may include a first API for communication with control automation systems sold by a first manufacturer (e.g., a DeltaV™ systems sold by Emerson), a second API for communication with control automation systems sold by a second manufacturer, a third API for communication with a first type of programmable logic controller (PLC), a fourth API for communication with a second type of PLC, etc. That is, the communication layer 332 may include APIs 350 for various different ones of each of the site operation systems 304. As will be explained in further detail below, the communication layer 332 may also, in embodiments, including a routine 352 for parsing data (e.g., PDIFs) to determine which data should be transmitted to each of the site operation systems 304.

Returning to the transform layer 302, a transfer module 306 may operate to receive one or more UPDs from the PKA layer 102 via the communication interface 120. In some instances and embodiments, the transfer module 306 may also operate to send one or more UPDs, process data, analysis outputs, and other data generated within, or received from the site operation systems 304 by, the transform layer 302, to the PKA layer 102. Thus, the transfer module 306 serves as the logical interface between the PKA layer 102 and the transform module 302, and operates to receive, retrieve, and/or request UPDs from the PKA layer 102. The transfer module 306 may itself include a parsing routine 308 that acts to parse the UPD to determine what data is present within the UPD. For example, the parsing routine 308 may look for headings or other indicia of a structured format for the UPD, and may use the headings or indicia to recognize data regarding the materials, operations, sequences, and quantitative information about the materials, as well as any optional data that are present in the UPD. The transfer component may store the data extracted from the UPD as process definition data 322 in a data store 310 for use by other modules and routines. In alternate embodiments, the UPD may be parsed or analyzed by one of a plurality of analysis modules 328 of the transform layer 302, with the process definition similarly stored as process definition data 322.

In addition to the process definition data 322, the data store 310 may also include a variety of other data. Site configuration data 320 may include data and information regarding the configuration of one or more of development or production sites, which data may be used by the transform modules 330 to transform equipment-agnostic UPDs into site-specific PDIFs, to determine which of a plurality of development or production sites is acceptable, appropriate, or preferred for a particular process, and to perform other analyses as described herein. The site configuration data 320 may be retrieved, via the communication layer 332, from various ones of the site operation systems 304. For example, the asset management system 346 may provide data about which equipment is present within its associated development or production site. The control automation system 334 may provide information directly regarding the configuration of the various equipment in the associated development or production site (e.g., how the equipment is connected, what automation systems are present, the capacities of various system components, etc.) or may provide control routines, control modules, function blocks, or other control objects from which one or more of the analysis modules 328 may derive the configuration of the various equipment in the associated development or production site. The batch executive system 340 may provide data about which equipment is currently available (or available at a particular time) to run a desired batch. The inventory/materials management system 342 may provide information regarding what input materials are available on site (and in what quantities) or can be ordered (and received by when). In this way, the site operation systems 304 provide information about each of the sites, which information may be stored as site configuration data 320 in the transform layer 302.

Site process and/or feedback data 324 may also be stored in the data store 310. The site process and/or feedback data 324 may be data that is received from one or more of the site operation systems 304 after execution of the process at the associated development or production sites. For example, the site process and/or feedback data 324 may be data stored by the historian system 338 at an associated development or production site and received and/or retrieved from the historian system 338 via the communication layer 332. While contemplated herein as being stored in the same historian system, it should be apparent that the process data (all data generated by the process and stored for later analysis, review, or other consumption) and the feedback data (data specifically requested by the PDMS 100 for use in updating, validating, analyzing, etc. the implementation of the process according to the UPD and the corresponding PDIF) may be stored in the same or different data stores among the site operation systems 304 and/or may be stored in the same or different data stores when retrieved or received by the transform layer 302.

The outputs of various ones of the transform modules 330 may be stored in the data store 310 as transform outputs 326. The transform outputs 326 may include PDIFs, as well as any other files or data generated by the transform modules 330.

The data store 310 may also include a variety of transform data 312. The transform data 312 include that that is used by the transform modules 330 to produce the transform outputs 326. One category of transform data 312 is operation data 314. The operation data 314 includes data pertinent to transforming the equipment-agnostic operations of the UPDs into equipment- or site-specific PDIFs. By way of example, the operation data 314 may include data associate various equipment classes, types, makes, and/or models that may be used to perform the equipment-agnostic operations specified in a UPD. For example, a UPD may specify an operation of "mixing" ingredients A and B. The operation data 314 may indicate generally that for an operation "mixing" there are several classes of equipment that could perform the mixing: two pipes combining flows into a single flow; a vessel with a stirring element; a vessel with an agitator; etc. The operation data 314 may indicate different types of equipment that are required or preferred for various types of input materials that are to be mixed based on viscosity, volume, whether the input material is wet or dry, etc. Thus, for any operation (mixing, heating, cooling, drying, extruding, etc.), the operation data may indicate classes of equipment, types of equipment, information about specific equipment, and relevant information for determining whether an operation (and, by extension, all of the operations of a process) can be executed on the equipment specified by the site configuration data 320 for a particular development or production site. Accordingly, the operation data 314 may also include, for any class or type of mixing equipment, manufacturer or model information for mixing equipment, volume/capacity data for specific models, and other relevant data for the mixing equipment, such that a transform module may determine, according to the site configuration data 320 and the process definition data 322, however specific the latter may be, how to configure the equipment in development or production site, whether the production or development site is capable of making the product at a particular desired scale (or at all), whether one development or production site is better than another production or development site, etc.

As alluded to, the operation data 314 may also include information about the properties of various input materials that may be specified by a UPD. For instance, the operation data 314 may include data regarding whether common input materials are caustic, explosive, etc. (and thus may require special handling or special equipment), the viscosity of the materials, whether the materials are wet or dry materials, maximum temperatures of the materials, the freezing and melting points of materials, etc.

Additionally, the transform data 312 may include scaling data 316. The scaling data 316 may indicate the various scaling parameters for different materials and/or operations. For example, the scaling data 316 may indicate for various materials whether they scale linearly for different processes, and/or may indicate how certain operation parameters change as a process is scaled up. With respect to the latter, for example, the scaling data 316 may indicate that for a heating operation, the time requirements for heating to a certain temperature or for achieving a desired reaction scale exponentially rather than linearly.

Other data 318 may also be included among the transform data 312. Such other data may include, by way of example and not limitation, control routine libraries and/or function block libraries for various specific equipment, for various specific equipment types, for various specific control automation systems, for various PLCs, etc. This other day 318 may further facilitate the transformation of UPDs into PDIFs and, in particular, into PDIFs that can be used by personnel at a particular development or production site to configure a process at the site and, further still, in embodiments, can be used by the transform layer 302 directly to configure the particular development or production site to perform the process.

It should be understood that part or all of the transform platform 300 may be located in a cloud computing environment, in some embodiments. However, there is no requirement that all components of the transform platform 300 reside in the cloud and, as a result, some components may located on individual workstations or servers at a development or production site, at a business operations center, etc. Additionally, components of the transform platform 300 may be executing on different systems or the same systems, and the systems on which components execute may vary according to the particular embodiment. That is, the platform as considered and disclosed herein is a logical arrangement of components, rather than a physical arrangement of components. For example, the transform modules 330 may be executed at the development or production sites, or at a central facility responsible for managing the UPDs and PDIFs, and the associated data (transform outputs 326, site configuration data 322, process definition data 322) may be stored locally to the transform modules 330, or remotely therefrom.

The transform modules 330 are each responsible for performing a transformation of data. The transform modules 330 may transform data from equipment-agnostic UPD to site-specific PDIF, may transform data from UPD to an intermediate form for later transformation by another of the transform modules 330, may transform data between intermediate forms, and/or may transform data from an intermediate form to site-specific PDIF. As such, the transform modules 330 may be specific to a type of transformation, in some embodiments, and/or may be specific to a particular development or production site in other embodiments.

Figure 5B:
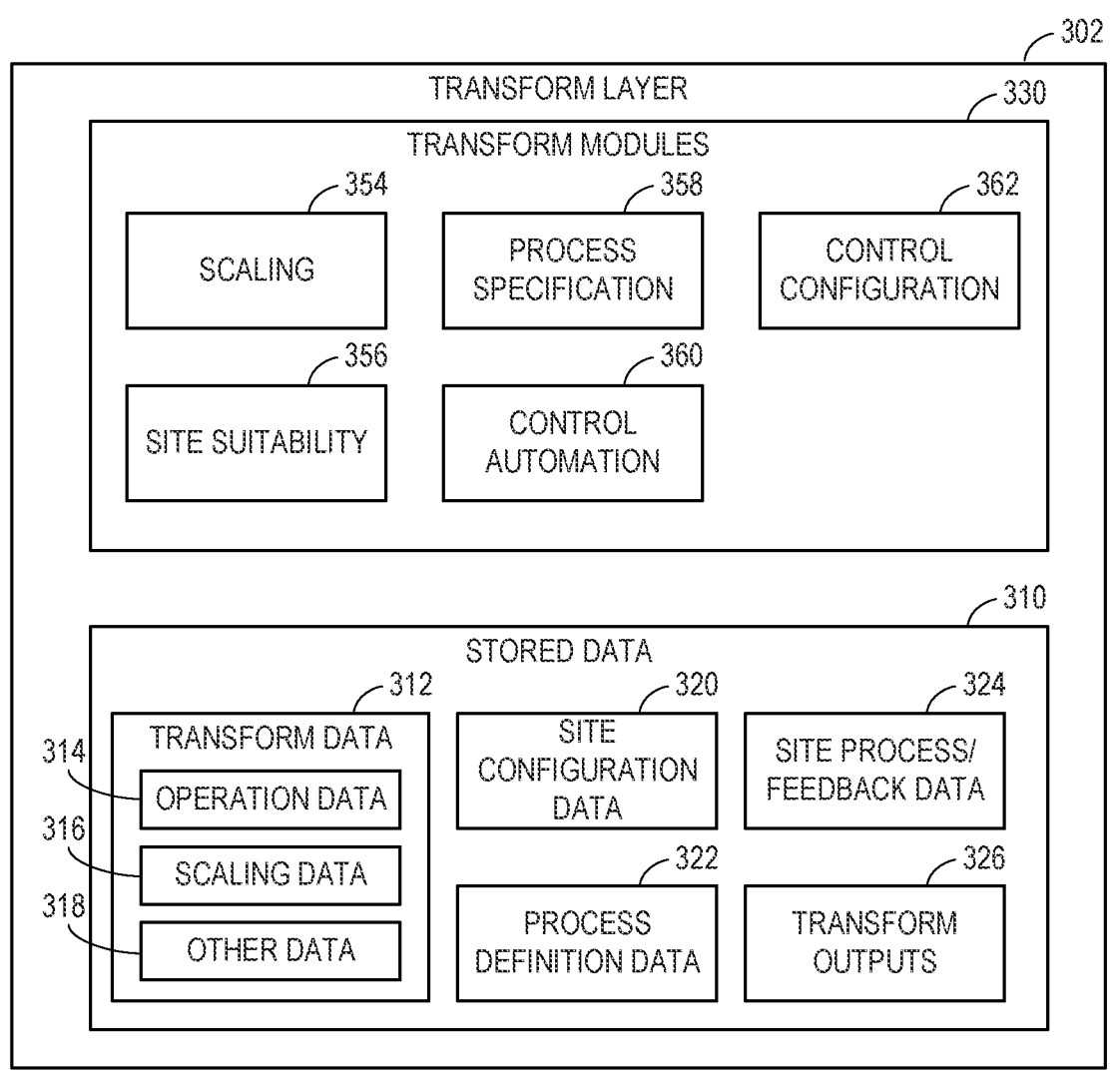
FIG. 5B illustrates a first example of transform modules that may be included in the transform layer depicted in FIG. 5A.
Figure 5C:
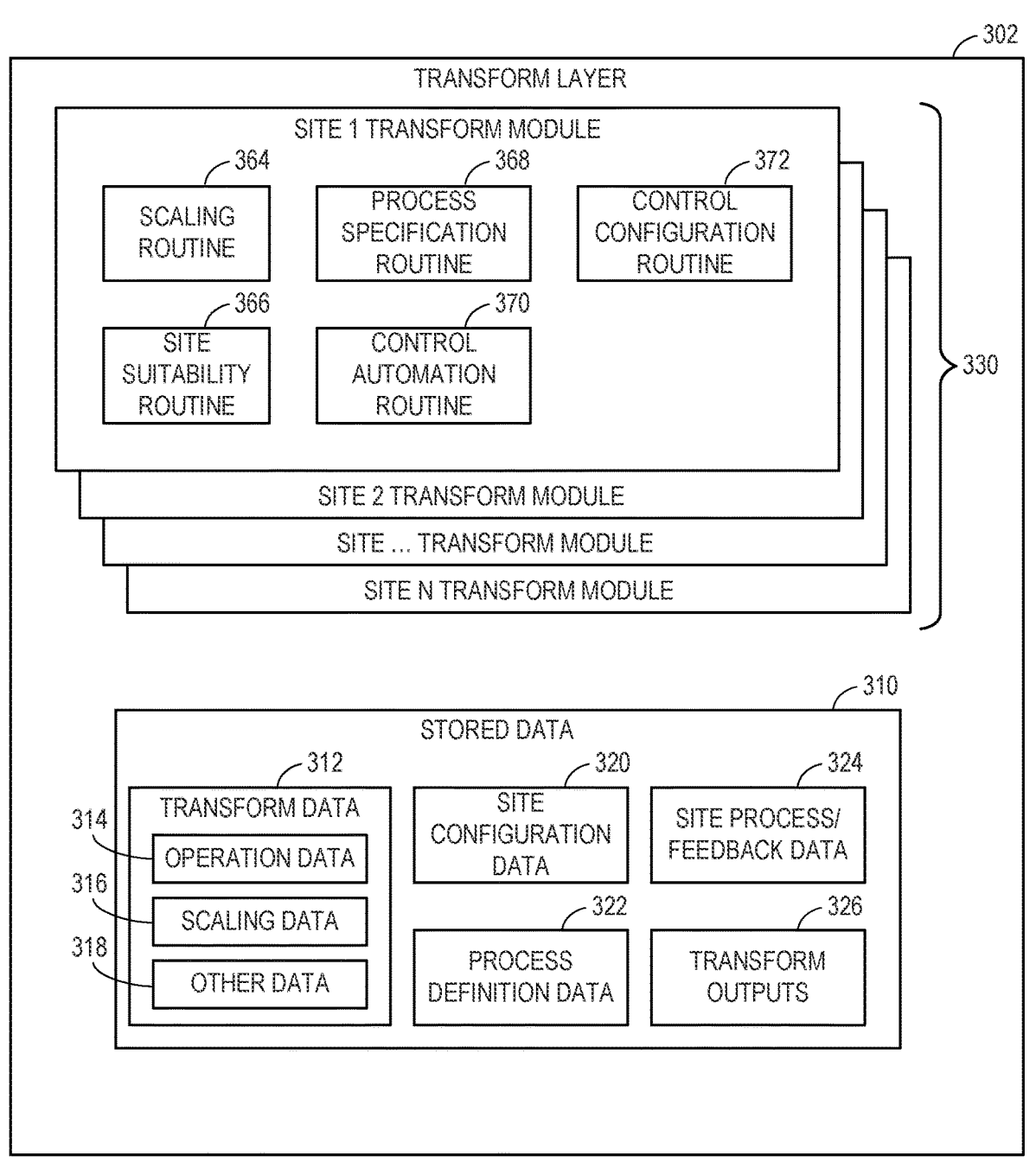
FIG. 5C illustrates a second example of transform modules that may be included in the transform layer depicted in FIG. 5A.

FIG. 5B depicts an example embodiment of the transform layer 302 in which a plurality of the transform modules 330 each perform a specific transformation. In the embodiment of FIG. 5B, a transform module 354 performs a scaling transformation, a transform module 356 performs a site suitability transformation, a transform module 358 performs a process specification transformation, a transform module 360 performs a control automation transformation, and a transform module 362 performs a control configuration transformation. By contrast, FIG. 5C depicts an example embodiment of the transform layer 302 in which each of the plurality of the transform modules 330 is configured to perform any or all of the functions associated with the transform modules 354-362 depicted in FIG. 5B. That each, each of the transform modules 330 includes a scaling routine 364, a site suitability routine 366, a process specification routine 368, a control automation routine 370 and a control configuration routine 372. In the embodiment depicted in FIG. 5C, each of N transform modules 330 corresponds to a particular development or production site 1 through N. Of course, it should be understood that with respect to the example embodiment depicted FIG. 5B, some implementations may omit certain ones of the transform modules, some implementations may combine the functions of transform modules, and some implementations may include additional transform modules. Likewise, with respect to the example embodiment depicted in FIG. 5C, each of the transform modules 330 may include only those routines necessary or appropriate for the particular development or production site to which it applies. For example, a transform module for a laboratory development site may not include control automation or control configuration routines where no control automation is present in the laboratory environment. These various example transformations will be described in further detail with respect to FIGS. 5E-5I.

Figure 5D:
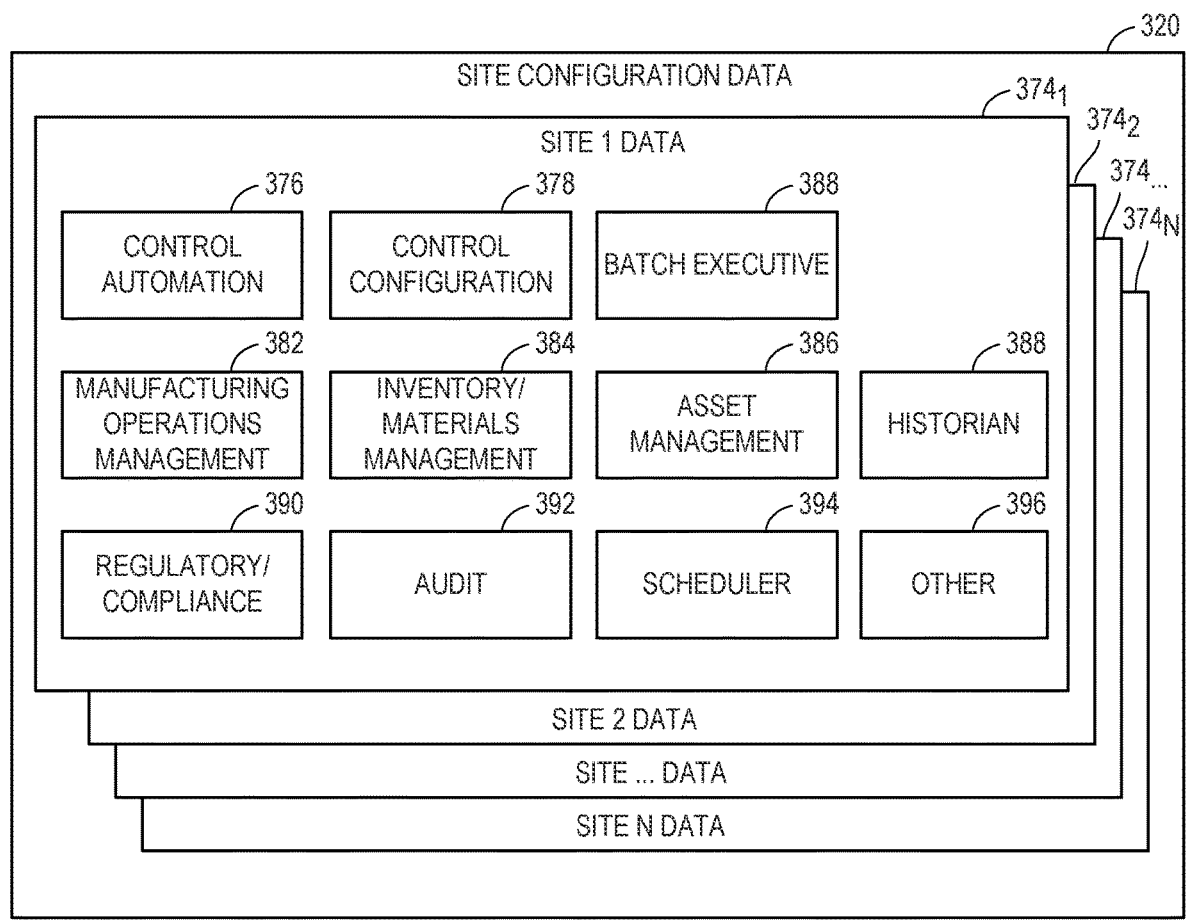
FIG. 5D depicts in greater detail example site configuration data.

The site configuration data 320 may be stored at the corresponding development or production site in embodiments, in the cloud in embodiments, and/or in a server or workstation executing the transformation modules 330, so long as they are accessible by the various transformation modules 330 and analysis modules 328 as necessary. FIG. 5D depicts an example set of site configuration data 320 including site data 3741 through 374N for each of a respective set of N sites 1 through N. Just as each site may have a site-specific set of site operation systems, and each site may vary in which site operation systems are implemented, so too may each set of site data have corresponding sets of data and each site may vary in which data are available and/or stored. The following exemplary data types are provided by way of example and not limitation to illustrate the types of data that may be stored in the site configuration data:

Control automation data 376: data defining the type and arrangement of the control automation system including, for example, the system manufacturer, hardware, hardware version, software, software version;

Control configuration data 378: data defining the logical and/or physical configuration of the process control system, including what equipment is present, what transmitters are present, device tags or registers corresponding to each equipment parameter and/or transmitter, I/O configuration, configured control loops;

Batch executive data 380: data defining batch-specific automation parameters including configured phases, units, procedures, etc.;

Manufacturing operations management data 382: higher level data including standard operating procedures (SOPs) for carrying out certain operations and/or operations that must be performed manually, overall site facility information (location, shift data, operation schedule, open capacity, etc.);

Inventory/materials management data 384: data indicative of what input materials are available on site, readily available, can be ordered within various time frames, and of the quantities associated with the input materials;

Asset management data 386: data indicative of the equipment assets that are available, the manufacturer, make, and model of the equipment, the capacity/size of the equipment, the calibration and/or maintenance status of the equipment;

Historian data 388: data defining the parameters that are routinely or currently programmed to be historized, the frequency with which data are historized, the type and storage capacity of the historization system;

Regulatory/compliance data 390: data defining the parameters that are routinely or currently programmed to be tracked for regulatory compliance, the frequency with which data are collected, the types of systems that track the regulatory/compliance data, regulatory certifications achieved and/or maintained;

Audit data 392: data indicative of audit software employed at the site, which data are required by the site operator to be audited, which data are available to a site user for auditing;

Scheduler data 394: data indicative of the current schedule of the development or production site, including what resources are available when;

Other data 396: any other type of data from site operations systems such as logbook data (whether manual or electronic).

Of course, the descriptions of each of the sets 376-396 of site data 374 are exemplary only and each type, if present, may include less or additional information than that described above.

Figure 5E:
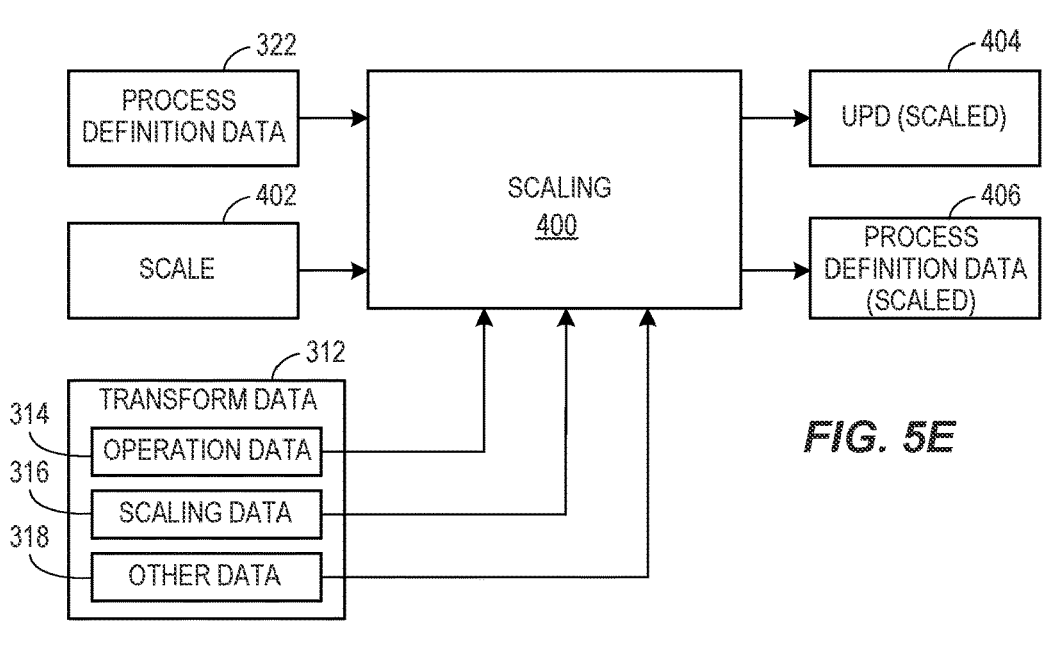
FIGS. 5E-5I depict example transform modules and associated input and output data.

Turning now to FIGS. 5E-5I, various example transform modules 330 are illustrated with respective example inputs and outputs. FIG. 5E depicts a scaling transform module (or scaling routine of a transform module) 400. The scaling transform module 400 may be configured to consume some or all of the process definition date 322 for (and generated from) a specified UPD, in embodiments. In other embodiments, the scaling transform module 400 may be configured to receive the UPD itself as input and may parse the data as part of its routine. In any event, the UPD or the process definition data 322 may include explicitly or implicitly an indication of the scale at which it is designed. For example, the UPD may state that the UPD generates 5 L batch of product, may include combined input materials totaling 5 L, or may state that the UPD is valid for a range of 0-5 L, in embodiments. Alternatively, in some instances, the UPD or the process definition data 322 may have no indication of scale where the UPD indicates only the relative quantities of input materials (e.g., 1 part X, 3 parts Y, etc.). In these cases, the UPD may be assumed valid for all scales.

As described with reference to FIG. 4, the UPD (and therefore the process definition data 322) specifies at least a minimal set of information about the process, including input materials, quantities or ratios of input materials, operations performed on the input materials, and a sequence of the operations. The UPD may also include parameters for operations (e.g., heat to X degrees Celsius, heat for Y minutes), properties for input materials (e.g., material Z with salinity of 5%), etc. Any information included in the UPD that may be relevant to a change in scale may be considered by the scaling transform 400.

The module or routine 400 also receives information 402 about the scale of the desired transform. The scale information 402 may be received from the management execution engine 76 or from any other element of the PDMS 60 that is requesting the scaling transform. In any event, the scaling module 402 receives the UPD or the process definition data 322 and the scale information 402 and uses both, along with the transform data 312, to produce a scaled UPD 404 and/or a set of scaled process definition data 406, either of which includes adjustments for scale relative to the unscaled UPD. The adjustments for scale may include, among other things, replacing relative quantitative information (e.g., 1 part X, 2 parts Y) with absolute quantitative information (e.g., 5 L of X, 10 L of Y), revising relative quantitative information (e.g., 2 parts X, 3.8 parts Y), revising parameters associated with input materials (e.g., from a first scale at which 10% salinity is necessary to a second scale at which 5% salinity is necessary), revising parameters associated with operations (e.g., from a first scale at which heating for 5 minutes is sufficient to a second scale at which it is necessary to heat for 10 minutes), or making any other revision to account for a change of scale.

The revised, scaled UPD may be stored, transmitted to the PKA system 70, transmitted to a development or production site (e.g., to allow engineers to set up a process), etc. Alternatively or additionally, scaled process definition data 406 may be stored in the data store 310.

Figure 5F:
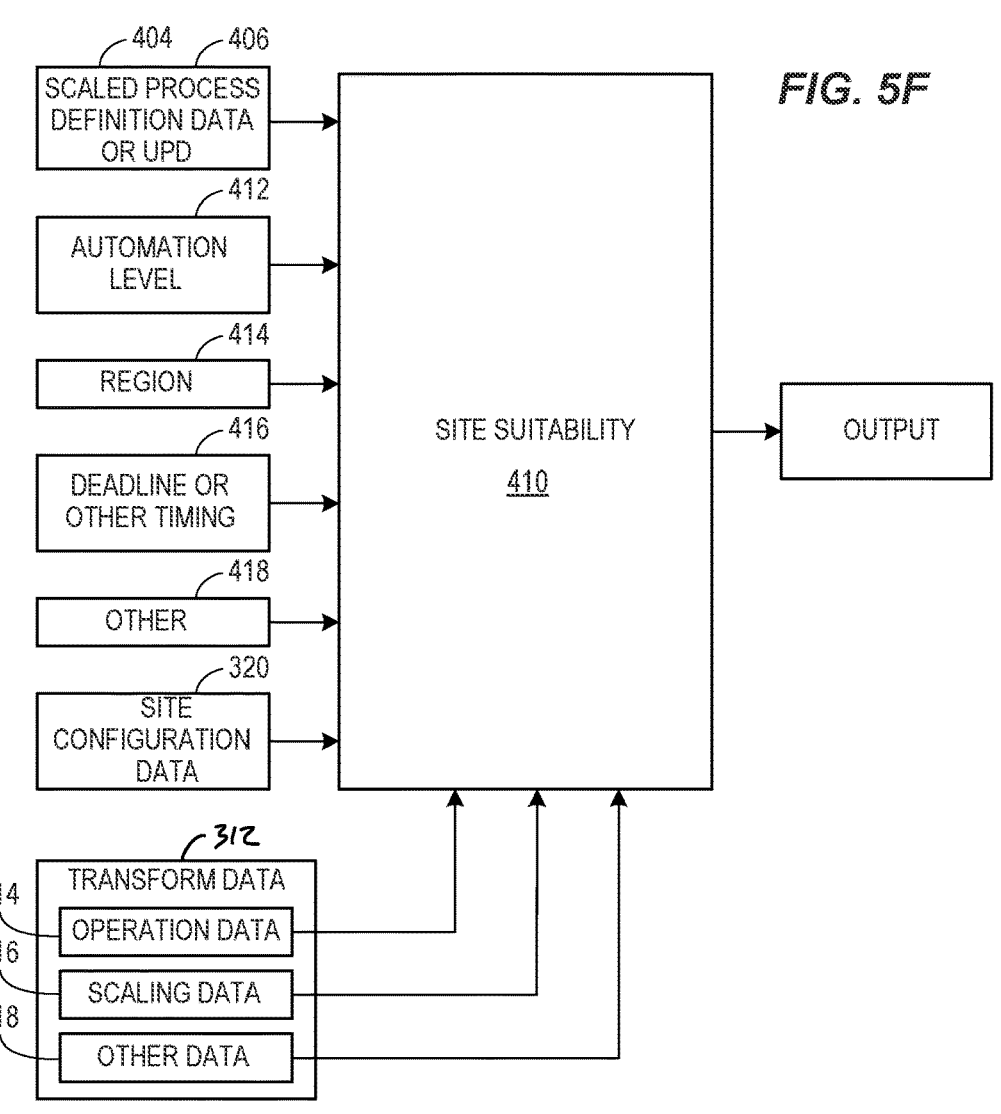

FIG. 5F shows an example site suitability transform module 410 that may determine whether one or more sites are suitable or desirable to produce a given product. The module 410 may receive or retrieve the scaled UPD 404 or the scaled process definition data 406, in embodiments. However, while depicted in FIG. 5F as receiving scaled data, in other embodiments, the routines executed by the module 400 may be included within the module 410, and the data 322 and 402 received by the module 400 may be received by the module 410, such that the module 410 can first scale the UPD and then determine site suitability. In addition to the scaled UPD 404 or scaled process definition data 406, the module 410 may receive information about specific requirements for production, which requirements may, in part, determine whether a given development or production site is suitable. The requirement information may include some or all of a required level (e.g., full) or type (e.g. PLC) of automation 412, a required production region 414, deadline or other timing information 416 (e.g., a date by which the process must be complete), and various other information 418, depending on the embodiment. The other information 418 may include a needed quantity of product, specification of preferred or required equipment, required regulatory certifications, and the like. The module 410 may also receive or retrieve the transform data 312.

The module 410 considers the requirements and preferences indicated, compares the information to the site configuration data 320, and determines the suitability of one or more sites for production, as will be described in greater detail below.

Figure 5G:
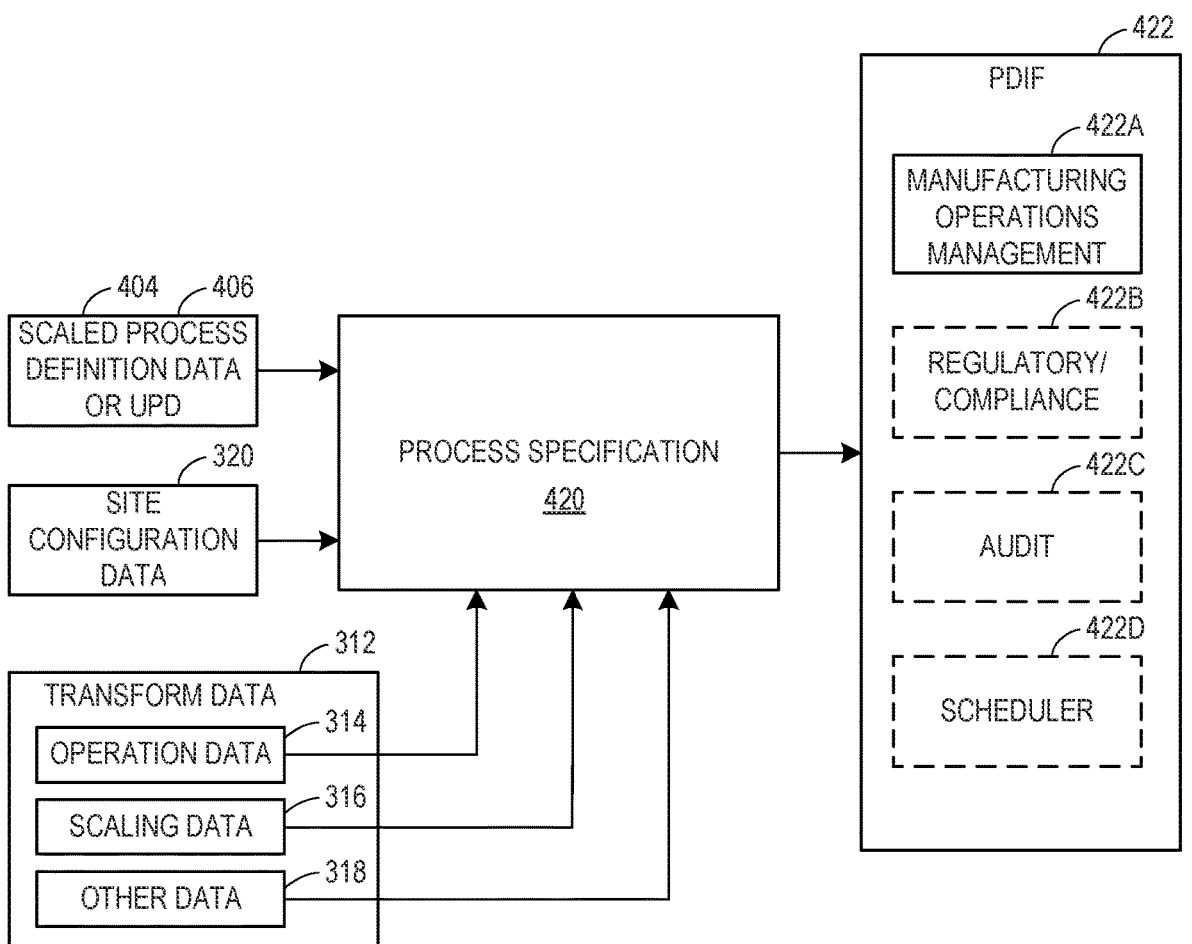

Once a development or production site has been identified and/or selected, a user may invoke a process specification transform module 420, as depicted in FIG. 5G. The process specification transform module 420 may operate to specify a set of site-specific procedures for completing the process using the equipment at the selected site. The site-specific procedures may specify any variety of information for performing the process and may be relatively more or less specific in various embodiments or instances. The process specification transform module 420 may, for a given development or production site having a given set of equipment, produce one or more PDIFs that specify various parameters for executing the process at the site. The PDIFs may provide information for the manufacturing operations management system 336 for the site that instructs personnel on how to perform the process using the equipment at the site. For example, the PDIFs may specify that a 500 L tank and the input pipes to the tank should first be flushed with a cleaning solution left in contact with the tank and pipes for 15 minutes, before flushing the tank and pipes with distilled water. The PDIFs may then specify that the first and second input pipes be connected to supplies of respective first and second input materials, and the first and second input materials added to the tank with in equal parts for a total volume of 400 L, with pressures not exceeding 100 psi for the second input material and not exceeding 50 psi for the second input material. The PDIFs may indicate that a mixing element in the tank should be engaged at 100 RPM, and a heating element should be turned on concurrently to heat the mixture at 5 degrees C./hour to a setpoint temperature of 30 degrees C. and that, once the setpoint temperature is reached, the mixture should be held at that temperature for three hours, while adding a third input material at a rate of 1 L/hr per 100 L of mixture.

In embodiments or instances, the PDIFs may also specifying standard operating procedures (SOPs) for performing one or more of the steps of the process. The PDIFs may specify that SOP AA should be referred to for the step of connecting the input pipes to the cleaning solution supply, that SOP BB should be referred to for the step of flushing the tank with distilled water, that SOP CC should be referred to for the step of engaging the mixing element, etc. As should be understood, each SOP may be site and/or equipment and/or product specific, and can specify any details about the step (e.g., how tightly to torque an input coupling, maximum ramp rates for bringing the mixing element up to speed, etc.). In further embodiments, the PDIF may specify additional data for performing the process, including, for example, what data must be tracked (and how often and at what points) for regulatory and/or compliance purposes, what data must be tracked (and how often and at what points) for internal audit purposes, scheduling information for the process, and any other data that may be relevant to performing the process, depending, in part, on the UPD 404 or process definition data 406 provided to the process specification transform module 420. These other data may include data such as: whether operations can be performed in parallel or must be performed in series; constraints on sequence parameters; specifications related to transitions between operations; initial conditions for equipment; initial conditions for materials; material properties for one or more of the input materials; equipment types; equipment sizes; equipment models; equipment capabilities; significant parameters including times/durations, ramp rates, and/or limits for various operations, sequences, control parameters, and testing/sampling values; feedback data capture parameters, audit and regulatory data parameters; and more. Any of the above data may be specified as necessary, preferred, and/or alternative values.

As described above, the process specification transform module 420 may output one or more PDIFs 422. The one or more PDIFs may include information in a single file or in multiple files each directed to one of the site operation systems 304. While the PDIF(s) output by the process specification transform module 420 typically would include manufacturing operations management data 422A (e.g., specifying the processes, SOPs, etc., as described above), the PDIF(s) output by the module 420 may also include regulatory/compliance information 422B, audit information 422C, and/or scheduler information 422D, in a single or separate files. The PDIF(s) may be communicated to the site or, in embodiments, directly to respective site operation systems 304 (e.g., the systems 336, 348, etc.).

Figure 5H:
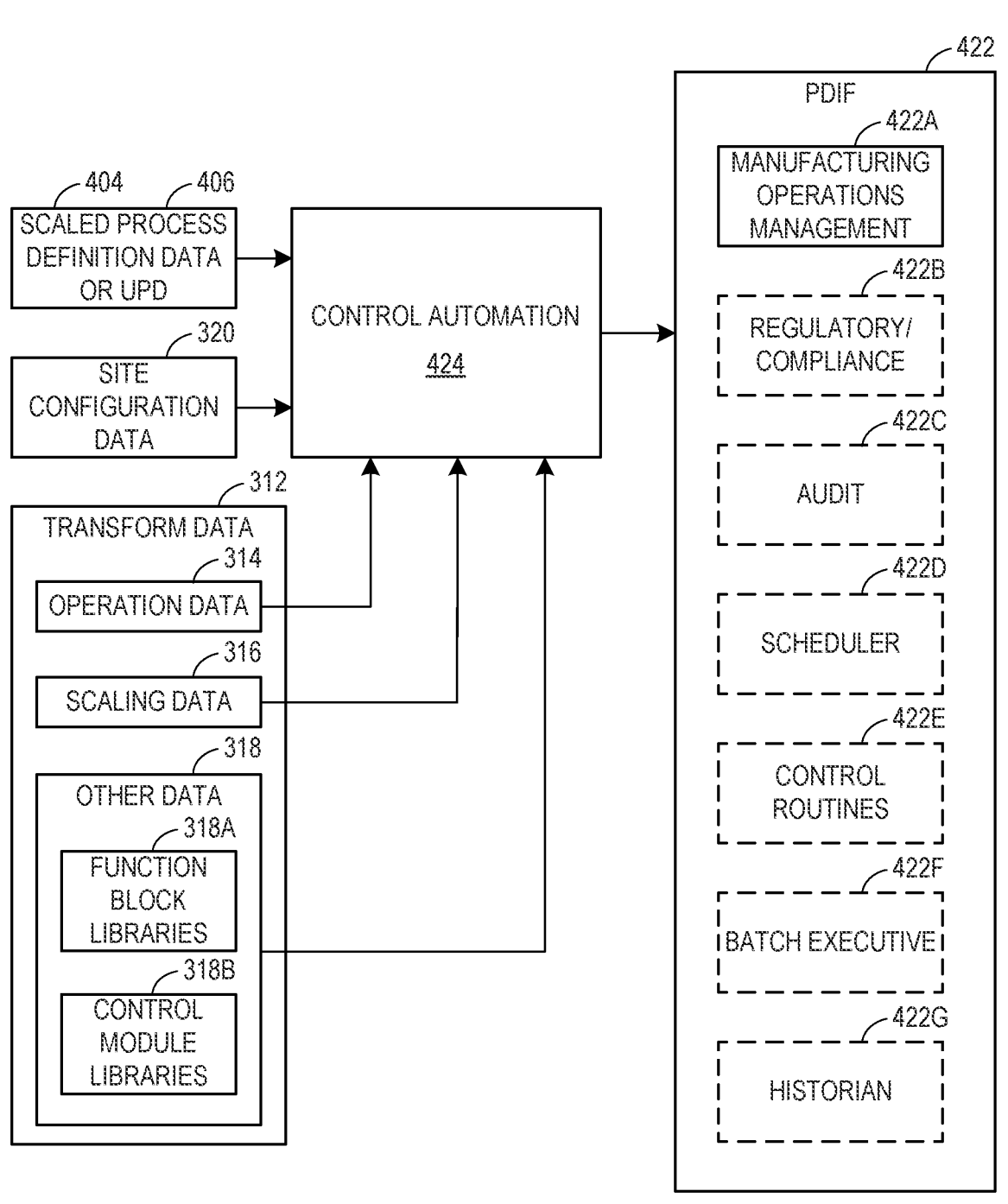

Alternatively (or, conceivably, additionally), rather than invoking the process specification transform module 420, a control automation transform module 424 may be invoked as depicted in FIG. 5H. In contrast to the module 420, which specifies operations, SOPs, and other information that may be used to perform a process manually and/or to develop control routines for performing the process, the contemplated control automation transform module 424 operates to develop control automation logic that may be used at the site. The operation of the control automation transform module 424 is similar in many respects to the operation of the module 420. However, in the case of the module 424, it may receive from the site configuration data 320 data indicating the availability and type of control automation equipment at the site, in addition to the type of process equipment present at the site. The site configuration data 320 may also include data (e.g., from the control automation data 376 or the control configuration data 378) indicating what function blocks and/or control modules are configured at the site, or may include a library of function blocks and/or control modules available at the site. Additionally or alternatively, the transform data 312 may include various libraries 318A, 318B, etc. of function blocks and/or control modules that may be used with various equipment to perform various operations. From the available function blocks and control modules received from either or both of the transform data 312 and the site configuration data 320, the control automation transform module 424 may create sitesspecific control automation logic for the site. That is, the module 424 may operate to create function blocks and control modules, tied (e.g., by device tags) to particular equipment in the development or production site, for operating one or more process controllers, may operate to create ladder logic, tied (e.g., by specific register values) to particular equipment in the development or production site, for programming one or more PLCs, etc. The site-specific control automation logic for the site may be output as PIDF data 422 and may be used by the personnel at the development or production site to program the hardware and software to perform some or all of the process.

The PDIF data 422 may therefore include control routines 422E and/or batch executive information 422F, in addition to the date 422A-422D described above with respect to the module 420. In view of this description, it should be apparent that the control routines 422E and/or batch executive information 422F need not facilitate automation of every step, operation, or procedure of the process. In embodiments, it is contemplated that while control automation may facilitate portions of the process in a given development or production site, certain steps, operations, or procedures may not be able to be automated in the site, due to equipment limitations, automation limitations, regulatory limitations, and the like. As but one example, a process specified by a UPD may be implementable at a specific site using control automation and, accordingly, the module 424 may develop and output control modules and routines for performing many of the steps of the process. However, the example process may include one or more manual sampling and testing steps, in which a sample of the product is taken and analyzed in laboratory, and sample analysis results recorded manually. Thus, the process as implemented at the site, may include manual steps in addition to automated steps. As such, in embodiments, control of the process may pass back and forth between the control automation system 334 (programmed according to the output of the module 424 to operate process equipment to perform portions of the process) and the manufacturing operations management system 336 (programmed according to the output of the module 424 to direct, verify, validate, etc. the manual portions of the process). Of course, the PDIF(s) 422 output by the module 424 may be used to configure other aspects and systems of the development or production site, including to program the regulatory/compliance system 348 according to the regulatory/compliance system PDIF data 422B, the audit system according to the audit system PDIF data 422C, the scheduler system according to the scheduler system PDIF data 422D, the historian system 338 according to the historian system PDIF data 422G, and any other systems according to respective PDIF data.

Figure 5I:
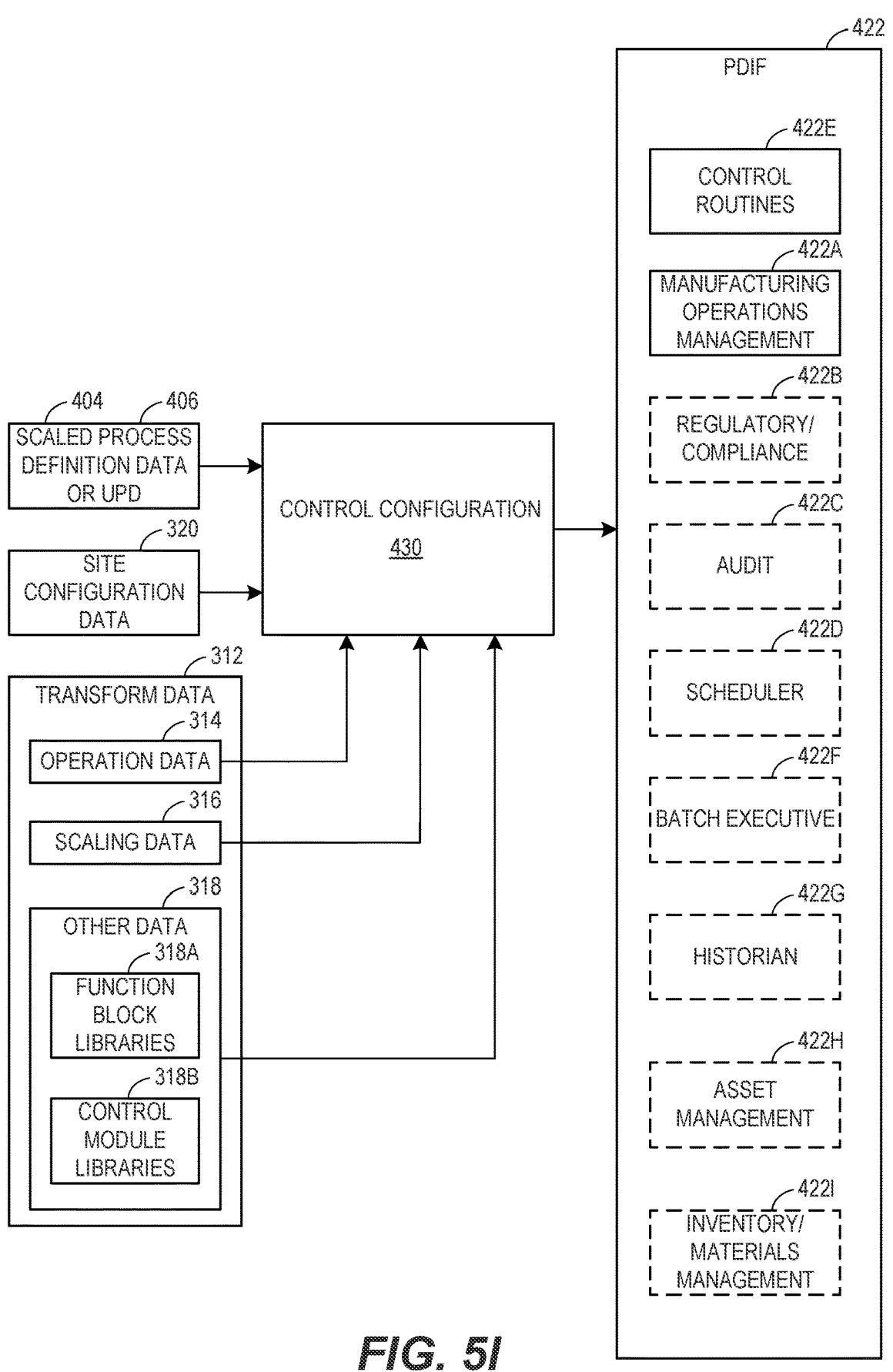

In still another alternative, a control configuration transform module 430 may be invoked as depicted in FIG. 5I In contrast with the control automation transform module 424, which operates to develop control automation logic that may be used at the site, the contemplated control configuration transform module 430, in addition to developing the control automation logic, actually operates to configure some or all of the site operation systems 304. That is, the module 430 may output one or more PDIF(s) 422, the data from which corresponding to selected site operation systems 304, and may direct the programming of the site operation systems 304, via the APIs 350 in the communication layer 332. In particular embodiments, a PDIF parsing routine 352, disposed in the communication layer, in the transform module 430, or elsewhere, may parse the one or more PDIFs 422 and direct the data therein to the respective site operations systems 304. As a result, the module 430 may configure one or more process automation resources within the development or production site, such that a user, by invoking the transform module 430, may take an equipment agnostic UPD (e.g., the scaled UPD 404), transform it into a site-specific process specification, and configure the process plant to execute the process with minimal manual intervention.

In various embodiments, various ones of the transform modules 330 or their respective functions may be combined and/or omitted, and other transform modules for performing other transformations may be added. Also in various embodiments, particular data within the PDIF(s) 422 may be duplicated among multiple PDIFs (where PDIF data is segmented into multiple files), each of which PDIFs may correspond to a different one of the site operation systems 304, or may, when only a single PDIF is present, be used to program multiple ones of the site operation systems 304. For example, PDIF data related to input materials may be present in each of the manufacturing operations management PDIF data 422A and the inventory/materials management PDIF data 4221, and/or may be transmitted to both the manufacturing operations management system 336 and the inventory/materials management system 342.

Figure 5J:
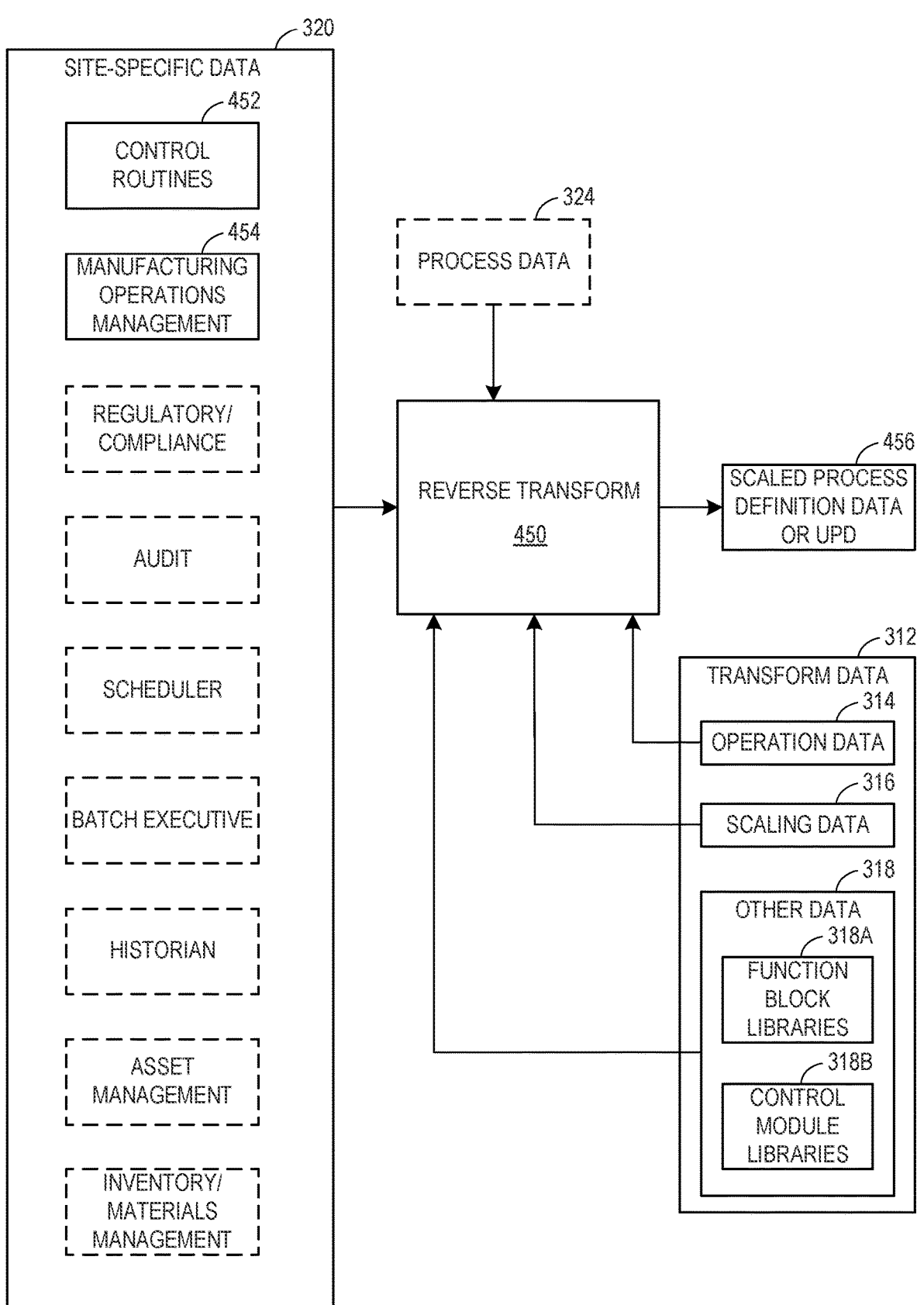
FIG. 5J depicts an example reverse transform module.

The transform modules 330 may also include one or more reverse transform modules 450, in embodiments. One such reverse transform module 450 is depicted in FIG. 5J. Generally speaking, the reverse transform module 450 operates to take data from a development or production site and create, from the data, a universal process definition that can be used by other transform modules to be made site specific for other sites. This can be useful, for example, for creating a UPD from a laboratory bench or small scale development plant for later transformation for other development or production sites. The reverse transform module 450 may also be useful for creating UPDs from well-established production facilities, for analysis purposes and/or to transfer process procedures to other facilities.

The reverse transform module 450 receives site specific data 320 from the development or production site. The site specific data may vary in form, substance, and/or origin, according to the type of site (e.g., laboratory bench vs full-scale commercial production plant). For instance, for a lab bench, the site specific data may include electronic lab notebooks, while for full-scale commercial production plants, the site specific data may include a full suite of data from each of the various site operation systems 304, control routines, and process data generated during execution of the process. The reverse transform module 450 (or various versions thereof) are configured to receive the site specific data and to generate a UPD at least minimally including basic input material information 208, basic operation information 204, basic sequence information 208, and basic relative quantitative information 210. Of course, when the site from which the UPD is being generated by the reverse transform module 450 is a lab bench, the UPD may include only the minimal information, while a much more detailed UPD may be generated from a full suite of site-specific data 320 received from an operating commercial production plant.

The reverse transform module 450 may extrapolate, from whatever data is input into it the, available UPD data. Thus, if the module 450 receives data from an electronic lab notebook software, the data may include a simple set of operations performed on a set of input materials in a particular order. There may or may not be operation parameter data associated with the data from the electronic lab notebook. The module 450 may easily create the UPD from the electronic lab notebook data in such an instance, as there is typically less data to parse.

By contrast, the reverse transform module 450 may have significantly more data to parse when provided with site specific data from a commercial production site, though, concomitantly, the UPD may be much more detailed. FIG. 5J is such an example. In FIG. 5J, the reverse transform module 450 is receiving control routines 452 and manufacturing operations management data 454 as part of the site specific data 320. In contrast to the control automation data 334 and the manufacturing operations management data 336 in FIG. 5A, which does not include a programmed process, the data 452 and 454 includes the programming of the process and may include SOPs, manufacturing execution instructions, control routines, PLC ladder logic, batch executive data, etc. In some cases, the reverse transform module 450 may additionally receive process data 324 generated during execution of the process and stored by the historian system 338, the regulatory/compliance system 348, the audit system, etc. The reverse transform module 450 may use the site specific data 320, the process data 324, and other data, along with the transform data 312, to "reverse engineer" a UPD. For instance, the reverse transform module

450 may calculate relative quantities of input materials based on measured flow rates and durations of flow (e.g., valve open for 20 seconds allowing a flow rate of 5 L/s), based on measured volumes in a tank, etc. The reverse transform module 450 may determine the input materials themselves based on data in the inventory/materials management system, based on manufacturing operations management information, etc. The operations and sequence of operations can be determined, for example, by looking at the order in which operations occur in a batch control environment, by looking at manufacturing operations management information, etc. Various control parameters may likewise be determined by looking at the control routines 452, the process data 324, the historian data 338, etc. The transform data 312 may assist in that analysis by providing context for the types of operations performed by different equipment (e.g., the operation data 314), while scaling data 316 may facilitate with distilling the implemented process down to a base ratio of input materials for the UPD, in embodiments.

In any event, the reverse transform module 450 may output a set of scaled process definition data in embodiments, or may output a new UPD 456 based on the implemented process. The UPD 456 may be compared to previous versions of a UPD to determine differences in the product, in the process, in the equipment employed, etc. The UPD 456 may also be sent to the PKA layer 102 to be reviewed and/or edited. Further still, the UPD 456 may be used as an input to a transform module (e.g., the modules 400, 410, 420, 424, 430, 450) for further transformation.

Figure 6:
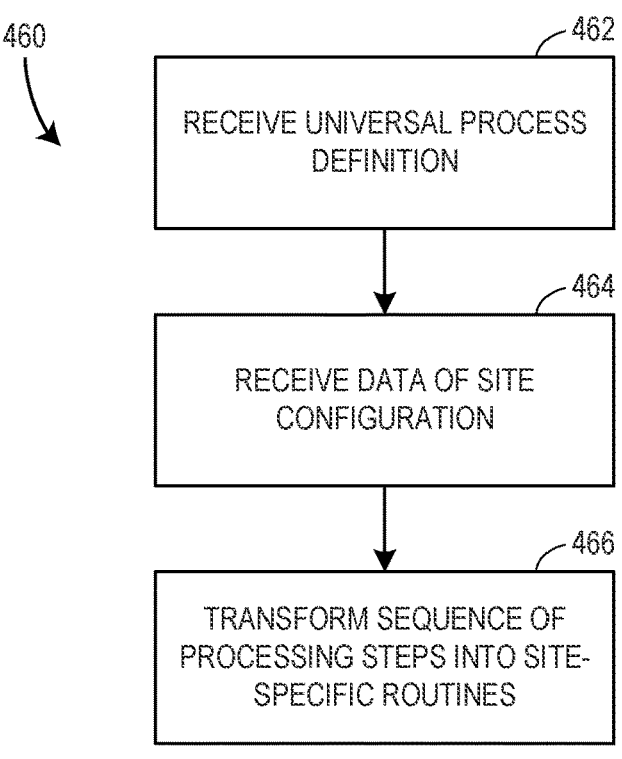
FIG. 6 is a flow chart depicting a method of configuring a process plant using received universal process description.

FIG. 6 depicts, at a high level, a method 460 of configuring a development or production site to make, productize, or package a product. For ease, making, productizing, and packaging will be referred to collectively as "making." However, it should be recognized that between raw materials and a product shipped for sale, there may be multiple processes that may each require different facilities, operation sequences, and/or groups of equipment. As but one example, a drug product may undergo a first process to turn raw ingredients into an active ingredient, a second process to turn the active ingredient into product (a pill or a suspension or a capsule, etc.), and a third process to package the product (e.g., putting it in a blister pack, a bottle, etc. and placing it in its final sales package), etc. Thus, the sequences of operations described with respect to FIG. 6 may cover some or all of the processes of manufacture in any given embodiment.

The method 460 depicted in FIG. 6 includes receiving a UPD that specifies an equipment-agnostic sequence of processing steps for making the product (block 462). The method 460 depicted in FIG. 6 also includes receiving data related to the configuration of the development or production site (block 464). The method 460 further includes automatically transforming the sequence of equipment-agnostic processing steps into data specifying one or more routines for executing the sequence of processing steps to make the product using equipment of the development or production site (block 466). The transformation may be accomplished by one or more transform modules in the transform layer. In embodiments, each of the transform modules corresponds to a different one of the site operation systems and is programmed to configure the respective site operation system according, in part, to the site configuration data and the process definition data.

As should by now be understood, the one or more routines for executing the sequence of processing steps may include one or more manual processing steps, one or more automated processing steps, or a combination of one or more manual processing steps and one or more automated processing steps. The method 460 may also include programming one or more systems of the development or production site to coordinate a combination of automated and manual actions to execute the sequence of processing steps, and may include specifying portions of the sequence of processing steps that are automated and portions of the sequence of processing steps that are performed manually. The automatic transforming of the sequence of equipment-agnostic processing steps may include generating one or more control modules or control routines that are operable to control the equipment of the development or production site to perform one or more automated steps of the one or more routines and, in embodiments, may include programming one or more automation systems of the development or production site to execute the one or more routines, programming one or more Programmable Logic Controllers of the development or production site to execute the sequence of processing steps, and/or programming one or more batch controllers of the development or production site to execute the sequence of processing steps. The received data related to the configuration of the development or product site may include device tag information; automation equipment type information; process control equipment information; I/O configuration data; and/or skid configuration information.

As described elsewhere, the received UPD includes at least data related to input materials, data related to ratios or quantities of the input materials and/or intermediate products, data related to operations on the input materials and/or intermediate products, and data related to a sequence in which the operations are performed, and may include one or more of duration data related a respective one of the operations, parameter data of a respective one of the operations, constraint data of respective parameter data, required initial state data for equipment performing a respective operation, required feedback parameters to be collected, required audit data to be collected, preferred range data of respective parameter data, and preferred equipment type data for one or more of the respective operations. The method 460 may further include identifying, from at least the data related to the operations, one or more types of equipment corresponding to each respective operation. The method 460 may also include comparing the data relating to the configuration of the development or production site and determine whether the development or production site possesses at least one of the one or more types of equipment corresponding to each respective operation such that the sequence of processing steps can be executed at the development or production site.

In embodiments, automatically transforming the sequence of equipment-agnostic processing steps into one or more routines for executing the sequence of processing steps includes automatically scaling the input materials according to the ratios or quantities and adjusting the operations to make, productize, or package the product using equipment of the development or production site. Further, the method may include receiving an indication of a quantity of the product to be made, productized, or packaged at the development or production site, determining capacities of one or more of the equipment at the development or production site, and determining whether the equipment of the development or production site can produce the quantity indicated.

In some embodiments, automatically transforming the sequence of equipment-agnostic processing steps into one or more routines for executing the sequence of processing steps includes automatically scaling the input materials according to the ratios or quantities and adjusting the operations to make, productize, or package a specific quantity of the product using equipment of the development or production site. In these embodiments, the method 460 may further include receiving inventory information related to the input materials available at the development or production site, comparing the inventory information to the scaled input materials, and determining whether the development or production site can produce the specific quantity of the product with the input materials available at the development or production site.

Automatically transforming the sequence of equipment-agnostic processing steps into one or more routines for executing the sequence of processing steps, in embodiments, includes automatically scaling the input materials according to the ratios or quantities and adjusting the operations to make, productize, or package a specific quantity of the product using equipment of the development or production site by a specified time. In such embodiments; the method 460 may also include receiving equipment availability scheduling information related to the development or production site, determining a total time required to produce the specific quantity of the product using the equipment of the development or production site, and determining, from the equipment availability scheduling information and the total time required, whether the development or production site can produce the specific quantity of the product by the specified time.

Figure 7:
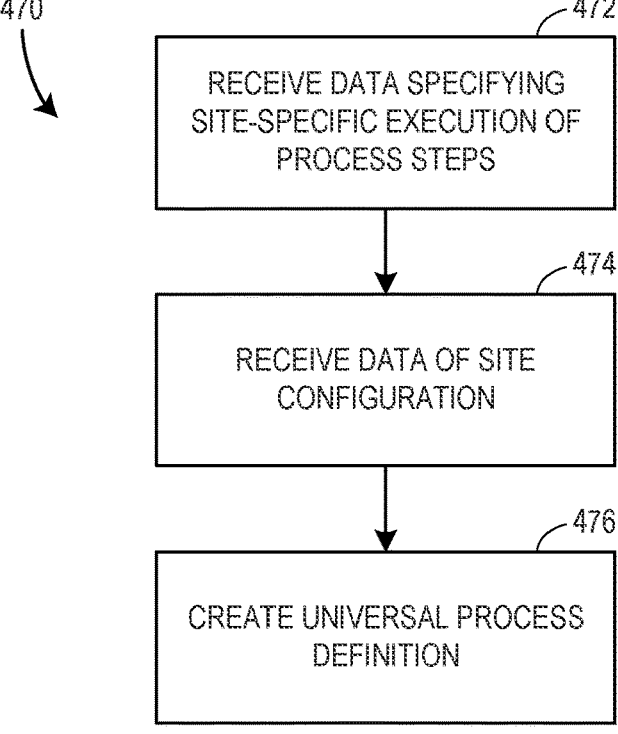
FIG. 7 is a flow chart depicting a method of creating universal process description from data of a site-specific implementation of a process.

FIG. 7 depicts a method 470 of creating a UPD. The method 470 includes receiving, from one or more site operation systems of a development or production site, data specifying execution of a set of process steps for manufacturing, productizing, or packaging the product using a specified set of equipment in the development or production site (block 472). The method 470 also includes receiving data relating to the physical configuration of the development or production site (block 474). Further, the method 470 includes automatically creating the UPD based on the received files specifying execution of the set of process steps and the received data relating to the physical configuration of the development or production site.

In various embodiments, the data specifying execution of the set of process steps includes one or more automation control routines, one or more manual processing steps, or both. In embodiments, the data specifying execution of the set of process steps includes electronic lab notebook data. The UPD includes, in embodiments, a set of input materials, a set of operations performed on the input materials, a sequence in which the operations are performed, and quantitative information regarding quantities of the respective input materials. The UPD may also include one or more of: a necessary type of equipment for one or more of the operations, a preferred type of equipment for one or more of the operations, an initial condition for equipment of one or more of the operations, a necessary material property for one or more of the input materials, a preferred material property for one or more of the input materials, an alternative material for one or more of the input materials, a constraint for one or more parameters, a parameter to be stored in a regulatory tracking system, and a parameters to be stored by a data historian system.

The method 470 may also include transforming the created universal process definition into second data specifying execution of a set of process steps for manufacturing, productizing, or packaging the product using a different set of equipment and/or at a different process plant and/or comparing the created universal process definition to a second universal process definition and indicating differences between the two. When implemented in software, any of the applications, modules, routines, managers, layers, engines, services, virtual devices, vertical machines, virtual entities, etc. described herein may be stored in any one or more tangible, non-transitory computer readable memories such as on a magnetic disk, a laser disk, solid state memory device, molecular memory storage device, or other storage medium, in a RAM or ROM of a computer or processor, etc. Although the example systems disclosed herein are disclosed as including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, while the example systems described herein are described as being implemented in software executed on a processor of one or more computer devices, persons of ordinary skill in the art will readily appreciate that the examples provided are not the only way to implement such systems.

Figure 8A:
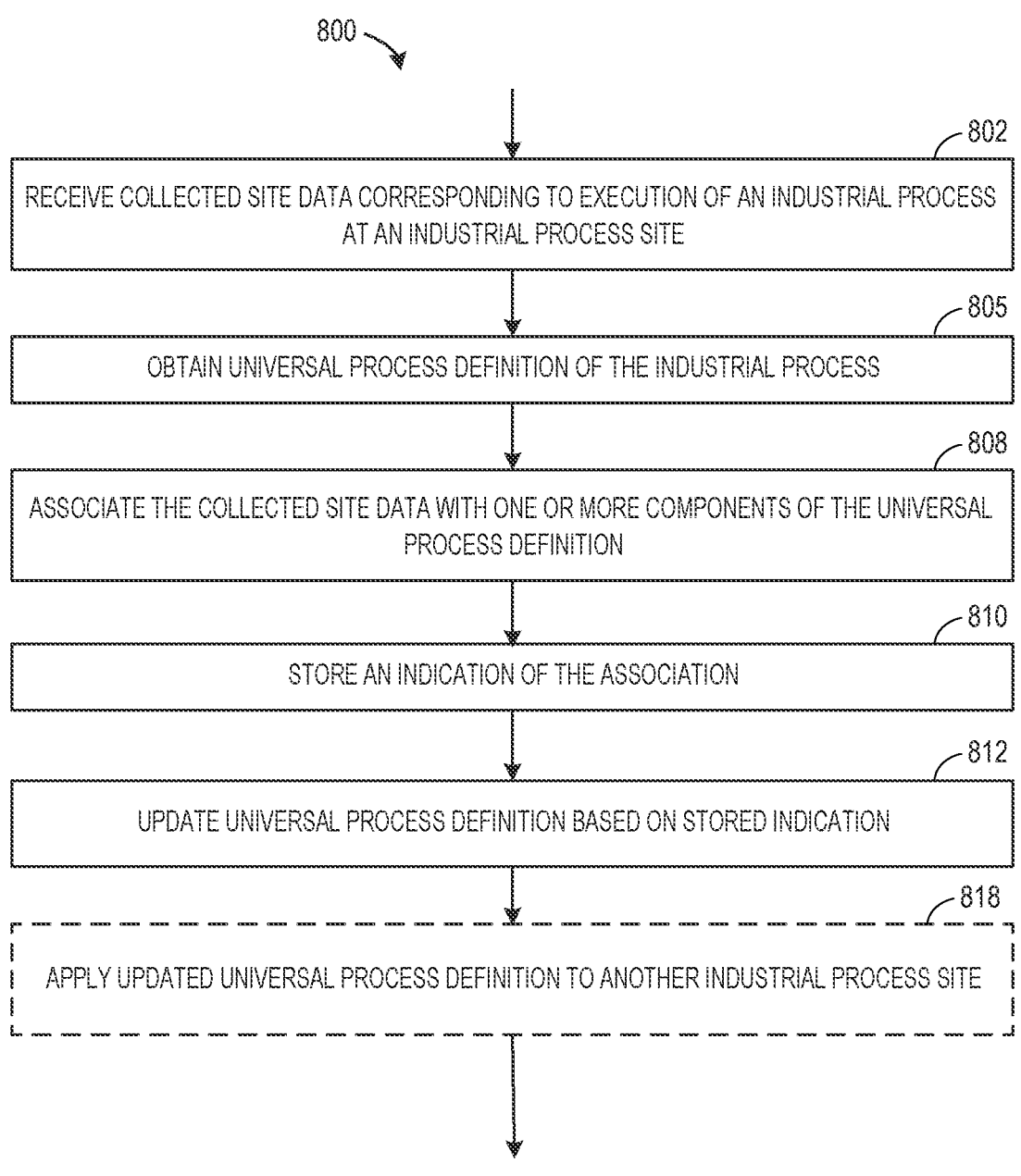
FIG. 8A is a flow diagram of an example method for developing an industrial process based on a site-specific implementation of the process.

Turning now to FIG. 8A, FIG. 8A depicts a flow diagram of an example method 800 for developing an industrial process based on a site-specific implementation of the industrial process. In embodiments, the method 800 may be implemented, in whole or in part, by the process development and management system (PDMS) 60 of FIG. 2 and/or by the PDMS 100 of FIG. 3. For example, at least a portion of the method 800 may be implemented or executed by the transform manager 76 and one or more transform modules 80 of FIG. 2, and/or at least a portion of the method 800 may be implemented or executed by the process knowledge administration layer 102 and the transform layer 104 of FIG. 3. Accordingly, the method 800 may be saved to one or more memories as one or more sets of computer-executable instructions, which may be executed by one or more computing devices of the PDMS 60 and/or of the PDMS 100. In embodiments, the method 800 may include additional or alternate blocks other than those discussed within this disclosure. In embodiments, the method 800 may be executed in conjunction with executing at least a part of other methods described herein, such as method 460 of FIG. 6. Further, for ease of explanation and not for limitation purposes, the description of FIG. 8A simultaneously refers to various components of FIGS. 2-4, FIGS. 5A-5J, and FIG. 6. Additionally, FIG. 8A denotes optional blocks of the method 800 using dashed lines.

At a block 802, the method 800 includes receiving, at one or more computing devices, collected site data. The collected site data corresponds to data collected by one or more execution systems of an industrial process site during an execution of a site-specific implementation of an industrial process at the industrial process site. For example, the method 800 may include receiving, by one or more computing devices of the PDMS 60, collected site data corresponding to the execution of an industrial process at one of the sites 62-68 of FIG. 2, the site 190 of FIG. 3, etc. At least some of the collected site data may correspond to data collected by one or more site-specific execution or operation systems, such as site process/feedback data 192 generated and/or collected by one or more of site operation systems 304 of the site 190 at which the industrial process executes. The collected site data may include, for example, process data generated by the execution of the industrial process at the site; configuration data and values; other values of parameters and/or settings; site historian information; data which can be utilized for regulatory, audit, and/compliance purposes; operator- or personnel-generated notes, photographs/images, and the like; site environmental data; feedback data; and the like. Generally speaking, the collected site data may include any data that corresponds to the execution of the industrial process at the site 190 and that is provided by the site 190 to the PDMS 100.

In some situations, at least some of the collected site data received at the block 802 includes data that is indicative of respective equipment specific to the industrial process site 190. For example, at least some of the collected site data may include site process/feedback data 192, 324, at least some of which includes data indicative of site-specific equipment. In these situations, the method 800 may include (not shown in FIG. 8A), subsequent to receiving the collected site data, transforming, by the one or more computing devices, the collected site data indicative of site-specific equipment into corresponding or respective equipment-agnostic data. For example, one or more of the reverse transform modules 194, 450 may operate on site process/feedback data 192, 324 received via one or more communication APIs 184 to transform the received site data into respective equipment-agnostic data.

In some situations, at least some of the collected site data received at the block 802 may have already been transformed from data indicative of site-specific equipment into equipment-agnostic data prior to being received at the block 802. For example, one or more of the site-specific execution systems 304, the communication layer 332, and/or one or more of the communication APIs 184, 332 may have operated on the data corresponding to the execution of the industrial process at the site 190 and indicative of site-specific equipment to transform such data into equipment-agnostic data. In such situations, the reverse transform modules 194, 450 may not operate on (e.g., may simply pass through) the equipment-agnostic data received via the APIs 184, or the equipment-agnostic data may bypass the reverse transform modules 194, 450.

At a block 805, the method 800 includes obtaining, by the one or more computing devices from a data store, a universal process definition (UPD) of the industrial process, where the universal process definition specifies an equipment-agnostic sequence of process operations corresponding to the industrial process (and optionally may specify other components). For example, the block 805 may include obtaining a universal process definition 72 of the industrial process executing at one of the sites 62-68 from a database 73 of the PDMS 60, and/or the block 805 may include obtaining a universal process definition 112 of the industrial process executing at the site 190 from a database 114 of the PDMS 100.

At a block 808, the method 800 includes associating, by the one or more computing devices, the collected site data with one or more components of the universal process definition of the industrial process executing at the industrial process site 190 (e.g., one of the sites 62-68). That is, various different collected site data may be respectively associated with different sets (e.g., one or more) of components of the universal process definition. Referring to the UPD 200 of FIG. 4 to illustrate, at the block 808, the collected site data may be associated with one or more process steps or operations 204 defined by the UPD 200 of the industrial process, one or more characteristics of one or more sequences 206 of the industrial process defined by the UPD 200, relative quantitative or sizing information 210 corresponding to one or more input materials 208 defined by the UPD 200, one or more characteristics of equipment 212 defined by the UPD 200, one or more parameters 214 defined the UPD 200, and/or other components 214 of the UPD 200 of the industrial process. For example, the collected site data may indicate that a field device of a particular manufacturer was utilized in in a particular control loop during the execution of the industrial process at the site 190, and thus an indication of such may be stored with the equipment information 212 defined by the UPD 200 for the industrial process. In another example, an additional constraint on the execution of part of a sequence of the industrial process may have been implemented on-the-fly by operating personnel of the plant site 190 during the execution of the process at the site 190, and the additional constraint may be added to the definition of the sequence 206 of the UPD 200 of the industrial process. In yet another example, data indicative of an adjustment of a ratio of two input materials at the site 190 may be associated with both the definition of relative quantitative information 210 of the UPD 200 as well as with one or more aspects 214 of the industrial process' UPD 200 indicative of a scale or size (e.g., throughput, quantity, etc.) of the site 190. In yet another example, feedback data such as quality measures, changes, configurations, etc. corresponding to the industrial process executing at the site 190 may be associated with respective other components 214 of the UPD 200 of the industrial process. Of course, these are just a few of numerous examples of collected site data which may be associated with one or more components the UPD 200 of the industrial process executing at the industrial process site.

In embodiments, associating 808 the collected site data with one or more components of the universal process definition of the industrial process which is executing at the industrial process site 190 may include associating data that has been generated and/or provided by the site 190 and that has not been transformed (e.g., data that is indicative of site-specific equipment). Additionally or alternatively, the associating 808 of the collected site data with the one or more components of the UPD of the industrial process may include associating data that has been generated and/or provided by the site 490 and that has been transformed to be equipment-agnostic (e.g., by the reverse transform module 194, one or more of the site-specific execution or operations systems 304, the communication layer 332, one or more of the communication APIs 184, 322, etc.

At a block 810, the method 800 includes storing an indication of the association between the collected site data and the one or more components of the universal process definition. For example, the indication of the association may be stored with the universal process definition 72 in the database 73 of FIG. 2, with the universal process definition 112 in the data store 114 of FIG. 3, and/or with the process definition data 322 in the data store 310 of FIG. 5A. Additionally or alternatively, the indication of the association may be stored as historized data corresponding to the UPD 72 and/or the UPD 112 in the data store 73 and/or data store 114, and/or as site process/feedback data 324 in the data store 310 of FIG. 5A. In embodiments, the method 800 includes obtaining an approval of the association between the collected site data and the one or more components of the universal process definition 200, and the storing 810 of the indication of the association is based on the obtained approval. For example, an indication of the association may be presented at a user interface 116 of the PDMS 100 and/or transmitted to a user's device or account, and upon obtaining a user approval of the association, the indication of the association may be stored 810.

At a block 812, the method 800 includes updating the universal process definition based on the stored indication of the association between the collected site data and the one or more components of the UPD of the industrial process. In embodiments in which the indication of the association is stored 810 in or in conjunction with the UPD definition 72, 112, the storing 810 of the indication of the association in or in conjunction with the UPD definition 72, 112 may thereby generate 812 the updated UPD. The updated UPD may replace the original UPD 200, such as when a process is in its early stages of maturity 62, 64. For more mature processes, though, a typical (but not exclusive) scenario may include storing the updated UPD definition as a different version 202 of the UPD definition 200 of the industrial process. For example, as previously discussed with respect to FIG. 4, the UPD 200 of the industrial process may include multiple different versions, each of which may include a corresponding indication 202 of the version and/or stage of development of the industrial process. Different versions 202 of the UPD 200 for the industrial process may correspond to different stages of maturity and/or to different site configurations implementing the industrial process at a same stage or level of maturity, as desired.

In some embodiments, storing 810 the indication of the association between the collected site data and the site-specific implementation of the industrial process and the one or more components of the UPD of the industrial process includes storing 810 the indication in a historization data store or database 73, 114. As such, updating 812 the universal process definition based on the stored indication of the association may include updating 812 the UPD based on the contents of the historization data store. Generally speaking, the historization data store 73, 114 may store data and information corresponding to (and indicative of) various site-specific implementations of the UPD 200 of the industrial process at multiple different process sites of possibly different stages of maturity (and/or of the same stage of maturity), as well as data and information corresponding to (and indicative of and/or generated by) different runs or executions of the implemented process at the multiple different process sites. As previously discussed, each site-specific implementation of the UPD 200 may correspond to (e.g., may be implemented in accordance with) a respective set of site-specific process definition interface files generated from the universal process definition 200. For example, each set of respective site-specific process definition interface files may include an indication of equipment specific to a respective industrial process site of the multiple industrial process sites. As such, the contents of the historization data store 73, 114 generally include data and information corresponding to the implementation of site-specific process definitions corresponding to the universal process definition 200 of the industrial process, as well as data and information corresponding to the executions thereof.

Conveniently, the historization data store 73, 114 may be manually and/or automatically queried to obtain information and/or data that is generated by executing instances of the industrial process and that is needed for auditing purposes, for the purposes of determining and/or verifying the fidelity of the executing process instance against the intended (e.g., defined) industrial process, for jurisdictional and/or regulatory compliance purposes, etc. As such, in an embodiment, the method 800 may include obtaining a subset of contents of the historization store responsive to an audit or compliance query.

At any rate, as previously mentioned, the contents of the historization data store 73, 114 (which, when pertaining to FIG. 8A, stores 810 the indication of the association between the collected site data and the one or more components of the UPD 200) may be utilized to generate 812 an updated universal process definition 200 of the industrial process. For example, the method 800 may include analyzing the contents of the historization data store 73, 114 to thereby generate additional knowledge corresponding to the universal process definition, and additional knowledge may be utilized to update 812 the universal process definition. In particular, one or more of the analysis modules or routines 196, 328 may be applied to at least a subset of the contents of the historization data store 73, 114, and the output of the application of the analysis module(s) 196, 328 may include learned or discovered knowledge such as, for example, a correlation between various components of the UPD 200 and/or specific values thereof, a classification of at least some of the collected site data corresponding to the execution of the industrial process at the site 190, a segmentation of different components of the UPD 200 and/or of different values of the components, etc. In an embodiment, the one or more analysis modules or routines 196, 328 may include statistical, artificial intelligence, and/or machine-learning modules, and/or other types of analysis modules.

In some situations, the additional knowledge (e.g., the discovered or learned correlations, classifications, segmentations, etc.) may correspond to one or more execution targets of the industrial process. Execution targets may typically be measureable and/or quantifiable and may correspond to desired or target behaviors (e.g., goals, requirements, etc.) of the executing industrial process, such as a level of quality, a level of compliance, a throughput, a time limitation or duration (e.g., a maximum or minimum time limitation or duration), or a cost, to name a few. Each execution target may apply to the overall execution of the industrial process, and/or may apply to only a portion of the industrial process. Some execution targets may correspond to the universal process definition. For example, an execution target of a UPD 200 for the manufacture of a particular pharmaceutical may be a target range for a percentage of active ingredient included in the batch output, irrespective of the site at which the UPD 200 is implemented. Some execution targets may correspond to a site-specific process definition corresponding to the UPD 200. For example, an execution target of a site-specific process definition corresponding to a UPD 200 may be a target throughput of units manufactured per unit of time at a particular site. As such, the additional knowledge may include information which indicates the effects or impacts of various implemented, site-specific process definition components (and/or values thereof) on one or more execution targets (e.g., quantitative and/or statistical effects or impacts), some of which may have been previously unknown. The effects or impacts may be positive effects or impacts (e.g., which caused the industrial process to execute more closely with one or more of its execution targets), or may be negative effects or impacts (e.g., which caused the industrial process to execute further away from one or more of its execution targets).

Further, in embodiments in which the method 800 generates additional knowledge based on analyses of the contents of the historization data store 73, 114, the block 812 may include updating the universal process definition 200 based on the additional knowledge. For example, the additional knowledge (or indications thereof) may be added to and/or stored in conjunction with respective components of the UPD 200, e.g., as a replacement UPD 200 and/or as a version of the UPD 200, such as in manners similar to those discussed elsewhere herein. The updating of the UPD 200 may be based on a manual or automatic approval of the additional knowledge, if desired.

Accordingly, as discussed above, updating 812 the UPD 200 of an industrial process based on the stored indication of the association between the collected site data and the one or more components of the UPD 200 may include incorporating an indication of the collected site data into the UPD 200 to thereby generate the updated UPD. Additionally or alternatively, updating 812 the UPD 200 of the industrial process based on the stored indication of the association may include incorporating additional knowledge that has been learned or discovered based on the collected site data and other historized data into the UPD 200 to thereby generate the updated UPD. Of course, other techniques for updating the UPD 200 based on the stored indication of the association between the collected site data and the one or more components of the UPD 200 may be possible.

At a block 818, the method 800 may optionally include applying the updated universal process definition 200 to another industrial process site. For example, at the block 818, the method 800 may include transforming the updated universal process definition into one or more site-specific process definition interface files for a second industrial process site based on site-specific information of the second industrial process site, where the site specific information of the second industrial process site includes an indication of equipment specific to the second industrial process site. Additionally, at the block 818, the method 800 may include causing one or more site-specific process definition interface files to be utilized at the second industrial process site, thereby implementing, at the second industrial process site, a site-specific process definition corresponding to the updated universal process definition. For instance, applying the updated UPD 200 of the industrial process to another industrial process may include executing at least portions of embodiments of the method 460 depicted in FIG. 6, and/or may include other techniques of applying a UPD 200 to a particular process site discussed elsewhere herein.

Turning now to FIG. 8B, FIG. 8B depicts a flow diagram of an example method 830 for developing an industrial process based on a site-specific implementation of the industrial process. In embodiments, the method 830 may be implemented, in whole or in part, by the process development and management system (PDMS) 60 of FIG. 2 and/or by the PDMS 100 of FIG. 3. For example, at least a portion of the method 830 may be implemented or executed by the transform manager 76 and one or more transform modules 80 of FIG. 2, and/or at least a portion of the method 830 may be implemented or executed by the process knowledge administration layer 102 and the transform layer 104 of FIG. 3. Accordingly, the method 830 may be saved to one or more memories as one or more sets of computer-executable instructions, which may be executed by one or more computing devices of the PDMS 60 and/or of the PDMS 100. In embodiments, the method 830 may include additional or alternate blocks other than those discussed within this disclosure. In embodiments, the method 830 may be executed in conjunction with executing at least a part of other method described herein, such as the method 460 of FIG. 6 and/or the method 800 of FIG. 8A. Additionally, FIG. 8B denotes optional blocks using dashed lines. Further, for ease of explanation and not for limitation purposes, the description of FIG. 8B simultaneously refers to various components of FIGS. 2-4, FIGS. 5A-5J, and FIG. 6.

In a manner similar to that described for the method 800, the method 830 includes receiving 802 collected site data corresponding to an execution of a site-specific implementation of an industrial process at an industrial process site (e.g., one of the sites 62-68, or the site 190). That is, the implementation of the industrial process at the industrial process site is in accordance with a site-specific process definition. The site-specific process definition may correspond to both a universal process definition (e.g., the UPD 72, 112, 200) and to site-specific information of the industrial process site (e.g., site information files 140 and/or site configuration data 320), where the site-specific information 140, 320 includes an indication of equipment that is specific to the industrial process site 190. In an example, the site-specific process definition may be implemented at the industrial process site 190 in accordance with one or more (e.g., a set of) site-specific process definition interface files and/or routines (e.g., interface files or routines 422) corresponding to the industrial process site 190. The one or more site-specific process definition interface files and/or routines 422 corresponding to the process site 190 may have been generated by transforming the universal process definition 72, 112, 200 of the industrial process based on the site-specific information 140, 320 of the process site 190. For example, the site-specific process definition interface files and/or routines 422 may have been generated by the transform layer 302 and provided, via the communication layer 332, to one or more site operations system 304 of the industrial process site. Additionally or alternatively, an embodiment of the method 460 of FIG. 6 may have generated at least a portion of the set of site-specific process definition interface files and/or routines 422 of the site 190. Still additionally or alternatively, an embodiment of the method 800 of FIG. 8A may have generated at least a portion of the set of site-specific process definition interface files and/or routines 422 and caused such generated interface files and/or routines to be provided to and/or utilized at the industrial process site 190 to support the implementation of the site-specific process definition (e.g., in a manner such as described with respect to the block 818). As such, receiving 802 the data collected during the execution of the industrial process at the industrial process site may include receiving collected site data, where the collected site data includes data collected during an execution, at the industrial process site, of an industrial process executing at the industrial process site in accordance with the site-specific process definition.

As shown in FIG. 8B, the method 830 may also include obtaining a universal process definition of the industrial process (block 805), associating the collected site data with one or more components of the UPD (block 808), and storing an indication of the association (block 810). Generally speaking, the blocks 802, 805, 808, and 810 of the method 830 may be similar to the blocks 802, 805, 808, and 810 as described for the method 800.

At a block 832, the method 830 includes evaluating the site-specific process definition based on the (stored) association between the collected site data and the one or more components of the universal process definition. Evaluating 832 the site-specific process definition may include, for example, evaluating an accuracy of the site-specific process definition (block 835), evaluating an effectiveness of the site-specific process definition (block 838), and/or evaluating one or more other aspects of the site-specific process definition. Outputs (e.g., results) of the evaluation(s) performed at the block 832 and/or other information gleaned from the evaluation(s) may be stored in the historization data store 73, 114 and optionally may be provided to a user, e.g., via a user interface 116 and/or via other suitable electronic means.

Evaluating 835 the accuracy of the site-specific process definition based on the association between the collected site data and the one or more components of the universal process definition may include determining whether the respective classification of various collected site data into the respective one or more components of the universal process definition (e.g., the species-genus relationships between the collected site data and the components of the UPD) is correct or acceptable, determining whether various collected site data have been or have not been able to be associated with any components of the universal process definition, determining whether various components of the universal process definition have been or have not been able to be associated with at least some of the collected site data, etc. Generally speaking, evaluating the accuracy of the site-specific process definition determines a level or a measure of how closely the site-specific process definition of the industrial process conforms to the universal process definition of the industrial process. In embodiments in which the site-specific process definition was previously transformed from the universal process definition, evaluating 835 the accuracy of the site-specific process definition may provide a measure of the quality and/or accuracy of the transformation.

Evaluating 838 the effectiveness of the site-specific process definition based on the associations between the at least some of the collected site data and the respective components of the universal process definition may include evaluating 838 the effectiveness of the site-specific process definition with respect to one or more targets of execution of the industrial process. As previously discussed, the targets of execution of an industrial process may pertain to product quality levels, process execution compliance levels (e.g., how closely the implemented process comports with the designed process), product and/or process compliance levels, throughput targets (e.g., unit product per unit of time), targets related to time (e.g., durations, time limits, etc.), costs, and the like. A target of execution may apply to the industrial process as a whole, or may apply to only a part of the industrial process (e.g., measuring the quality of the output of a tank which provides intermediate materials into a next process step). A target of execution may correspond to the universal process definition (e.g., the output product is to have a percentage of active ingredient within a certain range of percentages) and thereby apply to all sites at which the UPD is implemented. A target of execution may correspond specifically to a site-specific process definition (e.g., a target throughput at the specific site, a target maximum level of by-product emissions at the specific site, etc.).

In embodiments, at an optional block 840, the method 830 may include generating, by the one or more computing devices, additional knowledge corresponding to the universal process definition based on the evaluating 832. As previously discussed, the outputs of the evaluating 832 (e.g., results) and/or other information gleaned from the evaluating 832 may be stored in the historization data store 73, 114. As such, at the block 840, the method 830 may include analyzing the contents of the historization data store 73, 114 to thereby generate additional knowledge corresponding to the universal process definition. For example, one or more of the analysis modules or routines 196, 328 may be applied to at least a subset of the contents of the historization data store 73, 114, and the output of the application of the analysis module(s) 196, 328 may include learned or discovered knowledge such as, for example, correlations, classifications, segmentations, predictions, and the like. For example, the learned or discovered knowledge (which may have been previously unknown) may include a discovered correlation between various components of the UPD 200, specific values thereof, and/or specific combinations thereof and corresponding impacts on various execution targets (which may be positive or negative impacts), some of which may have been previously unknown. In an embodiment, the one or more analysis modules or routines 196, 328 may include statistical, artificial intelligence, and/or machine-learning modules, and/or other types of analysis modules.

At an optional block 842, the method 830 may include updating the universal process definition based on the additional knowledge generated based on the evaluating 832, thereby generating an updated universal process definition. For example, an indication of the additional knowledge and/or of data corresponding to the additional knowledge may be stored in or with one or more corresponding components of the UPD 200, thereby updating the UPD. In embodiments, the method 830 includes obtaining an approval of the additional knowledge, and the updating 842 of the universal process definition based on the additional knowledge is based on the approval of the additional knowledge. For example, an indication of the additional knowledge may be presented at a user interface 116 of the PDMS 100 and/or transmitted to a user's device or account, and upon obtaining a user approval of the additional knowledge, the universal process definition may be updated 842.

In an embodiment, at an optional block 845, the method 830 may include applying the updated universal process definition (e.g., which was generated at the block 842) to another industrial process site. For example, at the block 845, the method 830 may include transforming the updated universal process definition into one or more site-specific process definition interface files for a fourth industrial process site based on site-specific information of the fourth industrial process site, where the site specific information of the fourth industrial process site includes an indication of equipment specific to the fourth industrial process site. At the block 845, the method 830 may also include causing one or more site-specific process definition interface files to be utilized at the fourth industrial process site, thereby implementing, at the fourth industrial process site, a site-specific process definition corresponding to the updated universal process definition. For instance, applying 845 the updated UPD 200 of the industrial process to another industrial process may include executing at least portions of embodiments of the method 460 depicted in FIG. 6, and/or may include other techniques of applying a UPD 200 to a particular process site discussed elsewhere herein.

Thus, in view of the above, the method 832 may be particularly useful when a site-specific implementation of an industrial process generates a "golden batch" of a product, where the golden batch met a majority (if not all of) its execution targets. As such, by executing the method 832, site data corresponding to the golden batch may be collected, associated with corresponding components of the universal process definition, and evaluated to discover the particular factors (e.g., components of the UPD as implemented at the site, values thereof, combinations of components, combinations of component values, etc.) which had the strongest effect or impact on various execution targets of the batch. The universal product definition may be updated based on the discovered information so that future site-specific implementations of the UPD may incorporate the discovered factors and reap the benefits thereof.

FIG. 9 depicts an example method 900 for verifying and/or selecting development or production sites having capabilities required by the general recipe based upon information from the sites, which may be automatically obtained directly from the sites, as may be performed by the site suitability module 160, site suitability routine 366 and/or site suitability module 410 discussed above. Verification may include determining availability or scheduling future availability. Sites may be automatically selected or recommended based upon meeting the general recipe criteria and availability, which may include availability of specific preferred equipment types, e.g., equipment types known to produce superior output.

The method 900 depicted at FIG. 9 includes receiving (step 902) a universal process definition specifying a sequence of equipment-agnostic processing steps for making, productizing, or packaging a product. For instance, in some examples, the universal process definition may include data related to input materials, data related to ratios or quantities of the input materials and/or intermediate products, data related to operations on the input materials and/or intermediate products, and/or data related to a sequence in which the operations are performed. Additionally, in some examples, the universal process definition may include duration data related a respective one of the operations, parameter data of a respective one of the operations, constraint data of respective parameter data, required initial state data for equipment performing a respective operation, required feedback parameters to be collected, required audit data to be collected, preferred range data of respective parameter data, and/or preferred equipment type data for one or more of the respective operations.

The method 900 further includes generating (step 904), based on the universal process definition, indications of one or more site requirements for performing the sequence of equipment-agnostic processing steps for making, productizing, or packaging the product. For instance, in some examples, generating the indications of one or more site requirements may include identifying, based on the universal process definition (and/or otherwise receiving or obtaining), one or more required properties of equipment corresponding to each respective operation associated with the sequence of equipment-agnostic processing steps for making, productizing, or packaging the product. For example, as discussed above, the sequence of equipment-agnostic processing steps for making, productizing, or packaging the product may include one or more operations to be performed, such as, e.g., mixing operations, heating operations, cooling operations, etc. While a given operation may not require any specific piece of equipment, the operation may require equipment having certain properties. For instance, a required property of equipment to perform a mixing operation may include a capability of the equipment to combine input materials together. As another example, a required property of equipment to perform a heating operation may include a capability of the equipment to provide heat.

Moreover, in some examples, generating the indications of one or more site requirements may include identifying, based on the universal process definition (and/or otherwise receiving or obtaining), one or more required properties of input materials, equipment, and/or personnel corresponding to each respective operation associated with the sequence of equipment-agnostic processing steps for making, productizing, or packaging the product.

For instance, in some examples, certain ratios or quantities of the input materials and/or intermediate products may be required. That is, a required property of the input materials for a given operation may be a specific minimum quantity of one or more of the input materials, or a specific ratio of one input material to another input material. Furthermore, a required property of an input material for a given operation may include a required property of the input material's composition (e.g., a range of percentage values for each component of the input material). In other examples, a required property of an input material may specify a particular input material (e.g., with specific percentage values for each component of the input material). Moreover, in still other examples, a required property of an input material may specify a particular brand or producer of the input material. Additionally, in still other examples, a required property of an input material may specify a maximum price (e.g., per volume, or per weight) of the input material.

Similarly, in some examples, a required property of a piece of equipment for a given operation may include a required type of equipment (e.g., a heater, an agitator, etc.), a required brand or producer of equipment, a required price (or price per use) of equipment, a required material composition of the equipment, etc. Additionally, as discussed above, a required property of a piece of equipment to perform a given operation may be the piece of equipment's capability to perform the operation, e.g., to mix materials, to heat materials, to move materials from one location to another, etc. Furthermore, a required property of a piece of equipment to perform a given operation may include ranges or limitations of the piece of equipment's performance of the operation. As a few examples, the required properties of equipment to perform a given operation may include the equipment's capability of heating to a particular temperature (e.g., a minimum temperature, or a range of temperatures), the equipment's capability of sustaining the particular temperature for a particular amount of time (e.g., a minimum amount of time, a range of time periods, etc.), the speed at which the equipment can reach the particular temperature, the piece of equipment's capability of mixing at a particular speed (e.g., a minimum speed, a range of speeds, etc.), the capacity of the equipment (e.g., a minimum capacity, or a range of possible capacities) to hold, mix, store, transport, heat, or otherwise operate upon input materials, etc.

Additionally, in some examples, a required property of personnel may include a number of personnel required to perform a given operation (e.g., a minimum number of personnel, or a minimum ratio of personnel to equipment and/or input materials). Furthermore, in some examples, a required property of personnel may include a qualification level of personnel required to perform a given operation (e.g., a required degree, education level, certification, training, etc. required for personnel who are to perform a given operation). Moreover, in some examples, a required property of personnel may include a required minimum size, strength, or other physical property of one or more personnel who are to perform a given operation.

Furthermore, in some examples, generating the indications of one or more site requirements may include identifying (or otherwise obtaining) one or more properties of the site size required for each respective operation associated with the sequence of equipment-agnostic processing steps for making, productizing, or packaging the product or for the sequence of equipment-agnostic steps as a whole. For instance, a required property of site size may include a required size (such as a required area, a required ceiling height, a required depth underground, a required distance from other sites, etc.) for a site that performs the sequence of equipment-agnostic steps, or for a portion of the site that performs each operation.

Moreover, in some examples, generating the indications of one or more site requirements may include identifying, based on the universal process definition (and/or otherwise receiving or obtaining), one or more required properties of the operations are performed in order to perform the sequence of equipment-agnostic processing steps for making, productizing, or packaging the product. For instance, one or more operations may be required to be performed in a particular order. As another example, one or more operations may be required to be performed simultaneously. Furthermore, one or more operations may be required to be performed manually, or one or more operations may be required to be performed automatically.

Additionally, in some examples, generating the indications of one or more site requirements may include identifying, based on the universal process definition (and/or otherwise receiving or obtaining), additional requirements, such as a date or time (e.g., a latest possible date and/or time) by which the sequence of equipment-agnostic processing steps for making, productizing, or packaging the product must be performed, a maximum cost associated with performing the sequence of equipment-agnostic processing steps for making, productizing, or packaging the product, and/or a minimum quantity of product that must ultimately be made, produced, or productized.

The required properties of the input materials, equipment, and/or personnel (and/or any other requirements) corresponding to each respective operation and/or the sequence of operations as a whole, may range from general to specific. Moreover, a given operation may, for example, have a required property of being performed on a very specific quantity of a given input material, made by a particular producer, but may have relatively fewer, or less specific, equipment or personnel requirements (e.g., the operation must be performed by some piece of equipment capable of heating to a particular temperature, but there is no required property of the personnel that perform the operation). As another example, a given operation may, for example, have a required property of being performed by personnel having a doctorate degree, but the input material may only be required to be any material having a range of composition of a particular component, and the equipment may be any equipment capable of mixing at a particular speed.

Additionally, the method 900 includes receiving (step 906) site configuration data relating to the configuration of one or more candidate development or production sites. The one or more candidate development or production sites may include, for instance, laboratories, development plants, pilot plants, and/or full-scale production plants, etc.

For instance, in some examples, the site configuration data may include device tag information, automation equipment type information, process control equipment information, I/O configuration data, and/or skid configuration information for each of a number of candidate development or production sites. Moreover, in some examples, the site configuration data may include an indication of one or more properties of input materials, equipment, and/or personnel available at each of the candidate development and/or production sites, and/or an indication of one or more properties of the size of each of the candidate development and/or production sites.

For instance, the site configuration data may include an indication of which input materials are available at each of the candidate development and/or production sites, including indications of the amounts of each input material, the input materials' specific composition, the brands or producers associated with each input material, etc. Similarly, the site configuration data may include an indication of which equipment is available at each of the candidate development and/or production sites, including indications of the amount of each type of equipment, the capacity of each piece of equipment, the specifications and capabilities of each piece of equipment, the brand or producer of each piece of equipment, etc. Moreover, the site configuration data may include an indication of which personnel are available at each of the candidate and/or production sites, including indications of the number of personnel available, their qualifications, their physical properties, their ability to perform various operations manually, etc. Additionally, in some examples, the site configuration data may include indications of the size of each of the candidate development and/or production sites or the sizes of various areas of each of the candidate development and/or production sites.

Furthermore, in some examples, the site configuration data may include (or the method 900 may otherwise include obtaining and/or receiving) indications of other factors associated with each of the candidate development and/or production sites, such as the geographic locations of each of the candidate development and/or production sites, costs associated with each of the candidate development and/or production sites, scheduling availability of each of the candidate development and/or production sites, efficiency or speed of each of the candidate development and/or production sites at performing various operations, etc.

Furthermore, the method 900 includes identifying (step 908) one or more candidate development or production sites as matches based at least in part on comparing the one or more site requirements for performing the sequence of equipment-agnostic processing steps for making, productizing, or packaging the product, to the site configuration data associated with each of the one or more candidate development or production sites. For instance, one or more required properties of input materials, equipment, and/or personnel for making, productizing, or packaging the product may be compared to respective properties of input materials, equipment, and/or personnel associated with each of the one or more candidate development or production sites (e.g., based on the site configuration data) to identify one or more candidate development or production sites as matches. Similarly, one or more properties of site size required for each respective operation associated with the sequence of equipment-agnostic processing steps for making, productizing, or packaging the product, or for the sequence of equipment-agnostic steps as a whole, may be compared to respective properties of site size associated with each of the one or more candidate development or production sites (e.g., based on the site configuration data) to identify one or more candidate development or production sites as matches.

As another example, identifying a candidate development or production site as a match may include determining, based on the site configuration data (and/or otherwise receiving or obtaining), capacities of one or more of the equipment at each of the one or more candidate development or production sites, and determining whether each of the one or more candidate development or production sites is a match based at least in part on whether each of the one or more candidate development or production sites can produce a required (e.g., minimum) quantity of the product to be made, productized, or packaged based on the site requirements. As still another example, identifying a candidate development or production site as a match may include determining, based on the site configuration data (and/or otherwise receiving or obtaining), inventory information related to the input materials available at each of the one or more candidate development or production sites, and determining whether each of the one or more candidate development or production sites is a match based at least in part on whether each of the one or more candidate development or production sites can produce a required (e.g., minimum)

quantity of the product to be made, productized, or packaged, based on the site requirements, with the input materials available at the development or production site.

As another example, identifying a candidate development or production site as a match may include determining, based on the site requirements (and/or otherwise receiving), an indication of a required quantity of the product and a required time by which the product must be made, productized, or packaged. In this example, the method 900 may include receiving equipment availability scheduling information related to each of the one or more candidate development or production sites, and determining a total time required to produce the required quantity of the product using the equipment of each of the one or more candidate development or production sites (as indicated by the site configuration data). In this example, a determination may be made as to whether each of the one or more candidate development or production sites can produce the required quantity of the product by the required time, from the equipment availability scheduling information and the total time required, and candidate development or production sites may be identified as matches based on whether each of the candidate development or production sites can produce the required quantity of the product by the required time.

In some examples, identifying a candidate development or production site as a match may include determining whether each candidate development or production site possesses at least one (or a minimum number) of the one or more types of equipment corresponding to each respective operation such that the sequence of processing steps can be executed at the development or production site. In some examples, a given operation may be able to be performed by a single piece of equipment, or by multiple pieces of equipment. For instance, an operation may require that a given quantity of a particular input material can be heated to a specific temperature. A candidate development or production site that includes a single piece of equipment capable of heating the entire quantity of the particular input material to the specific temperature may be identified as a match, and a candidate development or production site that includes multiple pieces of equipment collectively capable of heating the quantity of the particular input material to the specific temperature may also be identified as a match, in some examples. Moreover, in some examples, a single candidate development or production site that meets all of the requirements for making, productizing, or packaging the product may be identified as a match. Moreover, in some examples, a plurality of candidate development or production sites that collectively meet all of the requirements for making, productizing, or packaging the product may be identified as a match. For example, for a matched plurality of candidate development or production sites, one or more operations may be performed by a first candidate or production site, while other operations may be performed by a second candidate or production site, assuming that other requirements are met (e.g., geographic proximity). As another example, for a matched plurality of candidate development or production sites, some quantity of input material may be operated upon by a first candidate or production site, while an additional quantity of the input material may be performed by a second candidate or production site (i.e., the input material may be divided between several candidate development or production sites in some cases).

In any case, the method 900 further includes selecting (step 910) one or more development or production sites from the matched one or more candidate development or production sites to perform the sequence of processing steps for making, productizing, or packaging the product.

In an example, selecting one or more development or production sites from the matched one or more candidate development or production sites may include generating, based on the universal process definition (and/or otherwise receiving or obtaining), indications of one or more site preferences for performing the sequence of equipment-agnostic processing steps for making, productizing, or packaging the product, and generating suitability indicators associated with each of the one or more matched candidate development or production sites based at least in part on comparing the one or more site preferences to the site configurations of each of the one or more matched candidate development or production sites. For instance, the site preferences may generally be similar to the site requirements, but may include indications of preferential properties or qualities of the site, the input materials, the equipment, the personnel, or other preferential properties of the site's performance of the operations, which may be different or otherwise more specific than the site requirements.

For instance, in some examples, generating the indications of one or more site preferences may include identifying, based on the universal process definition, one or more preferential properties of equipment corresponding to each respective operation associated with the sequence of equipment-agnostic processing steps for making, productizing, or packaging the product. Moreover, in some examples, generating the indications of one or more site preferences may include identifying, based on the universal process definition (and/or otherwise receiving or obtaining), one or more preferential properties of input materials, equipment, and/or personnel corresponding to each respective operation associated with the sequence of equipment-agnostic processing steps for making, productizing, or packaging the product. Furthermore, in some examples, generating the indications of one or more site preferences may include identifying (and/or otherwise receiving or obtaining) one or more properties of the site size preferred for each respective operation associated with the sequence of equipment-agnostic processing steps for making, productizing, or packaging the product or for the sequence of equipment-agnostic steps as a whole. Moreover, in some examples, generating the indications of one or more site preferences may include identifying, based on the universal process definition (and/or otherwise receiving or obtaining), one or more preferential properties of input materials associated with the sequence of equipment-agnostic processing steps for making, productizing, or packaging the product, ratios or quantities of the input materials and/or intermediate products associated with the sequence of equipment-agnostic processing steps for making, productizing, or packaging the product, operations on the input materials and/or intermediate products associated with the sequence of equipment-agnostic processing steps for making, productizing, or packaging the product, and/or a sequence in which the operations are preferably performed in order to perform the sequence of equipment-agnostic processing steps for making, productizing, or packaging the product.

For example, the site requirements may include any equipment capable of heating input materials to a certain minimum temperature, while site preferences may include a particular type or brand of equipment, or a preferential temperature at which the equipment is cable of heating the input materials. As another example, the site requirements may simply include a certain minimum number of personnel, while the site preferences may include a preferential higher number of personnel or a general preference for higher quantities of personnel, or certain training completed by one or more personnel. As still another example, the site requirements may include a latest date or time by which the operations must be completed, and the site preferences may include a preference for an earlier date or time, or a general preference for earliest possible dates or times by which the operations must be completed.

The suitability indicators may include numerical scores or ratings of each of the one or more matched candidate development or production sites based on comparing the one or more site preferences to the site configurations of each of the one or more matched candidate development or production sites. For instance, a matched candidate development or production site that conforms to more of the site preferences, based on the site configuration data, may be associated with a higher ranked or higher rated suitability indicator, while a matched candidate development or production site that conforms to fewer of the site preferences, based on the site configuration data, may be associated with a lower ranked or lower rated suitability indicator. In some examples, the suitability indicators may be weighted based on particular site preferences, e.g., based on the importance or other considerations associated with each of the site preferences, which may be indicated by a user.

In this example, one or more development or production sites may be selected from the matched candidate development or production sites to perform the sequence of processing steps for making, productizing, or packaging the product based at least in part on the suitability indicators associated with each of the matched candidate development or production sites.

In some examples, selecting development or production sites from the matched candidate development or production sites may include selecting only matched candidate development or production sites associated with suitability indicators greater than a suitability indicator threshold. Additionally, in some examples, selecting development or production sites from the matched candidate development or production sites may include automatically selecting one or more matched candidate development or production sites associated with the highest suitability indicators of the matched candidate development or production sites. Furthermore, in some examples, selecting development or production sites from the matched candidate development or production sites may include presenting an indication of the suitability indicators associated with each of the one or more matched candidate development or production sites via a user interface (e.g., in a ranked order based on their suitability indicators) and receiving an indication of a selection of one or more matched candidate development or production sites via the user interface.

Once one or more development or production sites are selected, in some examples, the method 900 may include automatically transforming the sequence of equipment-agnostic processing steps into one or more routines for executing the sequence of processing steps to make, productize, or package the product using equipment of the selected one or more development or production sites, e.g., as discussed above with respect to FIG. 6.

When implemented in software, any of the applications, services, virtual devices, vertical machines, virtual entities, etc. described herein may be stored in any tangible, non-transitory computer readable memory such as on a magnetic disk, a laser disk, solid state memory device, molecular memory storage device, or other storage medium, in a RAM or ROM of a computer or processor, etc. Although the example systems disclosed herein are disclosed as including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, while the example systems described herein are described as being implemented in software executed on a processor of one or more computer devices, persons of ordinary skill in the art will readily appreciate that the examples provided are not the only way to implement such systems.

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

Further, the particular features, structures, and/or characteristics of any specific embodiment may be combined in any suitable manner and/or in any suitable combination with one and/or more other embodiments, including the use of selected features with or without corresponding use of other features. In addition, many modifications may be made to adapt a particular application, situation and/or material to the essential scope or spirit of the present invention. It is to be understood that other variations and/or modifications of the embodiments of the present invention described and/or illustrated herein are possible in light of the teachings herein and should be considered part of the spirit or scope of the present invention. Certain aspects of the invention are described herein as exemplary aspects.

What is claimed:

1. A method of managing a production system to implement and life-cycle manage a process to create a product, comprising:

creating at a process lifecycle management system, a process definition for manufacturing the product, wherein the process definition is not limited to process equipment at a single process facility, the process definition including;

a set of process materials for making the product, a set of process operations to be applied to the materials for making the product, a sequence of the process operations, relative quantity information regarding the materials used in the process, and process feedback information required to analyze the product as manufactured;

storing the process definition in the process lifecycle management system;

selecting a first production site having at least a first process execution system coupled to a first set of process equipment;

obtaining first process site data including execution system and process equipment data defining the first process execution system and the first set of process equipment;

using, using a computer processor associated with the process lifecycle management system, the process definition and the first process site data to create a first set of site specific production facility instructions for implementation by or on the first process execution system using the first set of process equipment at the first production site to make the product and to capture process feedback data defined by the process feedback information, the first set of site specific production facility instructions being specific to the first process execution system at the first production site using the first set of process equipment;

analyzing the process feedback data regarding the operation of the process at the first production site at the process lifecycle management system to change the process definition;

selecting a second production site having at least a second process execution system coupled to a second set of process equipment that is different than the first set of process equipment;

obtaining second process site data including execution system and process equipment data defining the second process execution system and the second set of process equipment; and using, using a computer processor associated with the process lifecycle management system, the process definition and the second process site data to create a second set of site specific production facility instructions for implementation by or on the second process execution system using the second set of process equipment at the second production site to make the product, the second set of site specific production facility instructions being specific to the second process execution system at the second production site using the second set of process equipment.

2. The method of claim 1, wherein the using the process definition and the first process site data to create the first set of site specific production facility instructions for implementation by the first process execution system using the first set of process equipment at the first production site to make the product includes producing one or more process control routines to be implemented by a control system at the first production site, and wherein using the process definition and the second process site data to create the second set of site specific production facility instructions for implementation by the second process execution system using the second set of process equipment at the second production site to make the product includes producing one or more process control routines to be implemented by a control system at the second production site.

3. The method of claim 1, wherein the using the process definition and the first process site data to create the first set of site specific production facility instructions for implementation by the first process execution system using the first set of process equipment at the first production site to make the product includes producing one or more audit system instructions to be implemented by an audit execution system at the first production site, and wherein using the process definition and the second process site data to create the second set of site specific production facility instructions for implementation by the second process execution system using the second set of process equipment at the second production site to make the product includes producing one or more audit execution system instructions to be implemented by an audit execution system at the second production site.

4. The method of claim 1, further including collecting the process feedback data related to the operation of the first process execution system using the first set of process equipment at the first production site to make the product, and storing the collected data at the process lifecycle management system.

5. The method of claim 4, further including storing the changed process definition as the process definition in the management system prior to using the process definition to create a set of site specific production facility instructions for implementation by the process execution system on the second set of process equipment at the second production site to make the product.

6. The method of claim 1, wherein the first production facility is a development production facility that implements development runs of the process and wherein the second production facility is a commercial manufacturing facility that manufactures commercial grade product.

7. The method of claim 1, wherein the first production facility is a development production site that implements development runs of the process and wherein the second production site is a clinical trial site that manufactures the product for clinical trials.

8. The method of claim 1, wherein the first production site is a testing production facility that implements test runs of the process and wherein the second production site is one of a development facility that implements development runs of the product and a commercial manufacturing facility that manufactures commercial grade product.

9. The method of claim 1, wherein the using the process definition and the first process site data to create the first set of site specific production facility instructions for implementation by the first process execution system using the first set of process equipment at the first production site to make the product includes scaling the process definition using the relative quantity information for a first production scale at the first production site and wherein the using the process definition and the second process site data to create the second set of site specific production facility instructions for implementation by the second process execution system using the second set of process equipment at the second production site to make the product includes scaling the process definition using the relative quantity information for a second production scale at the second production site, wherein the first production scale is different than the second production scale.

10. The method of claim 1, wherein the process definition specifies a process for manufacturing a product.

11. The method of claim 1, wherein the process definition specifies a process for packaging a product.

12. The method of claim 1, wherein the process definition specifies a process for formulating a drug.

13. A method of managing a production system to implement a process to create a product, comprising:

creating a process definition for manufacturing the product, wherein the process definition is not limited to process equipment at a single process facility, the process definition including;

a set of process materials for making the product, a set of process operations to be applied to the materials for making the product, a sequence of the process operations, relative quantity information regarding the materials used in the process, and process feedback information required to analyze the product as manufactured;

storing the process definition in a management system;

selecting a production site having at least a first process execution system coupled to one or more sets of process equipment at the production site and a second process execution system coupled to the one or more sets of process equipment at the production site;

obtaining process site data including execution system and process equipment data defining the first process execution system and the second process execution system and the one or more sets of process equipment;

using a computer processor to analyze the process definition and the process site data related to the first process execution system and the one or more sets of process equipment to create a first set of site specific production facility instructions for implementation by or on the first process execution system using at least some of the one or more sets of process equipment at the production site to make the product, the first set of site specific production facility instructions being specific to the first process execution system at the production site using the at least some of the one or more sets of process equipment;

using a computer processor to analyze the process definition and the process site data related to the second process execution system and the one or more sets of process equipment to create a second set of site specific production facility instructions for implementation by or on the second process execution system using at least some of the one or more sets of process equipment at the production site to make the product, the second set of site specific production facility instructions being specific to the second process execution system at the production site using the at least some of the one or more sets of process equipment; and capturing process feedback data defined by the process feedback information at the first or the second process execution site and changing the process definition based on the captured process feedback data.

14. The method of claim 13, wherein the first process execution system is a process equipment control system that implements a process to make the product, and wherein the second process execution system is an audit system that implements one or more auditing functions during operation of a process that makes the product at the production facility.

15. The method of claim 13, wherein the first process execution system is a process equipment control system that implements a process to make the product, and wherein the second process execution system is a scheduling system that implements one or more scheduling functions during operation of a process that makes the product at the production facility.

16. The method of claim 13, wherein the first process execution system is a process equipment control system that implements a process to make the product, and wherein the second process execution system is a manufacturing operation management system that implements one or more management control functions using the process equipment control system during operation of a process that makes the product at the production facility.

17. The method of claim 13, wherein the first process execution system is a manufacturing operation management system that implements one or more management control functions using a set of process control equipment during operation of a process that makes the product at the production facility and the second process execution system is a data collection system that collects data from the process equipment during operation of the process.

18. The method of claim 13, further including collecting data related to the operation of the first process execution system and the second process execution system during operation of the process to make the product, and storing the collected data at the management system.

19. The method of claim 18, further including using the collected data related to the operation of the first process execution system and the second process execution system during operation of the process to make the product to change the process definition, and storing the changed process definition as the process definition in the management system prior.

20. A production management system for managing a production system to implement a process to create a product, comprising:

a definition module, for execution on a computer processor, adapted to create a process definition for manufacturing the product, wherein the process definition is not limited to process equipment at a single process facility, the process definition including;

a set of process materials for making the product, a set of process operations to be applied to the materials for making the product, a sequence of the process operations, relative quantity information regarding the materials used in the process, and process feedback information required to analyze the product as manufactured;

a database for storing the process definition; and an execution module, for execution on one or more computer processors, that enables a user to;

select a first production site having at least a first process execution system coupled to a first set of process equipment, obtain first process site data including execution system and process equipment data defining the first process execution system and the first set of process equipment, use the process definition and the first process site data to create a first set of site specific production facility instructions for implementation by or on the first process execution system using the first set of process equipment at the first production site to make the product, the first set of site specific production facility instructions being specific to the first process execution system at the first production site using the first set of process equipment, select a second production site having at least a second process execution system coupled to a second set of process equipment that is different than the first set of process equipment, obtain second process site data including execution system and process equipment data defining the second process execution system and the second set of process equipment, use the process definition and the second process site data to create a second set of site specific production facility instructions for implementation by or on the second process execution system using the second set of process equipment at the second production site to make the product, the second set of site specific production facility instructions being specific to the second process execution system at the second production site using the second set of process equipment; and capture process feedback data defined by the process feedback information at the first or the second process execution system and changing the process definition based on the captured process feedback data.

* * * * *